US006950180B2

United States Patent
Fukuma et al.

(10) Patent No.: US 6,950,180 B2
(45) Date of Patent: *Sep. 27, 2005

(54) LENS METER

(75) Inventors: Yasufumi Fukuma, Tokyo (JP); Takeyuki Kato, Tokyo (JP); Eiichi Yanagi, Tokyo (JP)

(73) Assignee: Kabushiki Kaisha TOPCON, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/875,014

(22) Filed: Jun. 22, 2004

(65) Prior Publication Data

US 2004/0227933 A1 Nov. 18, 2004

Related U.S. Application Data

(62) Division of application No. 10/034,330, filed on Dec. 27, 2001, now Pat. No. 6,778,264.

(30) Foreign Application Priority Data

Dec. 28, 2000 (JP) .......................................... 2000-399801
Dec. 28, 2000 (JP) .......................................... 2000-401962
Oct. 30, 2001 (JP) .......................................... 2001-333143

(51) Int. Cl.[7] .............................................. G01B 9/00
(52) U.S. Cl. ........................................................ 356/124
(58) Field of Search .................................. 356/124–127

(56) References Cited

U.S. PATENT DOCUMENTS 6,778,264 B2 * 8/2004 Fukuma et al. ............. 356/124

* cited by examiner

Primary Examiner—Gregory J. Toatley, Jr.
Assistant Examiner—Amanda Merlino
(74) Attorney, Agent, or Firm—Chapman and Cutler LLP

(57) ABSTRACT

A lens meter according, including: a unit body provided with eyeglasses support means for supporting eyeglasses; a left measurement optical system provided in the unit body and provided with a left light-emitting optical system that emits measurement light to a left eyeglass lens of the eyeglasses and a left light-receiving optical system that receives the measurement light passing through the left eyeglass lens with a CCD (light-receiving element); a right measurement optical system provided in the unit body and provided with a right light-emitting optical system that emits measurement light to a right eyeglass lens of the eyeglasses and a right light-receiving optical system that receives the measurement light passing through the right eyeglass lens with the CCD (light-receiving element); and an arithmetic control circuit that performs operation to the optical characteristics of a pair of the eyeglass lenses based on an output of the CCD (light-receiving element).

18 Claims, 38 Drawing Sheets

Fig. 8
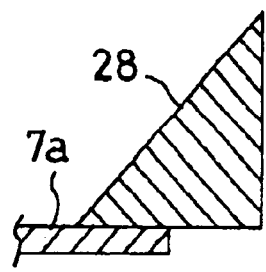
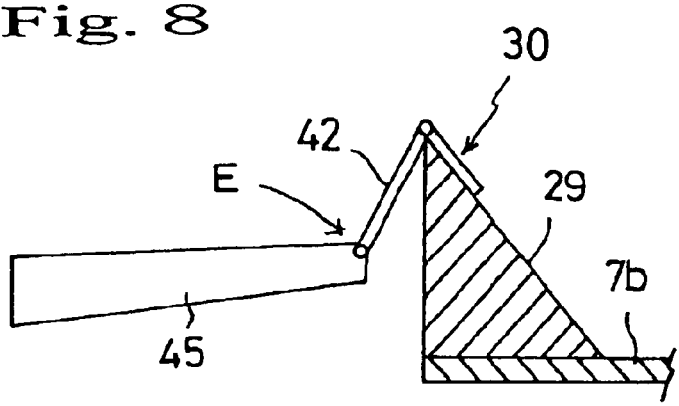
Fig. 9
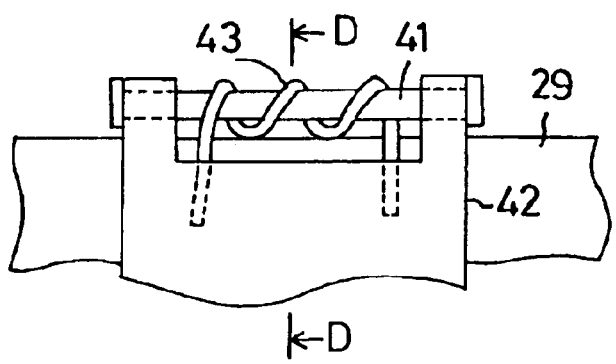
Fig. 10
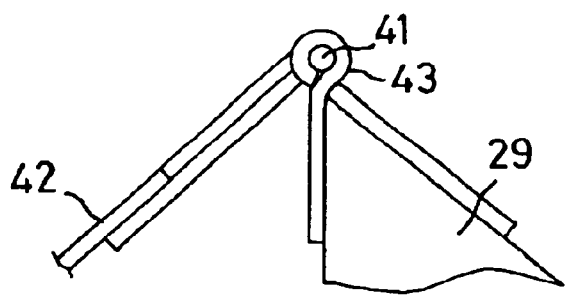

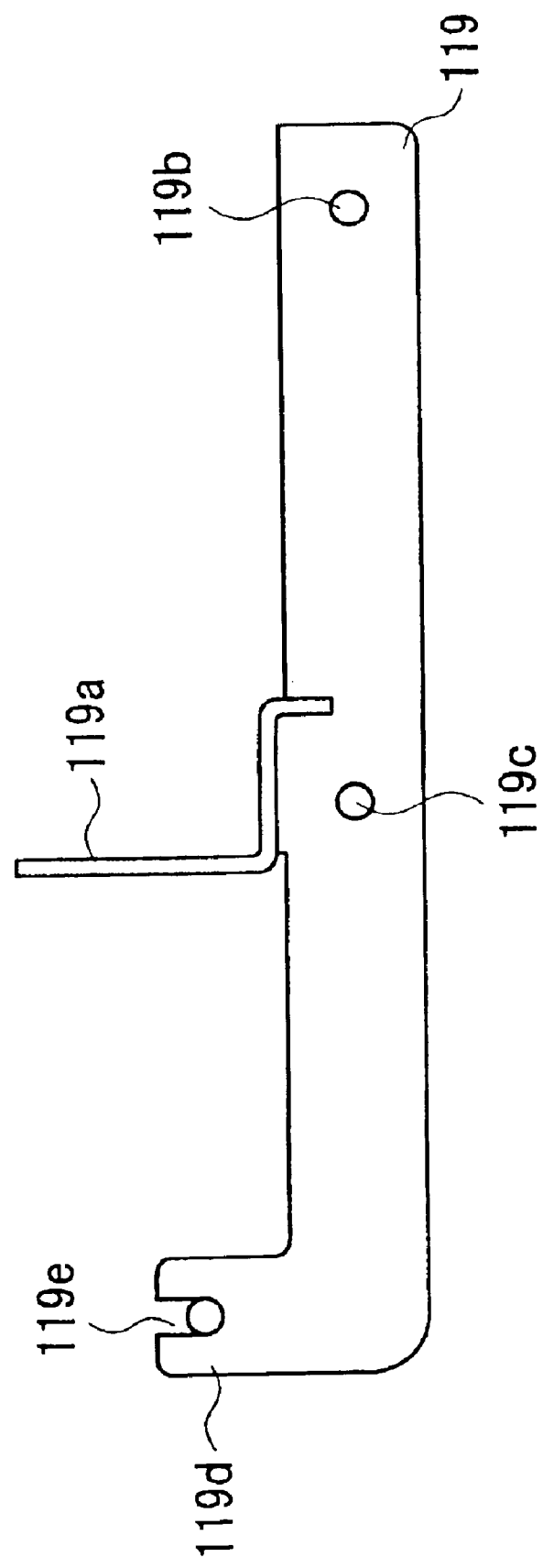

LENS METER

BACKGROUND OF THE INVENTION

1. Field of the Invention

The present invention relates to a lens meter capable of measuring refraction characteristics of right and left lenses of eyeglasses with two measurement optical systems, particularly to a lens meter capable of obtaining in a simple manipulation optical characteristics such as a spherical power of a pair of lens attached on a frame of eyeglasses.

2. Description of the Prior Art

Conventionally, a lens meter has been known, which has a configuration that information including: a scale drawn in a concentric circle with centering an optical center of eyeglasses; a cross target showing a measurement point of the eyeglass lens; and a measurement value of optical characteristics of the lens being inspected is displayed on a monitor screen of a display, the cross target is moved into a circle in a central area of the scale while looking at the screen, and the optical characteristics (a spherical power S, a cylindrical power C, an axial angle A, prismatic values Px, Py, an additional power ADD) of eyeglass lenses are automatically computed and measured.

In this lens meter, a main switch is turned on to display the concentric scale on the monitor screen and one of a pair of lenses of eyeglasses attached on the frame of eyeglasses is mounted on a lens receiver.

By turning on the main switch, a measurement luminous flux is projected from a measurement projection optical system to the eyeglass lens to be measured, arithmetic measurement is performed to a prismatic quantity at a transmission area of the eyeglass lens where the measurement luminous flux passes, the cross target showing the measurement point of the eyeglass lens is displayed on the monitor screen based on the prismatic quantity, and the eyeglass lens is moved along the lens receiver to make the cross target fall into the scale while looking at the monitor screen.

The optical characteristics of the eyeglass lens are measured in this manner in the conventional lens meter. When the measurement of one eyeglass lens is completed, the optical characteristics of the other eyeglass lens are measured in the same procedure.

Incidentally, the lens meter of this kind has a problem that much time is required for the measurement and the measurement is bothersome because the eyeglass lens must be mounted on the lens receiver again to measure the other eyeglass lens after measuring one eyeglass lens.

Further, although unattended store, manpower reduction and the like are considered in many eyeglasses stores, a visitor himself/herself must operate the lens meter to measure the optical characteristics of lenses of eyeglasses if the lens meter is installed in an unattended store.

However, there exists a problem that the operation of measurement by the visitor in the conventional lens meter is too complicated for the visitor.

SUMMARY OF THE INVENTION

The present invention has been created from a viewpoint of the foregoing circumstances. An object of the present invention is to provide a lens meter capable of measuring a pair of lenses of eyeglasses only by placing the eyeglasses on the lens meter with a simple procedure.

To achieve this object, the lens meter of the present invention includes: a unit body provided with an eyeglass support means for supporting eyeglasses; a left measurement optical system provided in the unit body and provided with a left light-emitting optical system that emits measurement light to a left eyeglass lens of the eyeglasses and a left light-receiving optical system that receives the measurement light passing through the left eyeglass lens with a photo-detecting device; a right measurement optical system provided in the unit body and provided with a right light-emitting optical system that emits measurement light to a right eyeglass lens of the eyeglasses and a right light-receiving optical system that receives the measurement light passing through the right eyeglass lens with the photo-detecting device; and an arithmetic control circuit that performs operation to the optical characteristics of a pair of the eyeglass lenses based on an output of the photo-detecting device.

Further, a pair of the light-receiving optical systems can share one photo-detecting device. The unit body can have: a left lens receiver disposed between the left light-emitting optical system and the left light-receiving optical system and provided with an end portion capable of supporting the left eyeglass lens from underneath with a point; and a right lens receiver disposed between the right light-emitting optical system and the right light-receiving optical system and provided with an end portion capable of supporting the right eyeglass lens from underneath with a point, as the eyeglasses support means. Each of the right and left lens receivers can be formed in a bar shape to be a pair of lens receiving shafts. Upper ends of the lens receiving shafts are formed in a hemispheric shape capable of supporting the eyeglass lens with a point. Further, the unit body can have a pair of pressing members as another lens support means. In this case, a pair of the pressing members severally press each of the right and left eyeglass lenses from above to press the right and left eyeglass lenses severally against the right and left lens receivers.

Furthermore, the unit body can have an elevating support means for eyeglasses as another lens support means. The elevating means for eyeglasses has a configuration that it is attached to the unit body in a freely movable manner up and down and makes the right and left eyeglass lenses of eyeglasses go down until the lenses contact the right and left lens receivers. Further, the elevating support means for eyeglasses may be a nose pad supporting member disposed at a center between the right and left measurement optical systems in a freely movable manner up and down, which is capable of supporting the nose pad of eyeglasses from underneath and positioning the eyeglasses in horizontal directions. The elevating support means for eyeglasses may be a frame-supporting member capable of supporting right and left lens frames of the eyeglasses.

Furthermore, the unit body can have a pair of sandwiching means for eyeglasses, which sandwich the eyeglasses from front and rear directions, as another lens support means. The unit body can have: the mouse pad supporting member disposed at a center between the right and left measurement optical systems, which is capable of supporting the nose-pad of eyeglasses from underneath and positioning the eyeglasses in horizontal directions; and a pair of the sandwiching means for eyeglasses, which sandwich the eyeglasses from front and rear directions, as another lens support means.

The unit body can have: the nose pad supporting member disposed at a center between the right and left measurement optical systems, which is capable of supporting the nose pad of eyeglasses from underneath and positioning the eyeglasses in horizontal directions; a pair of pressing members that severally press the right and left eyeglass lenses from above to press the right and left eyeglass lenses against the right and left lens receivers; and a pair of the sandwiching means for eyeglasses, which sandwich the eyeglasses from front and rear directions, as another lens support means.

The lens receivers have a configuration that they are provided between a measurement optical path of the measurement optical system and a withdrawal position outside the measurement optical path in a freely movable manner by a lens receiver moving mechanism. A pair of the sandwiching means for eyeglasses, which sandwich the eyeglasses from front and rear directions, are linked or connected with each other so as to move forward or backward by an equal quantity with each other to a measurement optical axis of the measurement optical system.

BRIEF DESCRIPTION OF THE ATTACHED DRAWINGS

FIG. 8 is a cross-sectional view of an attaching area of a nose-pad supporting mechanism in FIG. 1.

FIG. 9 is an enlarged view of the attaching area of the nose pad supporting mechanism to a frame holding member in FIG. 8.

FIG. 10 is a cross-sectional view taken along a line D—D in FIG. 9.

FIG. 20 is a cross-sectional view taken along a line G—G in FIG. 16.

FIG. 21 is a cross-sectional view taken along a line H—H in FIG. 20.

FIG. 22 is a cross-sectional view taken along a line I—I in FIG. 20.

FIG. 23 is a front view of one linkage plate in FIG. 20.

FIG. 31 is a perspective view showing an example when a display unit is provided to the lens meter in FIGS. 14 to 29.

FIG. 32 is a perspective view showing another example of a lens meter according to a third embodiment of the present invention.

DESCRIPTION OF THE PREFERRED EMBODIMENT

A first embodiment, of the present invention will be described with reference to the drawings as follows.

[Configuration]

<Unit Body>

Figure 1:
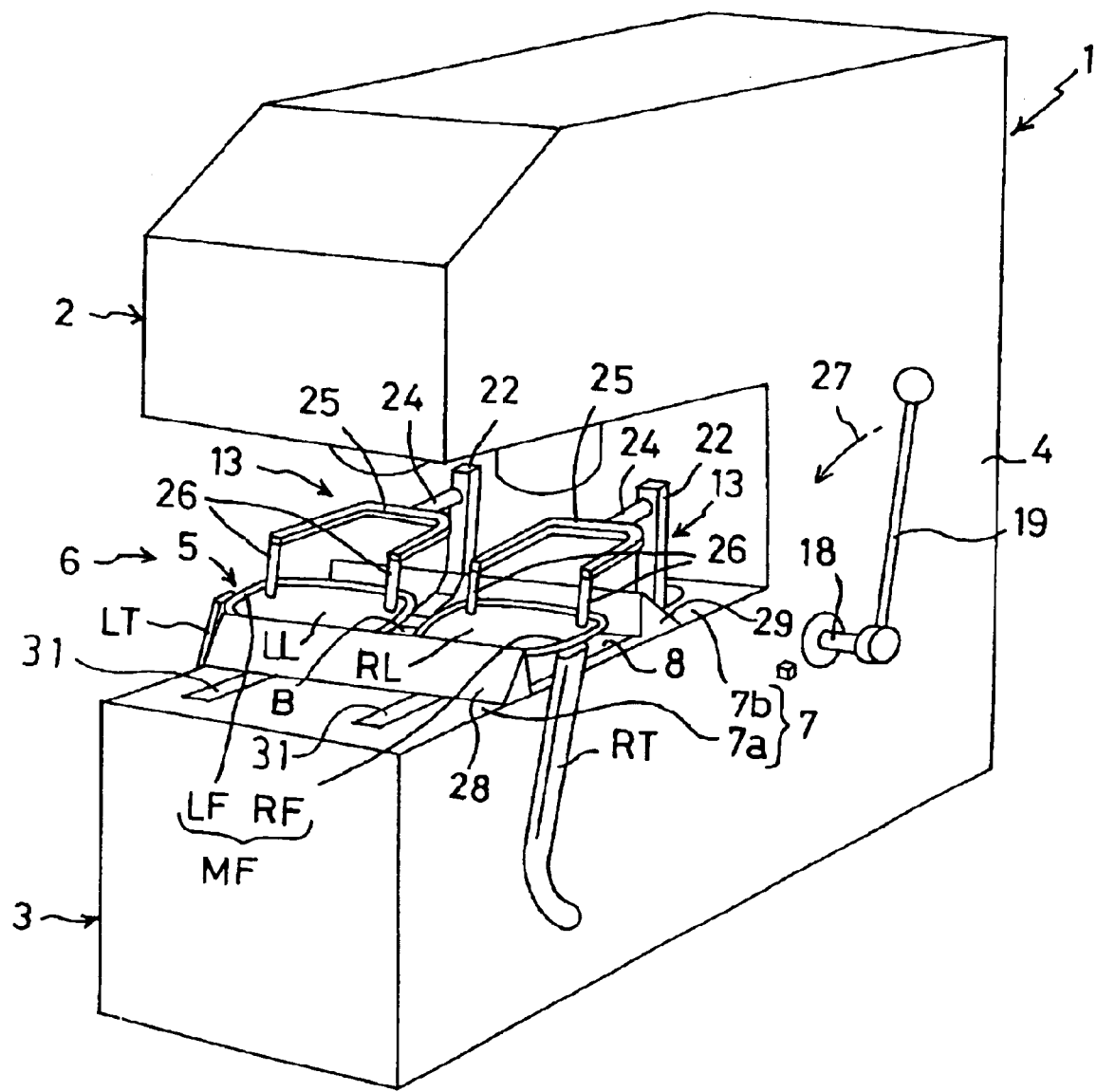
FIG. 1 is a perspective view of a lens meter according to the present invention.

FIG. 1 is the external view of a lens meter according to the present invention. In FIG. 1, numerical reference 1 denotes a unit body (body case). A side shape of the unit body 1 is formed in an approximate reversed letter 'C' shape with an upper case 2, an lower case 3 and a connecting case 4 that connects the upper and lower cases. An area between the upper case 2 and the lower case 3 is a setting space 6 of eyeglasses 5.

<Eyeglasses>

The eyeglasses 5 in the embodiment has an eyeglass frame MF, eyeglass lenses LL and RL fitted into right and left lens frames LF and RF of the eyeglass frame MF, a bridge B connecting the right and left lens frames LF and RF, a nose pad (not shown) provided to the right and left lens frames LF and RF or the like, and temples LT and RT provided to the right and left lens frames LF and RF.

Figure 3:
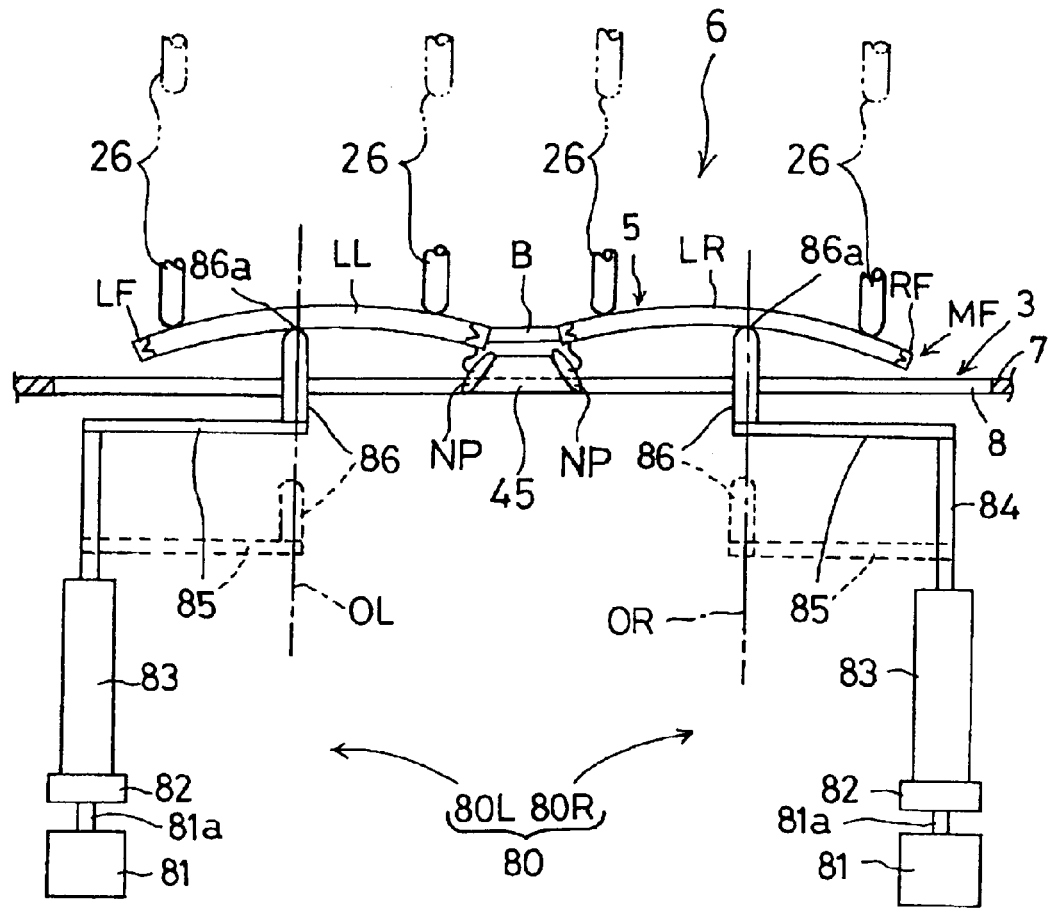
FIG. 3 is a schematic exemplary view showing a relation between the opening in FIG. 2 and the lens receiving mechanism.

Further, on the upper wall 7 of the lower case 3, an opening 8 extending to both (right and left) ends of the wall is formed as shown in FIGS. 1 and 3. The upper wall 7 is divided into a front upper wall area 7a and a rear upper wall 7b by the opening 8. A lens receiving mechanism 80 as shown in FIG. 3 is disposed on right and left under the opening 8.

<Lens Receiving Mechanism 80>

The lens receiving mechanism (lens receiver moving mechanism) 80 as eyeglasses holding means has a left lens receiving mechanism (left lens receiver moving mechanism) 80L and a right lens receiving mechanism (right lens receiver moving mechanism) 80R. The lens receiving mechanism 80 is contained inside the foregoing lower case 3. Further, since the left lens receiving mechanism 80L and the right lens receiving mechanism 80R, have the same configuration, same reference numerals are added to the both and description will be made for only one configuration.

The left lens receiving mechanism 80L has a drive unit (drive means) 81 such as a drive motor or a rotary solenoid whose rotation output shaft 81a is directed vertically a rotation stage 82 provided on the upper end of output shaft 81a, an elevating means 83 attached on the rotation stage 82 in a vertical direction (upper and lower direction), a support shaft 84 driven up and down by the elevating means 83, an arm 85 attached on the upper end of support shaft 84 in a horizontal direction, and a lens receiving shaft (lens receiver) 86 of a bar shape attached vertically directing upward to the far end of arm 85, as the eyeglasses support means. A hemispheric lens receiving area 86a is formed on the upper end of lens receiving shaft 86.

The heights of the upper ends of the lens receiving shafts 86 and 86 of the lens receiving mechanisms 80L and 80R are set in the same dimension. In other words, the heights of the upper ends of the hemispheric lens receiving area 86a and 86a of the lens receiving mechanisms 80L and 80R are set in the same dimension.

It should be noted that a hydraulic cylinder, a solenoid, a feeding mechanism using a drive motor and a screw, or the like can be used as the elevating means 83.

<Lens Pressing Mechanism>

Figure 2:
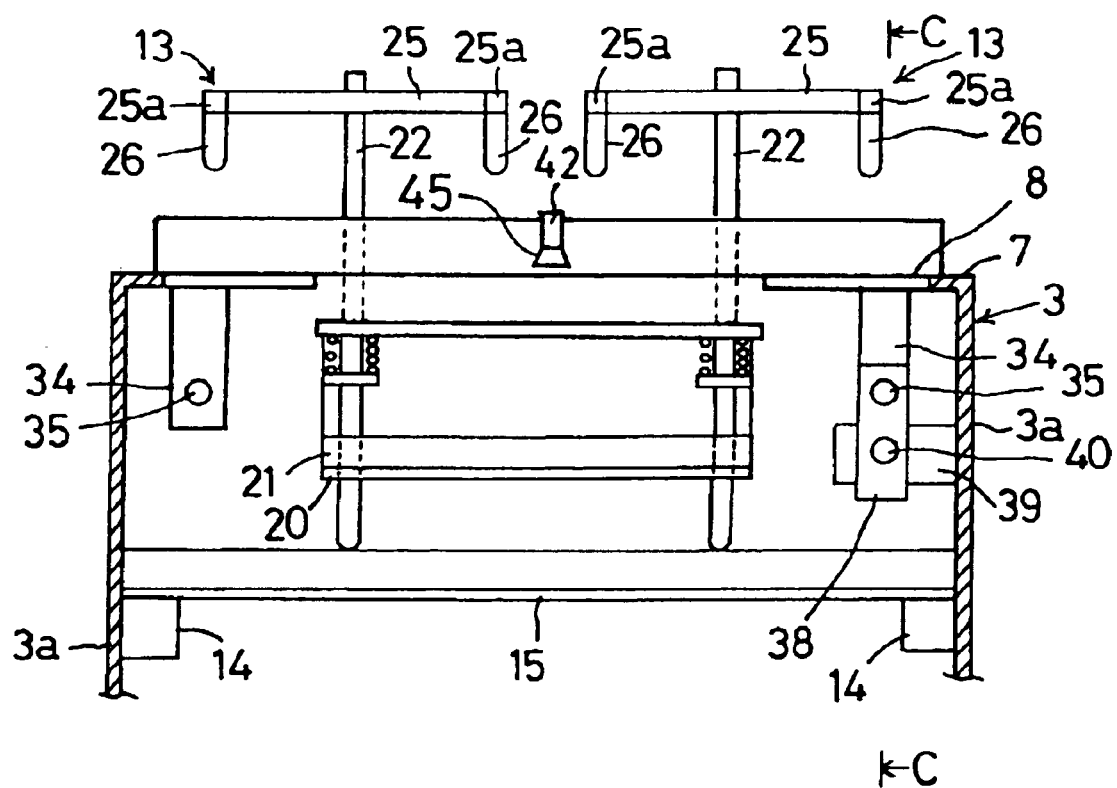
FIG. 2 is a cross-sectional view of the opening area of the lens meter of FIG. 1 in a state where a lens receiving mechanism is removed.
Figure 5:
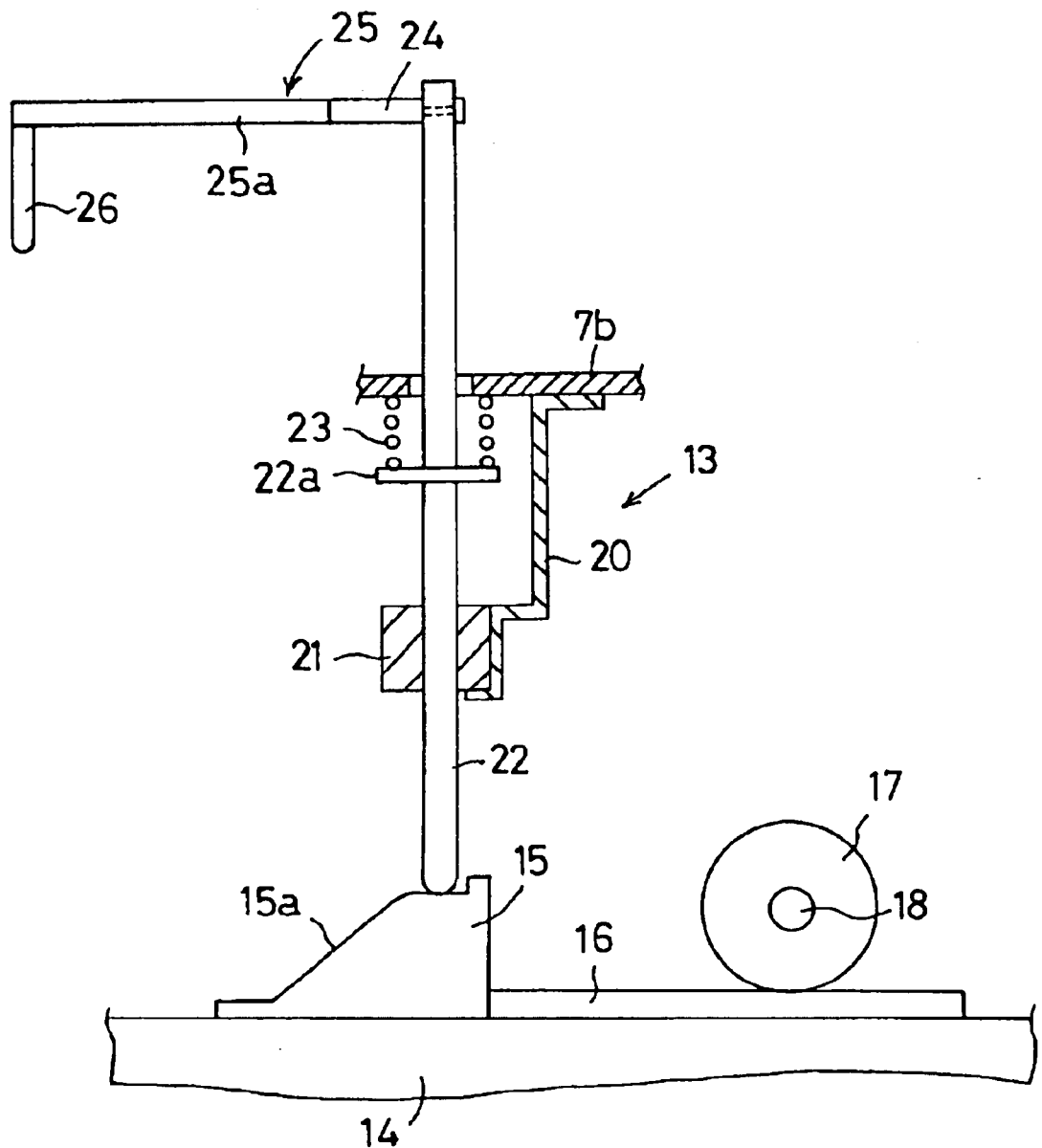
FIG. 5 is a cross-sectional view of a lens pressing mechanism area shown in FIG. 1.

The eyeglass lenses LL and RL supported on the lens receiving mechanisms 86 and 86 are pressed by a lens pressing mechanism 13 as shown in FIGS. 1, 2 and 5.

The lens pressing mechanism 13 has guide rails 14 and 14 fixed horizontally and directing in front and rear directions on inner wall surfaces of sidewalls 3a and 3a of the lower case 3 and a cam member 15 supported movably on the guide rails 14 and 14 in front and rear directions, as shown in FIG. 2. Furthermore, the lens pressing mechanism (lens holding means) 13 has a rack 16 integrally provided on the rear area of one cam member 15, as shown in FIG. 5, a gear 17 engaged with the rack 16, a support shaft 18 integrally provided with the gear 17 and held rotatably on the sidewall 3a, as shown in FIG. 1 and an operation lever 19 attached to the support shaft 18.

Moreover, the lens pressing mechanism 13 has a bracket 20 attached to the rear upper wall 7b, a shaft holding member 21 held on the lower end area of the bracket 20, a support shaft 22 held on the shaft holding member 21 movably in vertical directions and vertically penetrating the rear upper wall 7b, a flange 22a positioned between the shaft holding member 21 and the rear upper wall 7b and integrally formed on the support shaft 22 and a coil spring (energy means) 23 installed between the flange 22a and the rear upper wall 7b and spring-energizes the support shaft 22 downward, as shown in FIG. 5. Further, the lens pressing mechanism 13 has a rotation support shaft 24 held rotatably centering a horizontal axis that extends at the upper end of support shaft 22 in front and rear directions, a supporting member 25 of a reverse letter 'C' shape integrally provided to the front end of the rotation support shaft 24; and lens pressing shafts lens pressing members) 26 and 26 held downward by support shafts 25a and 25a at both sides of the supporting member 25. The lens pressing shafts 26 and 26 are made up of a material such as rubber or synthetic resin that does not scratch the eyeglass lens.

When the operation lever 19 stands as shown in FIG. 1, the cam member 15 is in the position shown in FIG. 5 and the lens pressing shafts (26 and 26) are greatly off upward as shown in FIG. 3. If the operation lever 19 is declined frontward as sown by an arrow 27 in FIG. 1, the gear 17 moves to displace the rack 16 rightward in FIG. 5, the cam member 15 is displaced integrally with the rack 16 to rightward, and thus the support shaft 22, the supporting member 25 and the lens pressing shafts 26 and 26 are displaced downward by spring force of the coil spring 23.

<Eyeglass Frame Holding Mechanism>

Further, the unit body 1 is provided with a frame holding mechanism that holds the eyeglass frame MF of the eyeglasses 5 whose eyeglass lenses LL and RL are severally supported by lens receivers 9L and 9R.

The frame holding mechanism has: a frame positioning mechanism in front and rear directions dens frame positioning mechanism in front and rear directions); and a nose pad supporting mechanism 30 (refer to FIG. 8) attached to a middle area in right and left directions of a frame holding member 29.

<Frame Positioning Mechanism in Front and Rear Directions>

The lens frame positioning mechanism has a pair of the frame holding members (lens frame holding members) 28 and 29 extending in right and left directions and disposed on the front upper wall area 7a and the rear upper wall 7b as an eyeglasses sandwiching member (lens support means). It should be noted that since eyeglasses may have a rimless frame, the frame holding member functions as the lens support means in such a case.

Figure 6:
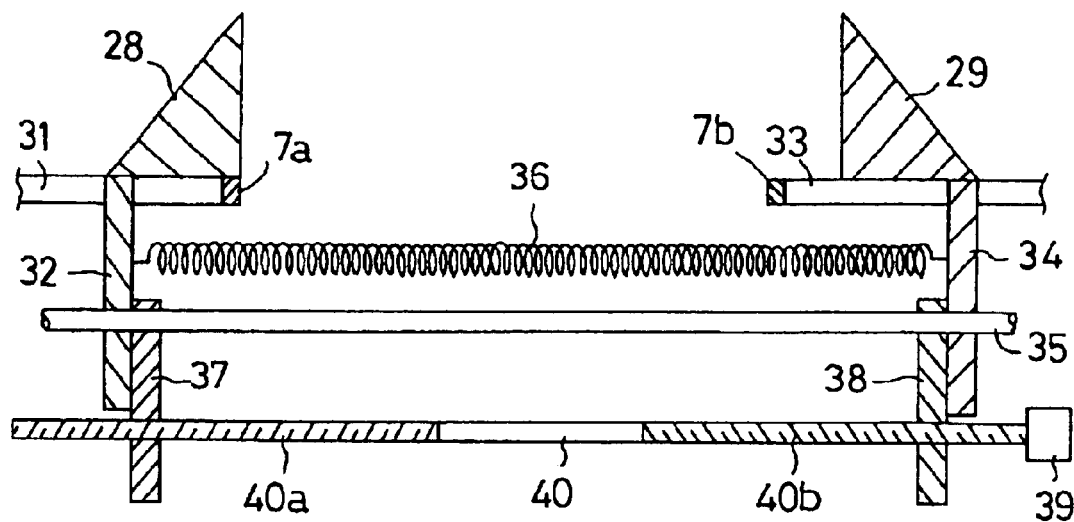
FIG. 6 is a cross-sectional view taken along a line C—C in FIG. 2.
Figure 7:
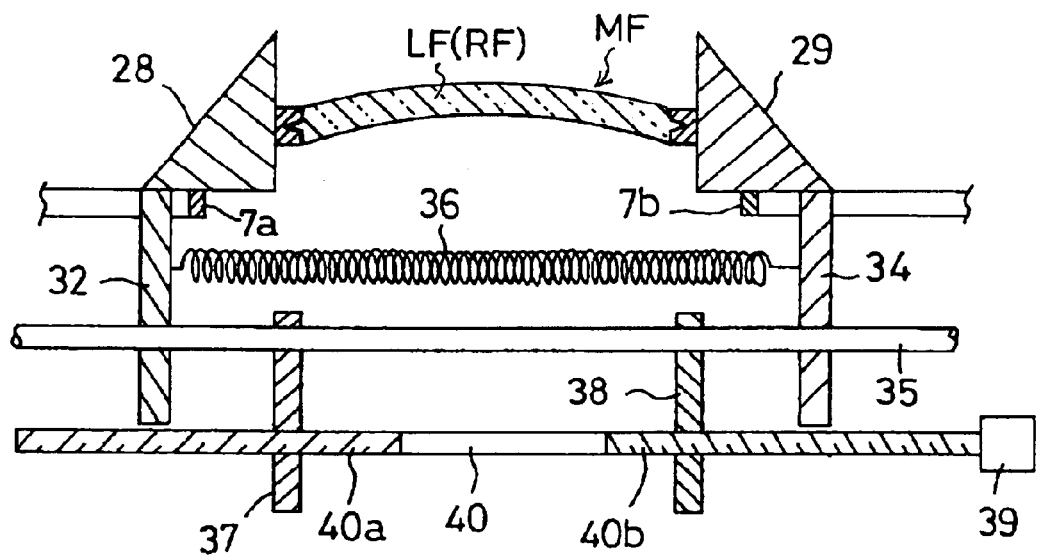
FIG. 7 is an operational exemplary view of FIG. 6.

Further, slits 31 and 31 extending in front and rear directions as shown in FIG. 1 are formed at right and left areas of the front upper wall area 7a. A movable member 32 integrally formed to the frame holding member 28 is inserted into the slit 31, as shown in FIGS. 6 and 7. Similarly, a slit 33 is also formed to the rear upper wall 7b as shown in FIGS. 6 and 7, and a movable member 34 integrally formed to the frame holding member 29 is inserted into the slit 33 as shown in FIGS. 6 and 7.

Furthermore, guide shafts 35 and 35 extending in front and rear directions and penetrating the movable members 32 and 34 are disposed at both sides inside the lower case 3. The guide shafts 35 and 35 are fixed at a position (not shown) of the lower case 3. The, movable members 32 and 34 are also spring-energized in directions where they approach with each other by an extension coil spring 36 installed so as to hook between the members. One guide shaft 35 holds a pair of sliding members 37 and 38 freely movably forward and backward in an axis direction, which are positioned between the movable members 32 and 34.

A drive motor (drive means) 39 is fixed to the sidewall 3a, a left screw area 40a and a right screw area 40b are formed throughout a distance on a drive shaft 40, which is driven to rotate by the drive motor 39, the left screw area 40a is screwed into the sliding member 37 in a penetrated state, and the right screw area 40b is screwed into the sliding member 38 in a penetrated state.

Due to operation of the left screw area 40a and the right screw area 40b, the sliding members 37 and 38 approach with each other by the same quantity when the drive shaft 40 positively rotates, and the sliding members 37 and 38 separate from each other by the same quantity when the drive shaft 40 reversely rotates. Sandwiching surfaces of the sliding members 37 and 38 may be provided with coating or a layer such as rubber having antislip function.

<Nose Pad Supporting Mechanism 30>

Figure 11:
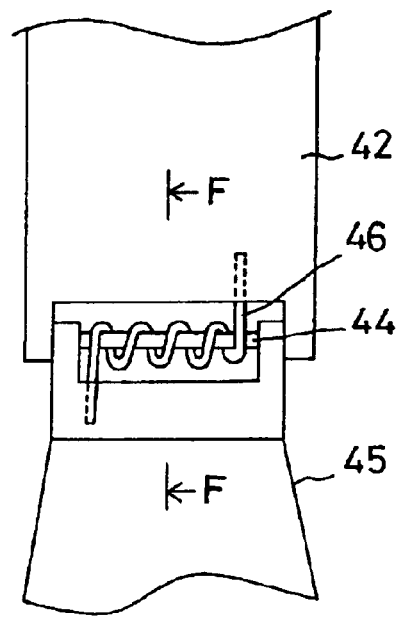
FIG. 11 is an exemplary view of the nose pad supporting mechanism in FIG. 8 when viewed from an arrow E direction.
Figure 12:
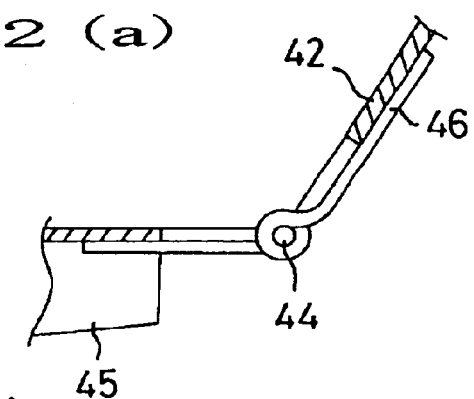
FIG. 12(a) is a cross-sectional view taken along a line F—F in FIG. 11.
FIG. 12(b) is a schematic perspective view of the nose pad supporting member in FIG. 11.
FIG. 12(c) is a schematic perspective view showing a variation example of the nose pad supporting member in FIG. 11.
Figure 12:
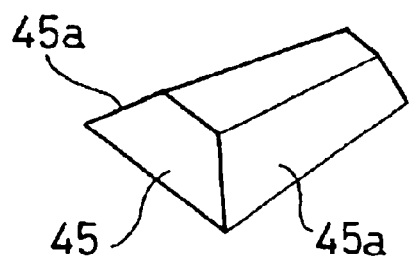
Figure 12:
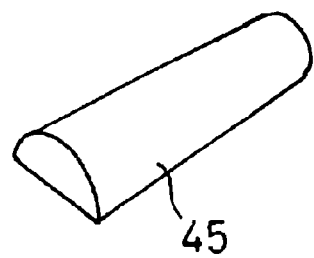

The nose pad supporting mechanism (elevating support means for eyeglasses) 30 has a support shaft 41 attached to a center in right and left directions of the frame holding member 29 as shown in FIG. 9, a rotation plate 42 held by the support shaft 41 freely rotatively up and down, a torsion coil spring 43 that is wound around the support shaft 41 and energizes the rotation plate 42 upward in a rotating manner as shown in FIGS. 9 and 10, a support shaft 44 held at an end of the rotation plate 42 as shown in FIG. 11, a nose pad supporting member 45 held by the support shaft 44 freely rotatively as shown in FIGS. 11 and 12 and a torsion coil spring 46 that is wound around the support shaft 44 and energizes the nose pad supporting member 45 upward in a rotating manner.

Figure 13:
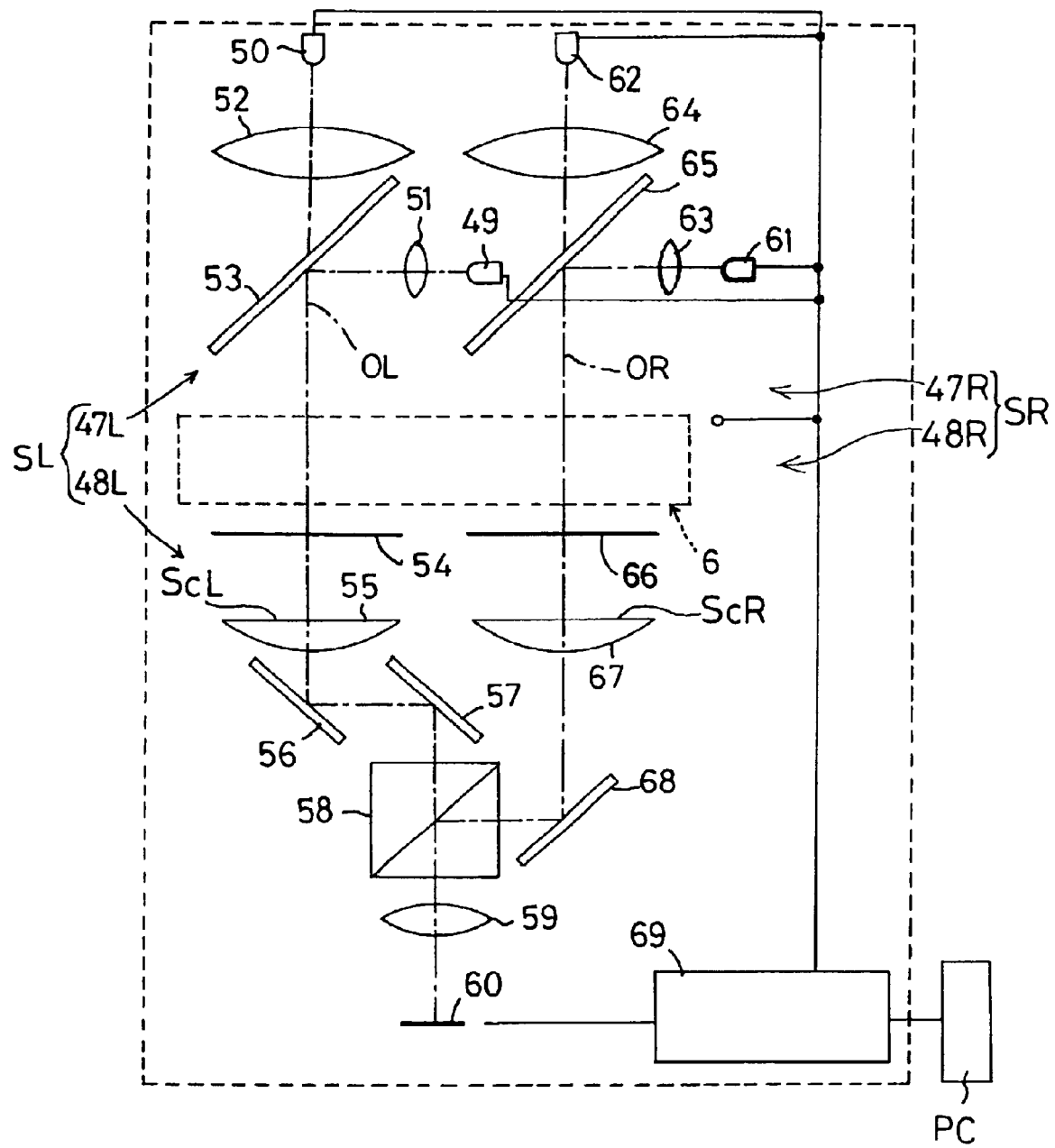
FIG. 13 is an exemplary view of a measurement optical system of the lens meter shown in FIGS. 1 to 12.

The nose pad supporting member 45 can have: a tapered shape whose right and left sides 45a and 45a spread as they go downward as shown in FIG. 12(b); or a hog-backed shape as shown in FIG. 12(c). The nose pad supporting member 45 contacts and supports nose pads NP and NP of right and left lens frames LF and RF of the eyeglasses 5. Then, if the nose pad supporting member 45 supports the nose pads NP and NP of the eyeglasses 5, the bridge B of the eyeglasses 5 is made to position at the center in the right and left directions of unit body 1, and the eyeglass lenses LL and RL of the eyeglasses 5 are thus made to face accurately optical paths of a pair of right and left measurement optical systems SL and SR positioned at right and left of the unit body 1 (refer to FIG. 13).

<Measurement Optical System>
(Left Measurement Optical System SL)

The measurement optical system SL has a light-emitting optical system (illumination optical system) 47L built in the upper case 2 and a light-receiving optical system 48L built in the lower case 3.

The light-emitting optical system 47L consists of: LEDs 49 and 50 collimating lenses 51 and 52; and a dichroic mirror 53. The LED 49 emits infrared ray and the LED 50 emits red ray (wavelength: 630 nm). The dichroic mirror 53 reflects the infrared ray and transmits the red ray. The collimating lenses 51 and 52 function to convert a divergent luminous flux generated from the LEDs 49 and 50 into a parallel luminous flux as the measurement luminous flux.

Further, the light-receiving optical system 48L has a Hartman's pattern plate 54, a field lens 55 provided with a screen surface ScL, reflection mirrors 56 and 57, an optical path synthesizing prism 58, an imaging lens 59 and a CCD (light-receiving element, light-receiving means) 60 as an image-detecting device. A large number of light transmission areas (not shown) are provided in a matrix state on the pattern plate 54. The light transmission areas may be transparent holes or a large number of lens arrays. Accordingly, the pattern plate 54 is capable of separating the measurement luminous flux into a large number of measurement luminous fluxes.

It should be noted that an axis of the lens receiving shaft 86 in the lens receiving mechanism 80L is provided in parallel with a measurement optical axis of the measurement optical system SL.

(Right Measurement Optical System SR)

The measurement optical system SR has a light-emitting optical system (illumination optical-system) 47R built in the upper case 2 and a light-receiving optical system 48R built in the lower case 3.

The light-emitting optical system 47R consists of: LEDs 61 and 62 collimating lenses 63 and 64 and a dichroic mirror 65. The LED 61 emits infrared ray and the LED 62 emits red ray (wavelength: 630 nm). The dichroic mirror 65 reflects the infrared ray and transmits the red ray. The collimating lenses 63 and 64 function to convert a divergent luminous flux generated from the LEDs 61 and 62 into the parallel luminous flux as the measurement luminous flux.

Further, the light-receiving optical system 48R has a Hartman's pattern plate 66, a field lens 67 provided with a screen surface ScR, a reflection mirror 68, the optical path synthesizing prism 58, the imaging lens 59 and the CCD (shared by the left measurement optical system SL) 60. A large number of light transmission areas (not shown) are provided in a matrix state on the pattern plate. 66. The light transmission areas may be transparent holes or a large number of lens arrays. Accordingly, the pattern plate 66 is capable of separating the measurement luminous flux into a large number of measurement luminous fluxes.

It is noted that an axis of the lens receiving shaft 86 in the lens receiving mechanism 80R is provided in parallel with a measurement optical axis of the measurement optical system SL. When the light-receiving element of the left measurement optical system SL and the right measurement optical system SR is made to be a common CCD 60, refraction characteristics of the right and left eyeglass lenses LL and LR can be measured approximately simultaneously with less optical parts.

Moreover, although the light-receiving element of the left measurement optical system SL and the right measurement optical system SR is the common CCD 60 in this embodiment, the CCD 60 may be individually provided to, the left measurement optical system SL and the right measurement optical system SR severally. In this case, the refraction characteristics of the right and left eyeglass lenses LL and LR can be measured completely simultaneously.

<Control Circuit>

Then, output from the CCD 60 is input to an arithmetic control circuit 69. Output from the arithmetic control circuit 69 is input to a personal computer PC. Further, a sensor 70 for detecting the operation lever 19 being declined horizontally is provided to the sidewall 3a, and output from the sensor 70 is input to the arithmetic control circuit 69. When a detection signal from the sensor 70 ends, the arithmetic control circuit 69 allows the drive motor 39 to have positive rotation for a predetermined time to positively rotate the drive shaft 40. In addition, when the arithmetic control circuit 69 detects the detection signal from the sensor 70, it allows the drive motor 39 to have reverse rotation to reversely rotate the drive shaft 40.

[Operation]

Next, operation of the lens meter having the foregoing configuration will be described.

Figure 4:
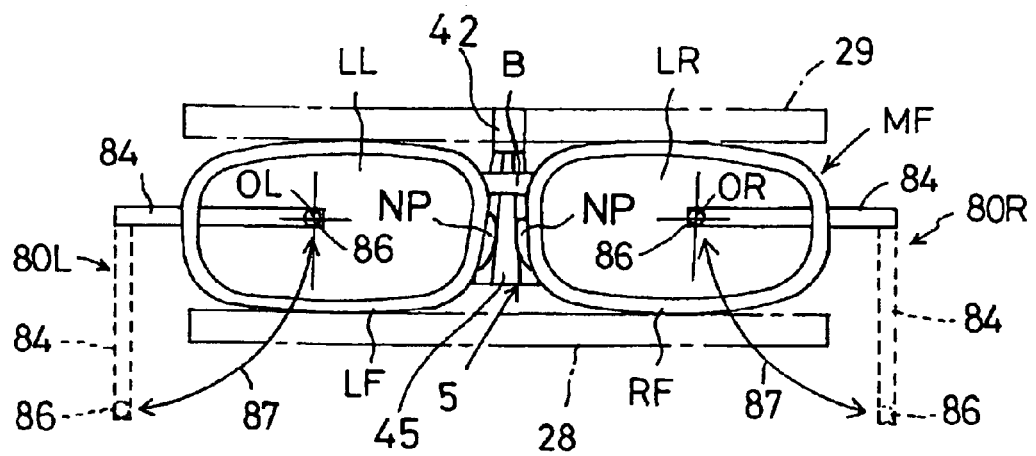
FIG. 4 is a plan view showing a relation between the lens receiving mechanism in FIG. 3 and eyeglasses.

In this configuration, before the eyeglass lenses LL and LR is arranged in the space 6 in FIG. 1, far ends of the arms 85 and 85 of the lens receiving mechanisms 80L and 80R are made to face with each other as shown by solid lines in FIGS. 3 and 4, and the lens receiving shafts 86 and 86 of the lens receiving mechanisms 80L and 80R are elevated to a position shown by the solid lines to allow the upper ends of the lens receiving shafts 86 and 86 to protrude upward from the opening 8 as shown by the solid lines in FIG. 3. Further, upper end heights of the hemispherical lens receiving areas 86a and 86a of the lens receiving shafts 86 and 86 are set to the same dimension. In this position, axes of the lens receiving shafts 86 and 86 are made to match optical axes OL and OR of the right and left measurement optical systems. Note that the lens pressing shafts 26 and 26 are off upward from the lens receiving shaft 86 as shown by broken lines in FIG. 3. The setting space 6 is practically formed between the lens pressing shafts 26 and 26 and the lens receiving shaft 86.

In this state, the eyeglasses 5 are placed in the setting space 6, the left eyeglass lens LL of the eyeglasses 5 is disposed between the left lens receiving shaft 86 and the lens pressing shafts 26 and 26, and the right eyeglass lens LR of eyeglasses 5 is disposed between the right lens receiving shaft 86 and the lens pressing shafts 26 and 26. At this point, the temples LT and RT are disposed at right and left sides of the lower case 3.

Then, the nose pad supporting member 45 is made to contact with and support the nose pads NP and NP of the right and left lens frames LF and RF of the eyeglasses 5. Thus, the right and left eyeglass lenses LL and LR of the eyeglasses 5 can be accurately distributed relative to the right and left measurement optical systems SL and SR. In this state, when the nose pad supporting member 45 is moved downward resisting spring force of the torsion coil springs 43 and 46, bottom surfaces (rear refraction surface) of the eyeglass lenses LL and LR of the eyeglasses 5 contact and are supported by points on the hemispherical lens receiving areas 86a and 86a of the lens receiving shafts 86 and 86 as shown in FIG. 3.

When the operation lever 9 is declined to the front from this state, a lever detection signal from the sensor 70 that has been input to the arithmetic control circuit 69 ends at the beginning of declining the lever, and the arithmetic control circuit 69 positively rotates the drive motor 39 for a predetermined time. Accordingly, the drive shaft 40 is positively rotated, and the sliding members 37 and 38 are moved in directions where they approach each other due to the operation of the left screw area 40a and right screw area 40b of the drive shaft 40.

At this point, the movable members 32 and 34 severally follow the sliding members 37 and 38 by spring force of the coil spring 36 to make the frame holding members 28 and 29 move in directions where they approach each other. The frame holding members 28 and 29 are designed to move relative to the optical axes OL and OR of right and left measurement optical systems SL and SR by the same quantity to keep distances to the optical axes OL and OR equal. Further, the frame holding members 28 and 29 contact the eyeglass frame MF (lens frames LF and RF) of the eyeglasses 5 by spring force of the coil spring 36 with this movement, and hold (sandwich) the eyeglass frame MF of the eyeglasses 5 from front and rear.

Moreover, the sliding members 37 and 38 are moved to the position shown in FIG. 7 due to the operation of the left screw area 40a and right screw area 40b of the drive shaft 40 even after the frame holding members 28 and 29 contact with the eyeglass frame MF (lens frames LF and RF) of the eyeglasses 5.

Movement to this position can be obtained by setting a positive rotation time of the drive motor 39. Note that a detection means such as a switch and a sensor may detect the position to stop the drive motor 39.

On the other hand, when the operation lever 9 is declined to the front, rotation of the operation lever 9 is transmitted to the gear 17 to move the rack 16 rightward as viewed in FIG. 5, and the cam member 15 is moved rightward together with the rack 16. Thus, the support shaft 22 moves down along a slant surface 15a of the cam member 15 by spring force of the coil spring 23, and the support shaft 22, supporting member 25 and lens pressing shafts 26 and 26 are displaced downward with spring force of the coil spring 23. At this time, the operation lever 19 is held by the user to keep the right and left lens pressing shafts 26, 26 and 26, 26 from contacting the eyeglass lenses LL and LR until the frame holding members 28 and 29 contact to hold the eyeglass frame MF (lens frames LF and RF of the eyeglasses.

Then, after the frame holding members 28 and 29 contact with the eyeglass frame MF (lens frames LF and RF) of the eyeglasses 5, the operation lever 19 is declined to the front at a horizontal position to allow the right and left lens pressing shafts 26, 26 and 26, 26 to contact and hold the eyeglass lenses LL and RL from above severally.

As described, when the operation lever 9 is declined horizontally to the front as shown by an arrow 27 in FIG. 1, the gear 17 moves to displace the rack 16 rightward in FIG. 5, the cam member 15 is displaced rightward together with the rack 16, and the support shaft 22, supporting member 25 and lens pressing shafts 26 and 26 are displaced downward with spring force of the coil spring 23 along a cam surface on the upper surface of cam member 15. With this displacement, in the lens pressing mechanisms 13 and 13 provided to each of the bright and left supporting members 25, one of the lens pressing shafts 26 and 26 contacts the eyeglass lens LL (LR) first.

However, since the rotation support shaft 24, the supporting member 25 and the support shaft 22 are spring-energized downward by the coil spring 23 and the supporting member 25 is supported by the support shaft 22 freely rotatably centering the rotation support shaft 24 that is horizontal in front and rear directions, the right and left portions of the supporting member 25 rotate up and down centering the rotation support shaft 24 due to downward spring-energizing force of the coil spring 23, the other one of the lens pressing shafts 26 and 26 of supporting member 25 also contacts the eyeglass lens LL (LR), and a pair of the lens pressing shafts 26 and 26 press right and left portions of the eyeglass lens LL (LR) from the above severally.

Next, the elevating means 83 and 83 of the lens receiving mechanism 80L and 80R are operated to allow the support shafts 84 and 84, the arms 85 and 85 and the lens receiving shafts 86 and 86 to move down to the position shown by broken lines in FIG. 3.

At this point, since the bridge B of the eyeglass frame MF of the eyeglasses 5 is supported from underneath by the nose pad supporting member 25, the eyeglass lenses LL and LR are pressed from above by the lens pressing shafts 26, 26 and 26, 26, and the eyeglass frame MF is supported (sandwiched) by the frame supporting members 28 and 29 from front and rear, the position of the eyeglass frame MF in front and rear directions and the height (position) of the eyeglass lenses LL and LR in vertical directions do not shift even if the lens receiving shafts 86 and 86 move down.

Then, the drive units 81 and 81 of the lens receiving mechanisms 80L and 80R are driven to drive and rotate the rotation stage 82, the support shafts 84 and 84, the arms 85 and 85 and the lens receiving shafts 86 and 86 are rotated to the position shown in broken lines in FIG. 4 as shown in arrows 87 and 87, and the arms 85 and 85 and the lens receiving shafts 86 and 86 are severally withdrawn from optical paths of the measurement optical systems.

Subsequently, the arithmetic control circuit 69 sequentially turns on the LEDs 49 and 50 of the measurement optical system SL to perform measurement of the eyeglass lens LL.

At this point, the measurement luminous flux from the LED 49 is made to be a parallel luminous flux by the collimating lens 51, and it is reflected on the dichroic mirror 53 and emitted to the eyeglass lens LL. Accordingly, the measurement luminous flux that has passed through the eyeglass lens LL passes the pattern plate 54, and a pattern of the luminous flux that has passed through the plate forms an imaged on the screen surface ScL. The pattern of luminous flux whose image has been formed on the screen surface ScL is projected on the CCD 60 via the field lens 55, the reflection mirrors 56 and 57, the optical path synthesizing prism 58 and the imaging lens 59, and a pattern image of the pattern plate 54 is formed on the CCD 60.

Further, the measurement luminous flux from the LED 50 is made to be a parallel luminous flux by the collimating lens 51, it passes the dichroic mirror 53 and emitted to the eyeglass lens LL. Accordingly, the measurement luminous flux that has passed through the eyeglass lens LL passes the pattern plate 54, and a pattern of the luminous flux that has passed through the plate is projected on the screen surface ScL. The pattern of luminous flux whose image has been projected on the screen surface ScL is projected on the CCD 60 via the field lens 55, the reflection mirrors 56 and 57, the optical path synthesizing prism 58 and the imaging lens 59, and a pattern image of the pattern plate 54 is formed on the CCD 60. Then, the arithmetic circuit 69 measures refraction characteristics of each portion of the eyeglass lens LL using the state of pattern image formed on the CCD 60, and mapping data of refraction characteristics is thus obtained.

Thereafter, the arithmetic control circuit 69 sequentially turns on the LEDs 61 and 62 of the measurement optical system SR to perform measurement of the eyeglass lens LR.

At this point, the measurement luminous flux from the LED 61 is made to be a parallel luminous flux by the collimating lens 63, and it is reflected on the dichroic mirror 65 and emitted to the eyeglass lens LR. Accordingly, the measurement luminous flux that has passed through the eyeglass lens LR passes the pattern plate 66, and a pattern of the luminous flux that has passed through the plate is projected on the screen surface ScR. The pattern of luminous flux whose image has been projected on the screen surface ScR is projected on the CCD 60 via the field lens 67, the reflection mirror 68, the optical path synthesizing prism 58 and the imaging lens 59, and a pattern image of the pattern plate 66 is formed on the CCD 60.

Further, the measurement luminous flux from the LED 62 is made to be a parallel luminous flux by the collimating lens 64, it passes the dichroic mirror 65 and emitted to the eyeglass lens LR. Accordingly, the measurement luminous flux that has passed through the eyeglass lens LR passes the pattern plate 66, and a pattern of the luminous flux that has passed through the plate is projected on the screen surface ScR. The pattern of luminous flux whose image has been projected on the screen surface ScR is projected on the CCD 60 via the field lens 67, the reflection mirror 68, the optical path synthesizing prism 58 and the imaging lens 59, and a pattern image of the pattern plate 66 is formed on the CCD 60. Then, the arithmetic circuit 69 measures refraction characteristics of each portion of the eyeglass lens LR using the state of pattern image formed on the CCD 60, and mapping data of refraction characteristics is thus obtained.

The mapping data of refraction characteristics of the eyeglass lenses LL and LR obtained in this manner is sent to the personal computer PC, and an image is displayed on a monitor (not shown) of the personal computer PC.

Measurement of the refraction characteristics (optical characteristics) of the eyeglass lenses LL and LR is performed as described above. Note that operation control of the foregoing drive unit 81 and the elevating means 83 is performed by the arithmetic control circuit 69. Further, a rotation position and an elevating position of the arm 85 may be detected and decided by a sensor.

With this configuration, the heights of the bottom surfaces of the eyeglass lenses LL and LR are specified more accurately, a distance between the bottom surfaces of the eyeglass lenses LL and LR and the light-receiving means of the light-receiving optical system is made constant more accurately on the measurement optical axes of each of the right and left light-receiving optical systems, and measurement of accurate refraction characteristics of the eyeglass lens can be performed. Specifically, with the configuration of this embodiment, since the bottom surfaces of the eyeglass lenses LL and LR on the measurement optical axes can be always arranged at the same height regardless of the thickness of the eyeglass lenses LL and LR, the curvature of a rear surface of lens (bottom surface), the curvature shape of frame or the like, the distance between the bottom surfaces of the eyeglass lenses LL and LR and the light-receiving means of the light-receiving optical system is made constant more accurately on the measurement optical axes of each of the right and left light-receiving optical systems and measurement of accurate refraction characteristics of the eyeglass lens can be performed.

Moreover, no any member for blocking the measurement luminous flux exists in the optical path of the measurement optical system in measuring the refraction characteristics (optical characteristics) of the eyeglass lens LL (LR), and accurate measurement can be thus made. Configuration is also simple.

In the foregoing example, the elevating means 83 of the lens receiving shaft 86 is rotated by the drive unit 81 to horizontally rotate the arm 84, and thus the lens receiving shaft 86 is moved between the two positions (lens support position and withdrawal position) by the rotating arm 84. But the invention is not limited to this. For example, the elevating means 83 of the lens receiving shaft 86 is linearly driven back and forth, and thus the lens receiving shaft 86 may be linearly moved back and forth between the two positions (lens support position and withdrawal position).

[Second Embodiment of the Invention]

[Configuration]

FIGS. 14 to 29 are ones showing the second embodiment of the present invention. In the second embodiment of the invention, description will be made by adding the same reference numerals as the first embodiment to the same or similar parts as ones used in the first embodiment of the invention.

Figure 14:
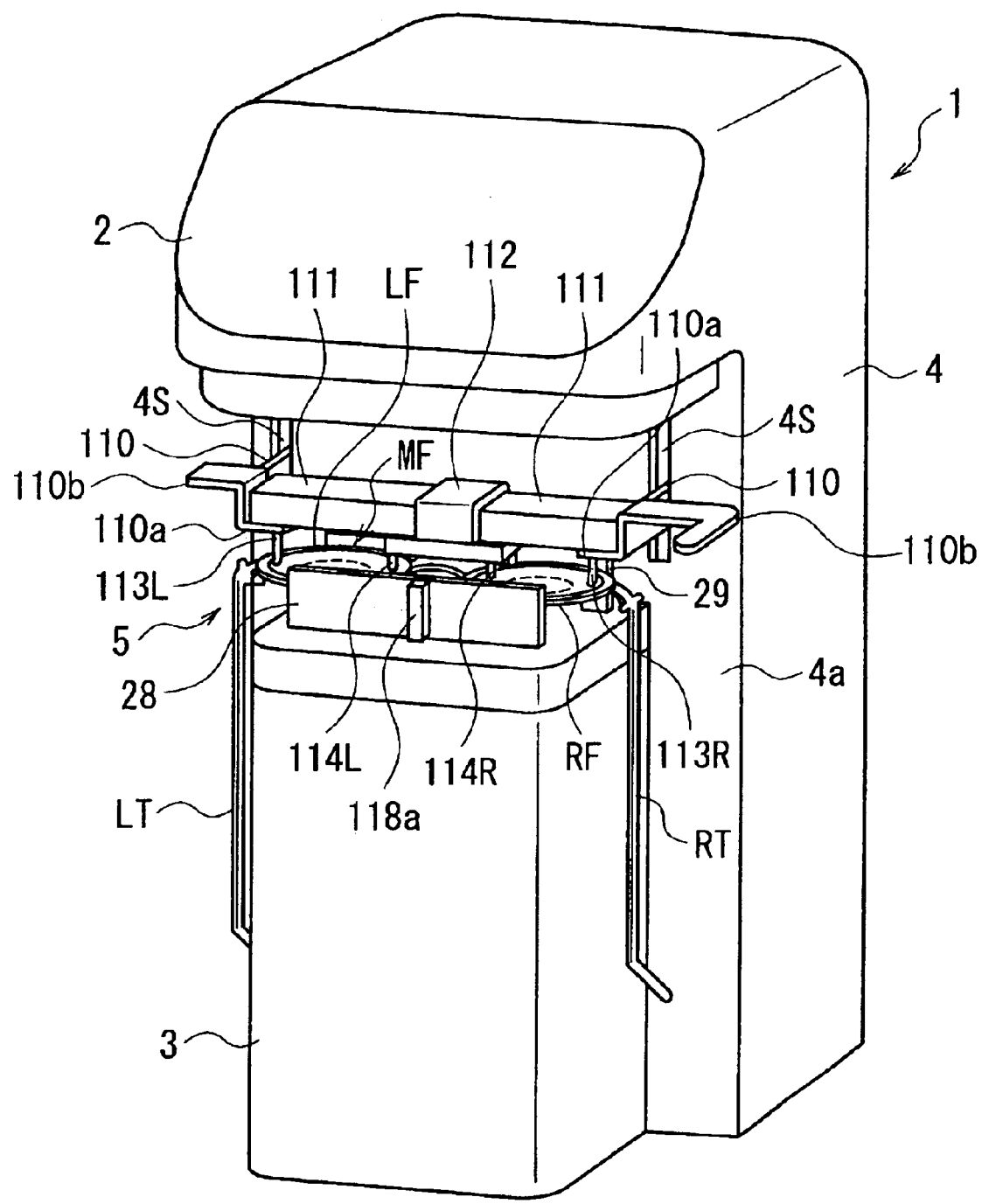
FIG. 14 is a perspective view of a lens meter according to a second embodiment of the present invention.
Figure 27:
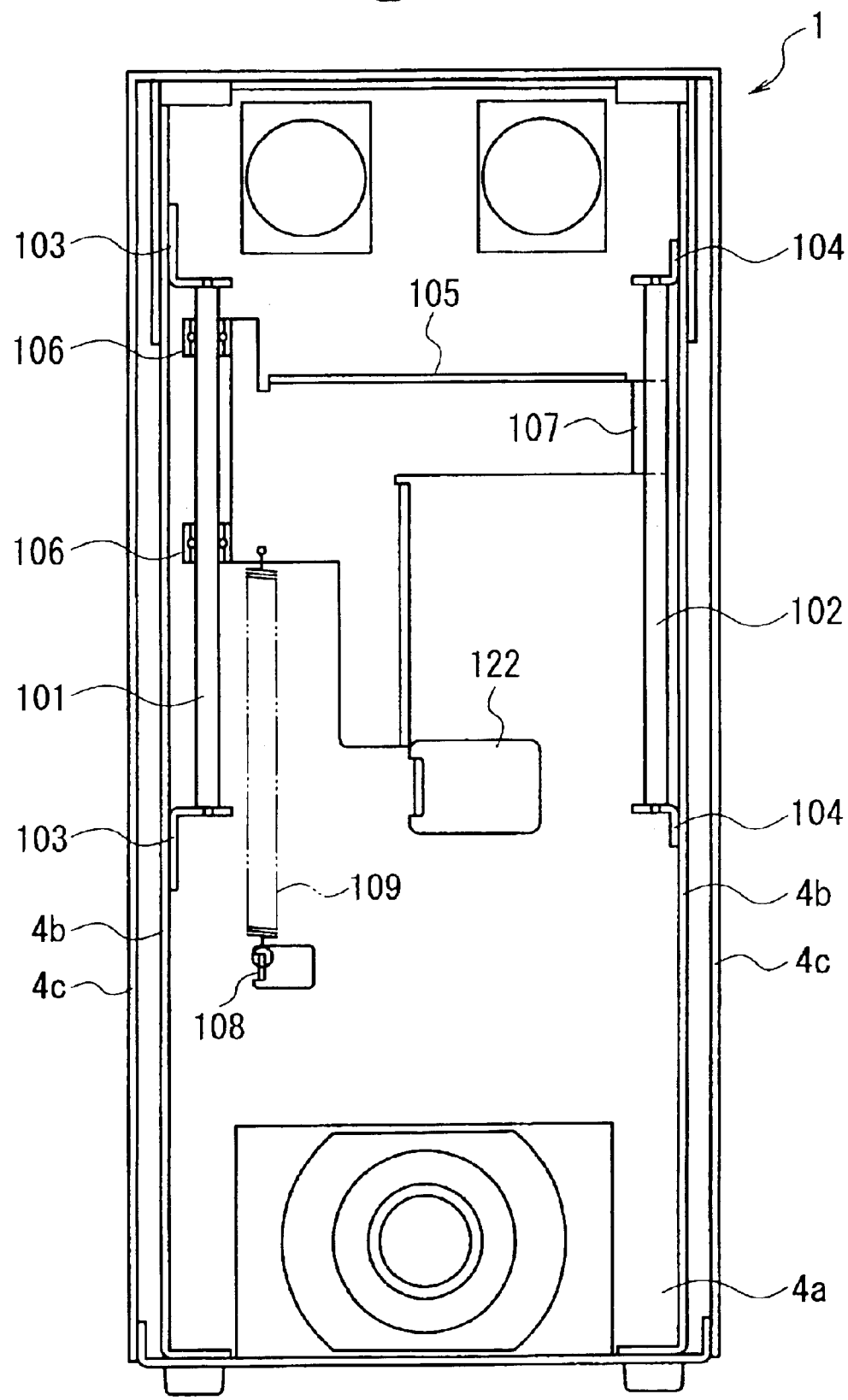
FIG. 27 is a cross-sectional view taken along a line K—K in FIG. 15.
Figure 28:
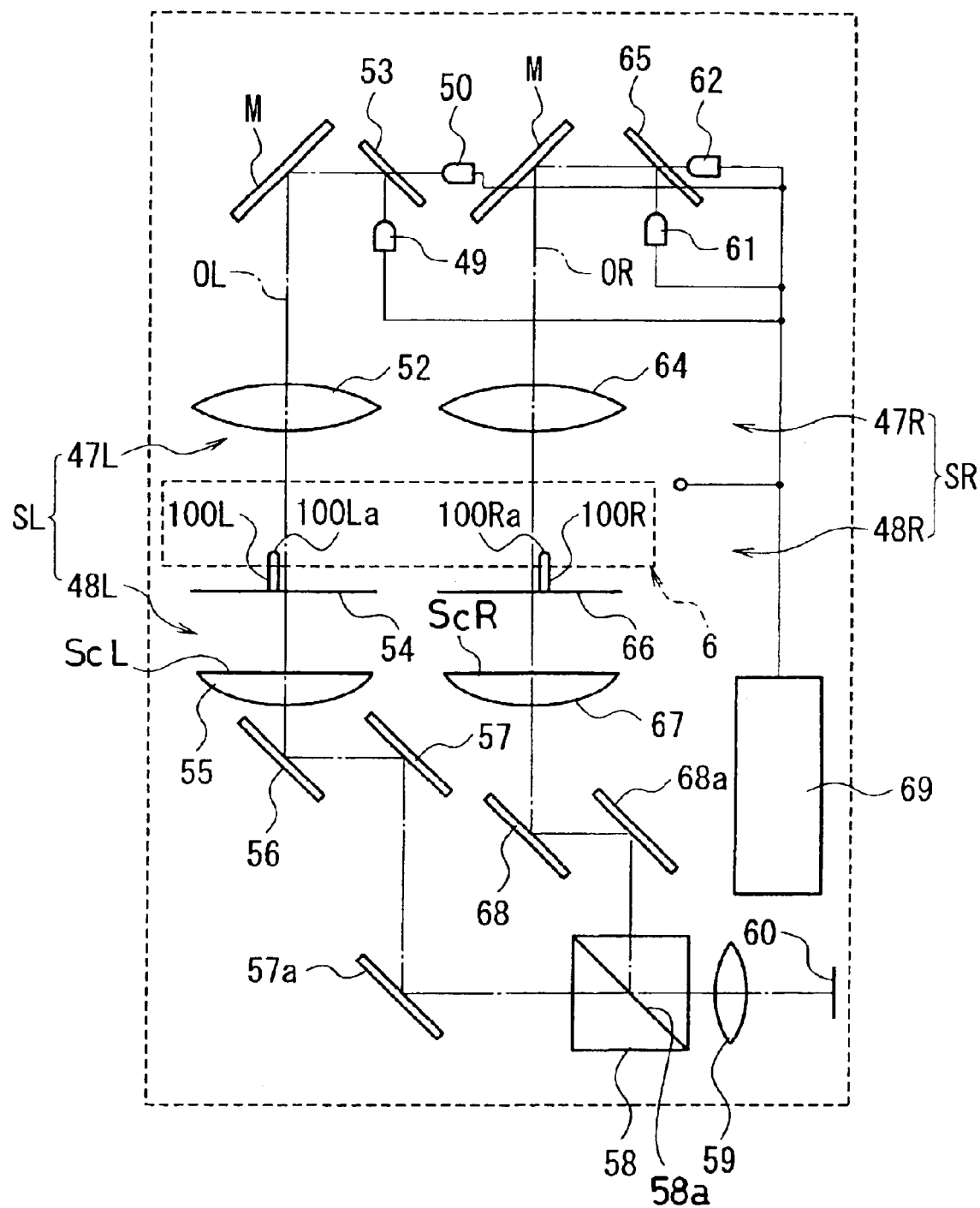
FIG. 28 is an exemplary view showing an optical system of the lens meter shown in FIGS. 14 to 27.
Figure 29:
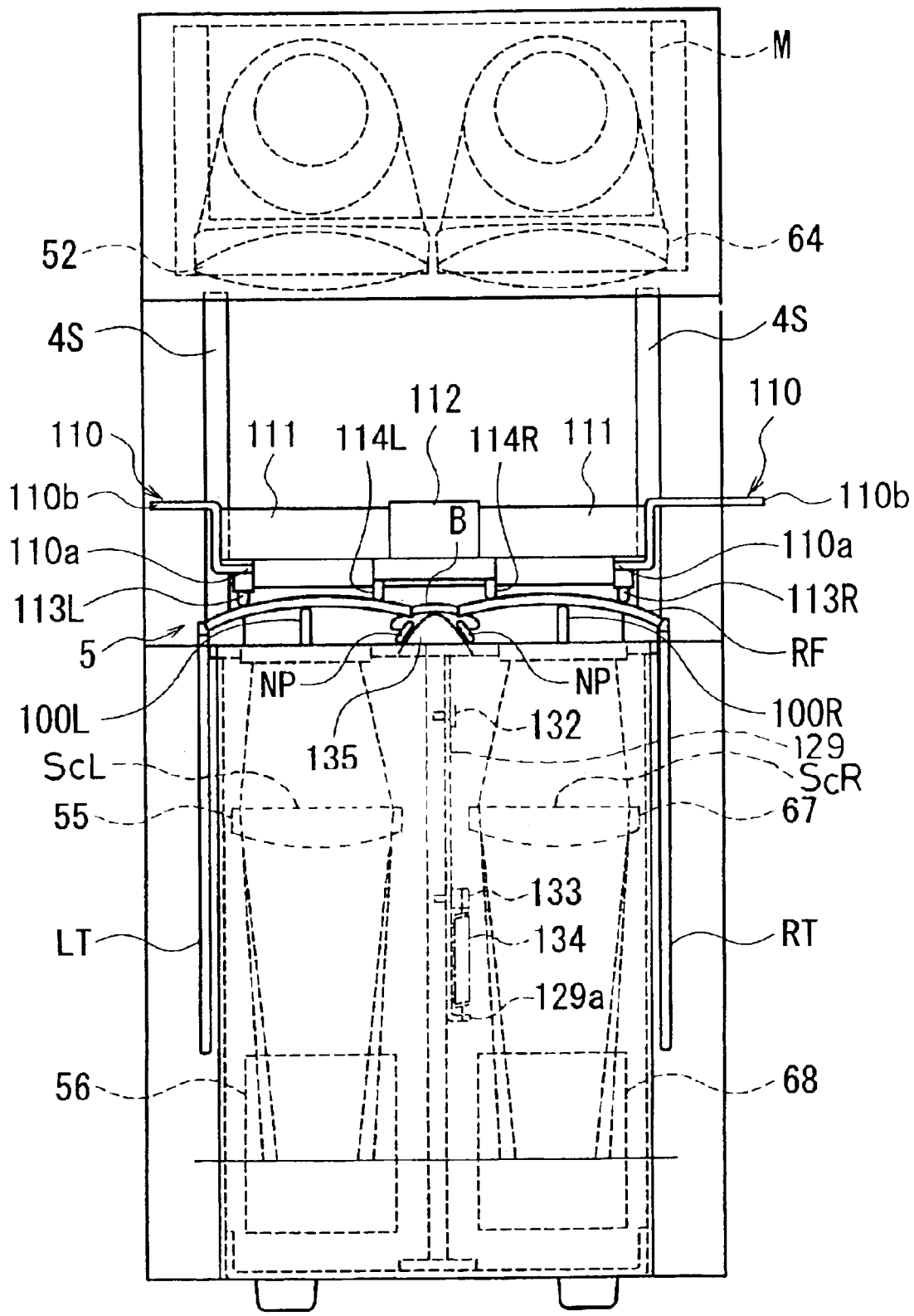
FIG. 29 is a front view of the lens meter when eyeglasses are set as in FIG. 14 on the lens meter in FIG. 16 in a state where the frame holding member in a front area of FIG. 16 is not shown.

In FIG. 14, the unit body 1 has: the upper case 2; the lower case 3; a connecting case 4 which connects the cases 2 and 3. The connecting case 4 is formed wider than the lower case 3 which is provided so as to protrude forward from the front wall 4a of the connecting case 4. Slits 4S and 4S extending vertically are formed on right and left areas of the front wall 4a. Further, the connecting case 4 has right and left sidewalls 4b and 4b and cover plates 4c and 4c covering the sidewalls 4b and 4b as shown in FIGS. 19 and 27.

<Lens Receiving Mechanism>

Figure 16:
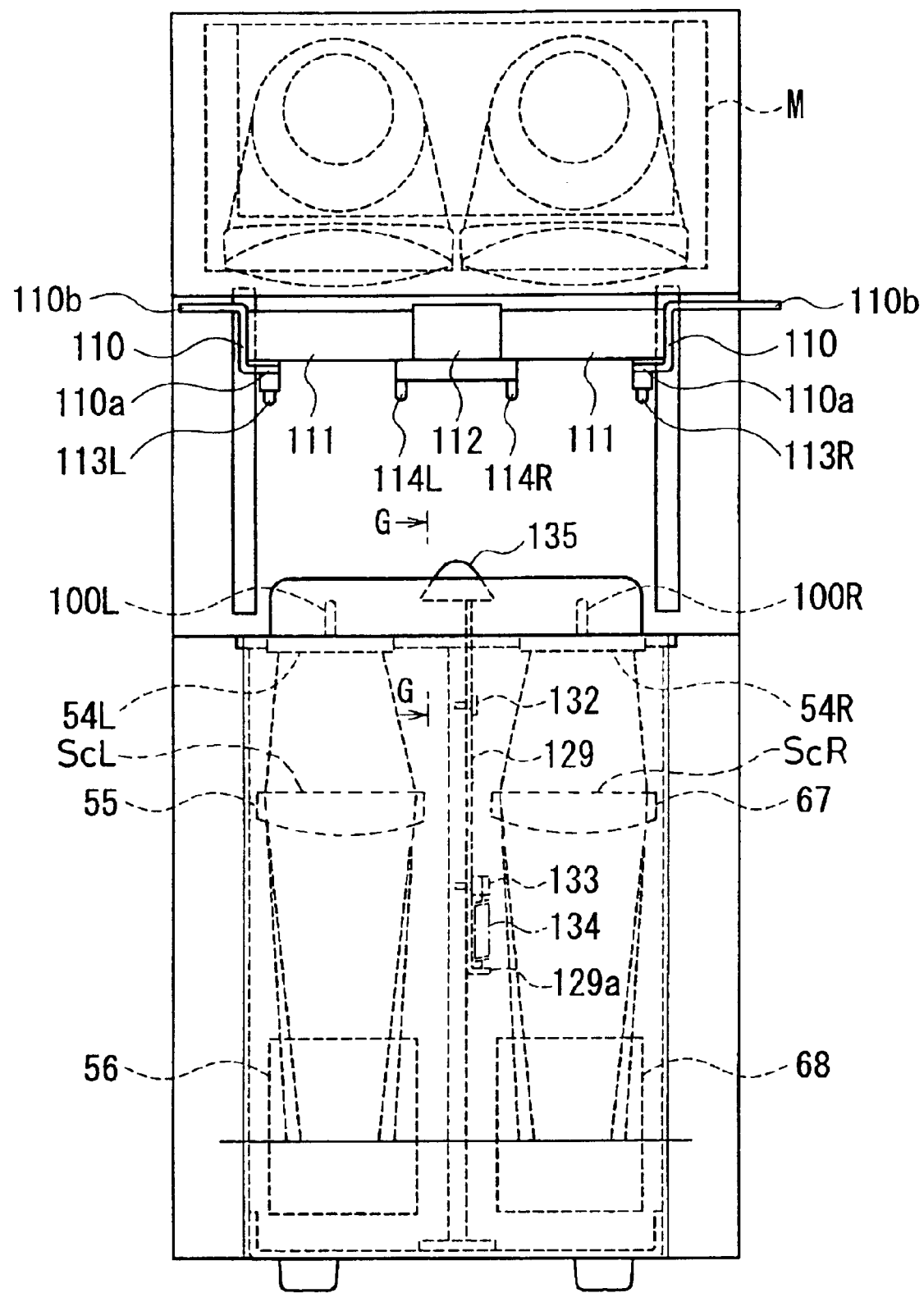
FIG. 16 is a front view of the lens meter in FIG. 14 in a state where eyeglasses are not set thereon.
Figure 17:
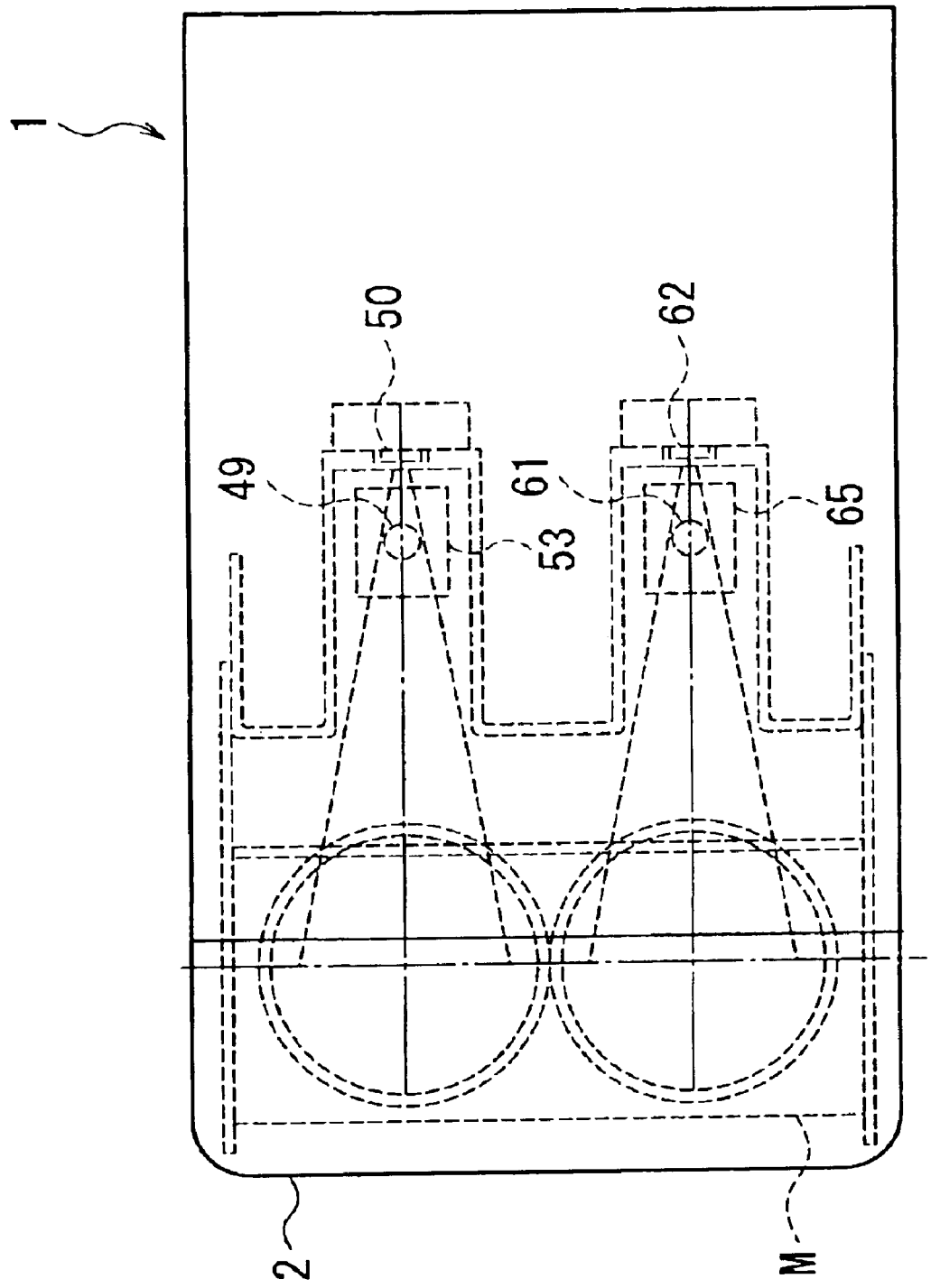
FIG. 17 is a plan view of the lens meter in FIG. 14.
Figure 19:
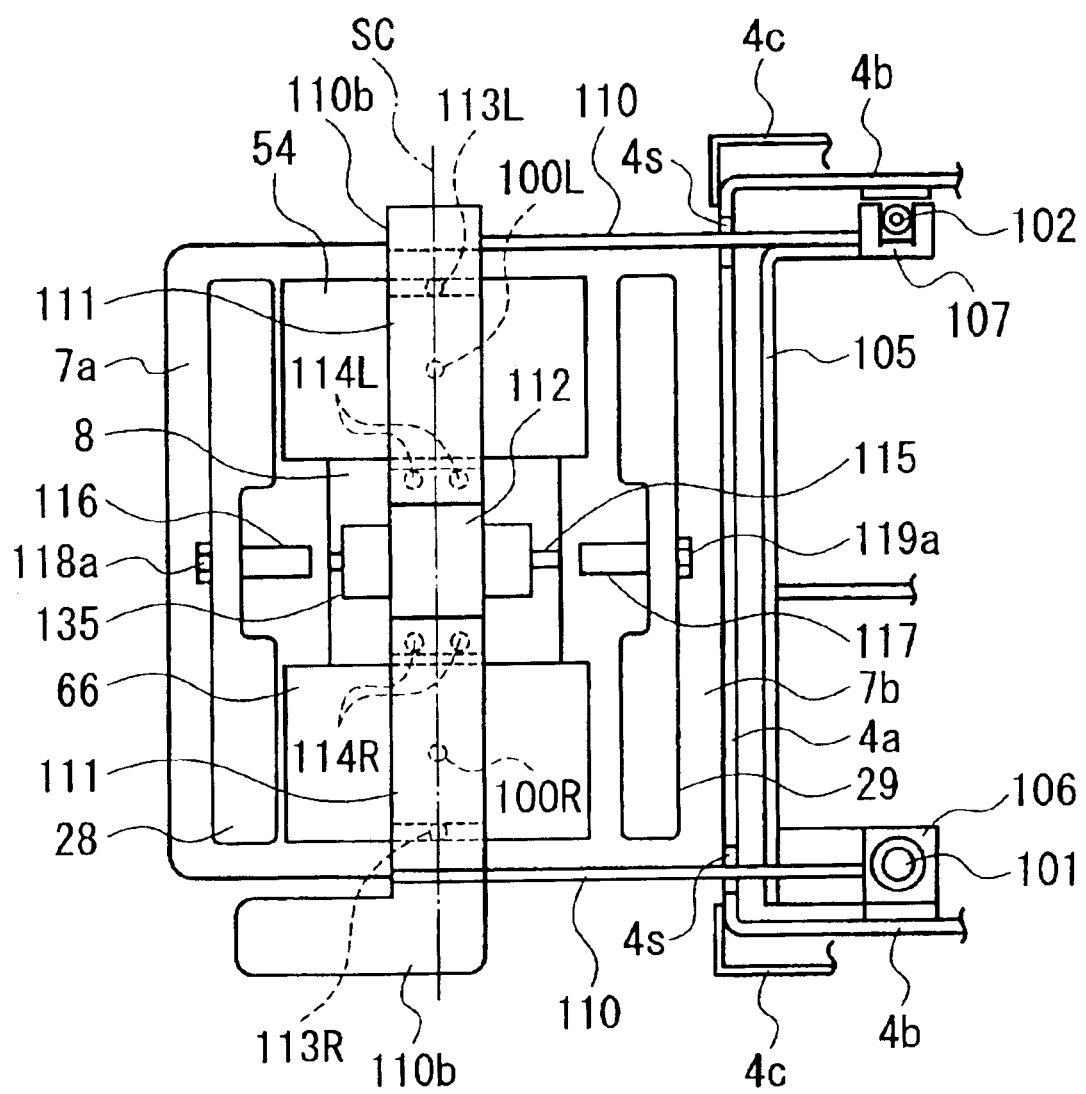
FIG. 19 is a cross-sectional view taken along a line B—B in FIG. 15.
Figure 2:
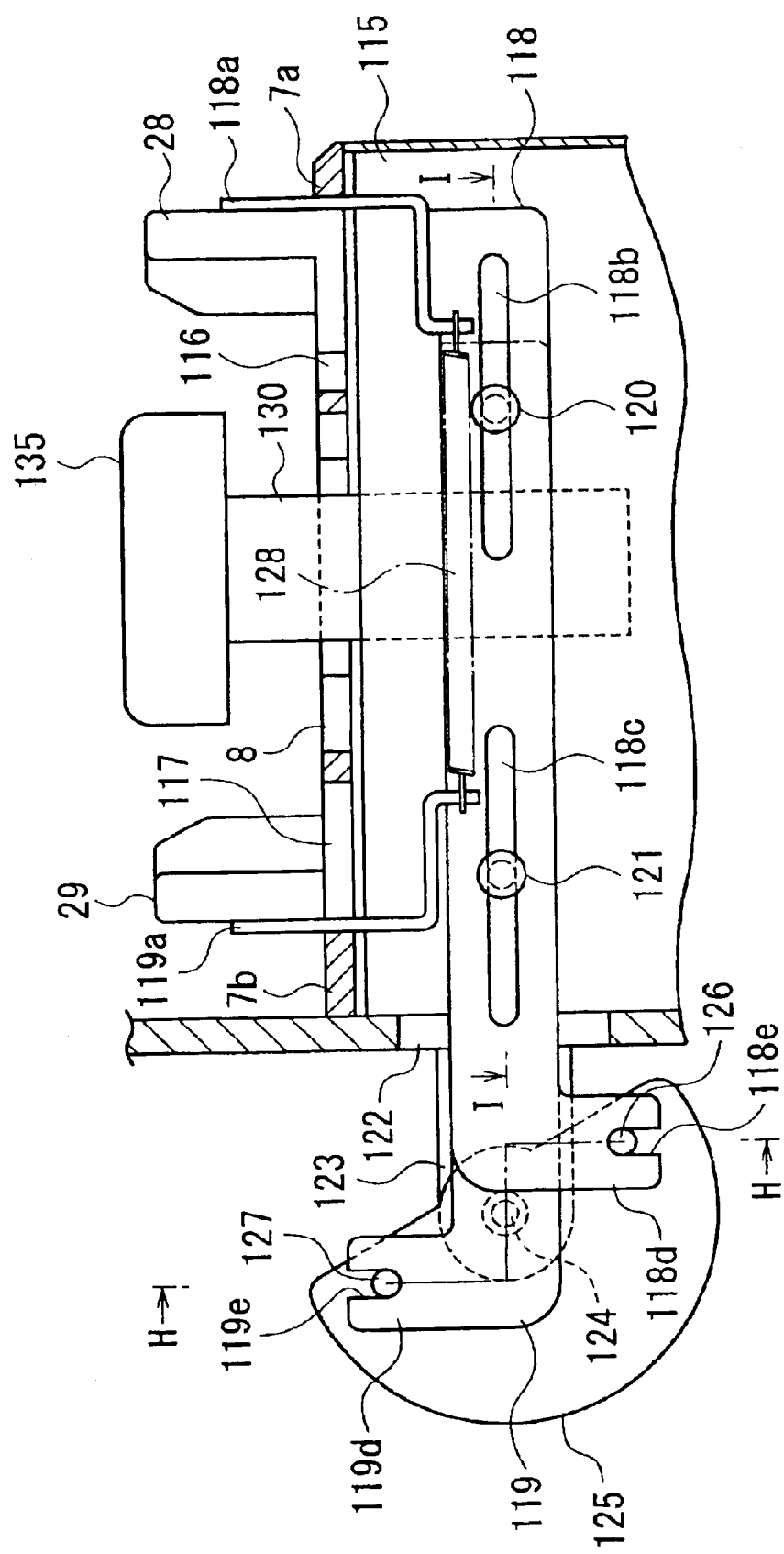
Figure 2:
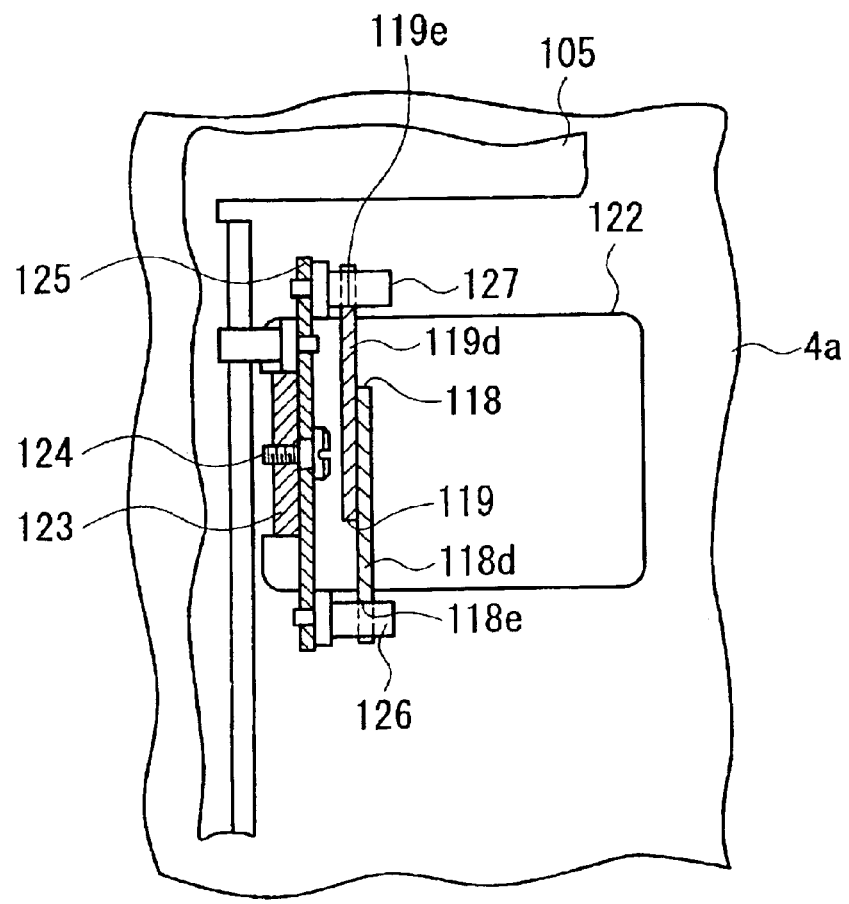
Figure 2:
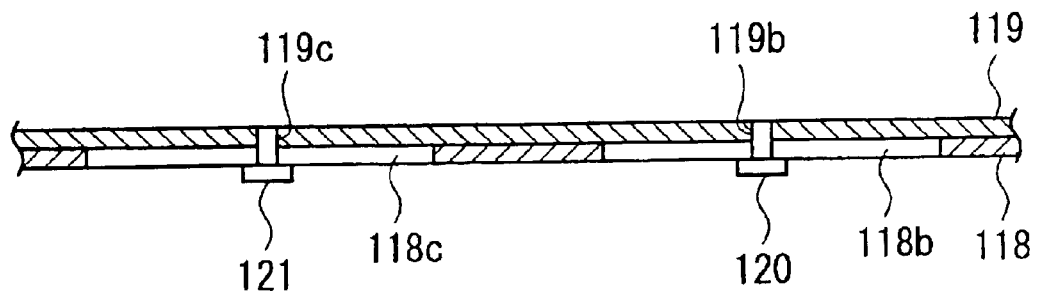

The opening 8 extending to right and left is formed at right and left areas of the upper wall 7 of the lower case 3 as shown in FIGS. 16 and 19. Hartman's pattern plates 54 and 66 extending in front and rear and formed in the same shape as the pattern plate 54 are attached to the right and left areas of the opening 8.

Lens receiving shafts 100L and 100R of a bar shape as the lens receiving structure are provided upward at an approximate central area of upper surfaces of the pattern plates 54 and 66 in a protruding manner. The lens receiving shafts 100L and 100R are provided in positions slightly off from the centers (measurement optical axes OL and OR) of the pattern plates 54 and 66 to right and left. Note that the upper wall 7 is divided into the front upper wall area 7a and the rear upper wall 7b by the opening 8.

Furthermore, the upper ends of the lens receiving shafts 100L and 100R are formed in a hemispheric shape into lens receiving areas 100La and 100Ra. Accordingly, when the eyeglass lenses LL and LR of the eyeglasses 5 are supported on the lens receiving shafts 100L and 100R from above as in FIG. 30, any position of rear refraction surfaces of the eyeglass lenses LL and LR can be supported with a point (point contact). In addition, the heights of the upper ends of the lens 20 receiving areas 100La and 100Ra are set in the same dimension.

The eyeglass lenses LL and LR supported by the lens receiving shafts 100L and 100R are pressed from above by the following lens pressing mechanisms.

<Lens Pressing Mechanism>

The lens pressing mechanism has guide rods (guide member) 101 and 102 disposed upward and downward at right and left sides of the connecting case 4, brackets 103 and 103 that attach upper and lower ends of the guide rod 101 to one of the sidewalls 4b and 4b and the brackets 104 and 104 that attach upper and lower ends of the guide rod 102 to the other one of the sidewalls 4b and 4b. The brackets 103 and 104 are removably attached to the sidewalls 4b and 4b with screws (not shown).

Further, the lens pressing mechanism has a sliding plate (elevating member) 105 disposed between the guide rods 101 and 102 and bearings 106 and 106 that support one side of the sliding plate 105 freely movably up and down relative to the guide rod 101. A guide (engaging part) 107 of a reverse 'C' letter shape, which engages with the guide rod 102, is formed to the other side of the slide plate 105.

Furthermore, the lens pressing mechanism has a spring receiver 108 that protrudes at a lower area of the front wall 4a and positions below the sliding plate 105, a coil spring (energizing means) 109 that is installed so as to hook between the sliding plate 105 and the spring receiver 108 and spring-energizes the sliding plate 105 downward and a pair of arms 110 and 110 whose one ends (rear ends) are severally fixed to both sides of the sliding plates 105. A pair of the arms 110 and 110 extend to the front, and the other ends thereof (front ends) protrude from the slits 4S and 4S. Further, as shown in FIGS. 14, 16 and 19, shaft attaching plates 110a and 110a protruding in directions where they approach each other are integrally formed to the lower edges of the front ends of a pair of the arms 110 and 110 severally, and operation parts (operation knob) 110b and 110b protruding in directions where they separate from each other are integrally formed to the upper edges of the front ends of a pair of the arms 110 an 110.

Moreover, the lens pressing mechanism has supporting members 111 and 111 removably attached on the shaft attaching plates 110a and 110a in right and left directions severally, a shaft attaching member 112 removably installed so as to hook between the supporting members 111 and 111, lens pressing shafts (lens pressing member) 113L and 113R severally attached to bottom surfaces of the shaft attaching plates 110a and 110a and lens pressing shafts (lens pressing member) 114L and 114R severally attached to the both sides (right and left) of the bottom surfaces of the shaft attaching member 112. The lower ends of the lens pressing shafts 113L, 113R, 114L and 114R are formed in a hemispheric shape. A plane Sc including the center lines of the lens pressing shafts 113L and 113R includes the center lines of the lens receiving shafts 100L and 100R. Moreover, the lens pressing shafts 114L and 114R are severally provided in a pair with a distance in front and rear directions. Additionally, the lens pressing shafts 114L and 114L are symmetrically arranged centering the plane Sc, and the lens pressing shafts 114R and 114R are also symmetrically arranged centering the plane Sc. Therefore, as shown in FIG. 19, since the lens receiving shaft 100L is within a triangle formed by three points of the lens pressing shafts 113L, 114L and 114L and the lens receiving shaft 100R is within a triangle formed by three points of the lens pressing shafts 113R, 114R and 114R, they severally support and stabilize the eyeglass lenses LL and LR by the three points from above.

Although not shown, when the operation parts (operation knob) 110b and 110b are grabbed to move the arms 110 and 110 to the vicinity of the upper case 2, the arms 110 and 110 are hooked on the upper case 2 or the connecting case 4 by a hooking means (not shown) such as a hook nail. Since ones well known to those skilled in the art are adopted as the hooking means, illustration and detail description thereof are omitted.

<Eyeglass Frame Holding Mechanism>

Furthermore, a partition wall 115 is positioned in the lower case 3 in the center in right and left directions thereof. The lower case 3 is provided with the eyeglass frame holding mechanism. The eyeglass frame holding mechanism has the frame positioning mechanism in front and rear directions and the nose pad supporting mechanism provided in the lower case. Note that slits 116 and 117 extending in front and rear directions are formed at a central area in right and left directions of the upper wall areas 7a and 7b as shown in FIG. 19.

<Frame Positioning Mechanism in Front and Rear Directions>

Figure 24:
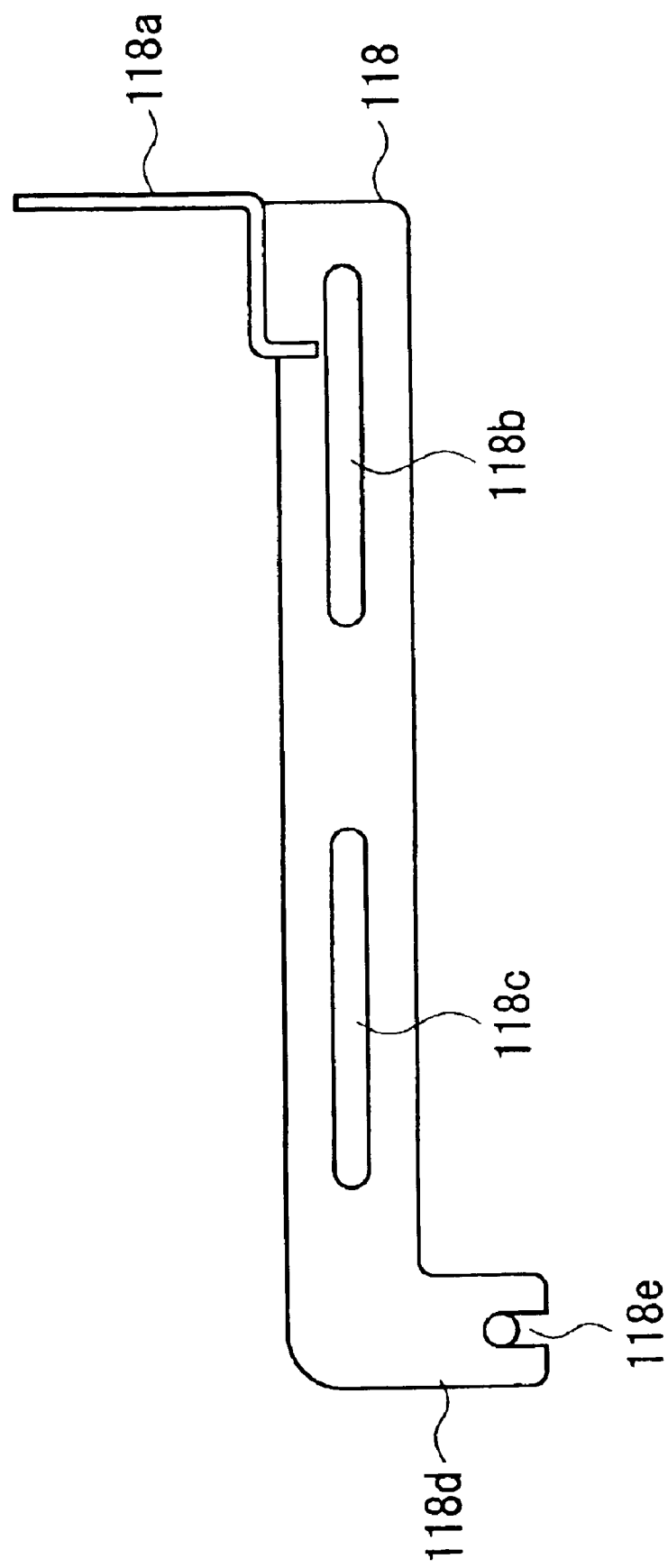
FIG. 24 is a front view of another linkage plate in FIG. 20.
Figure 25:
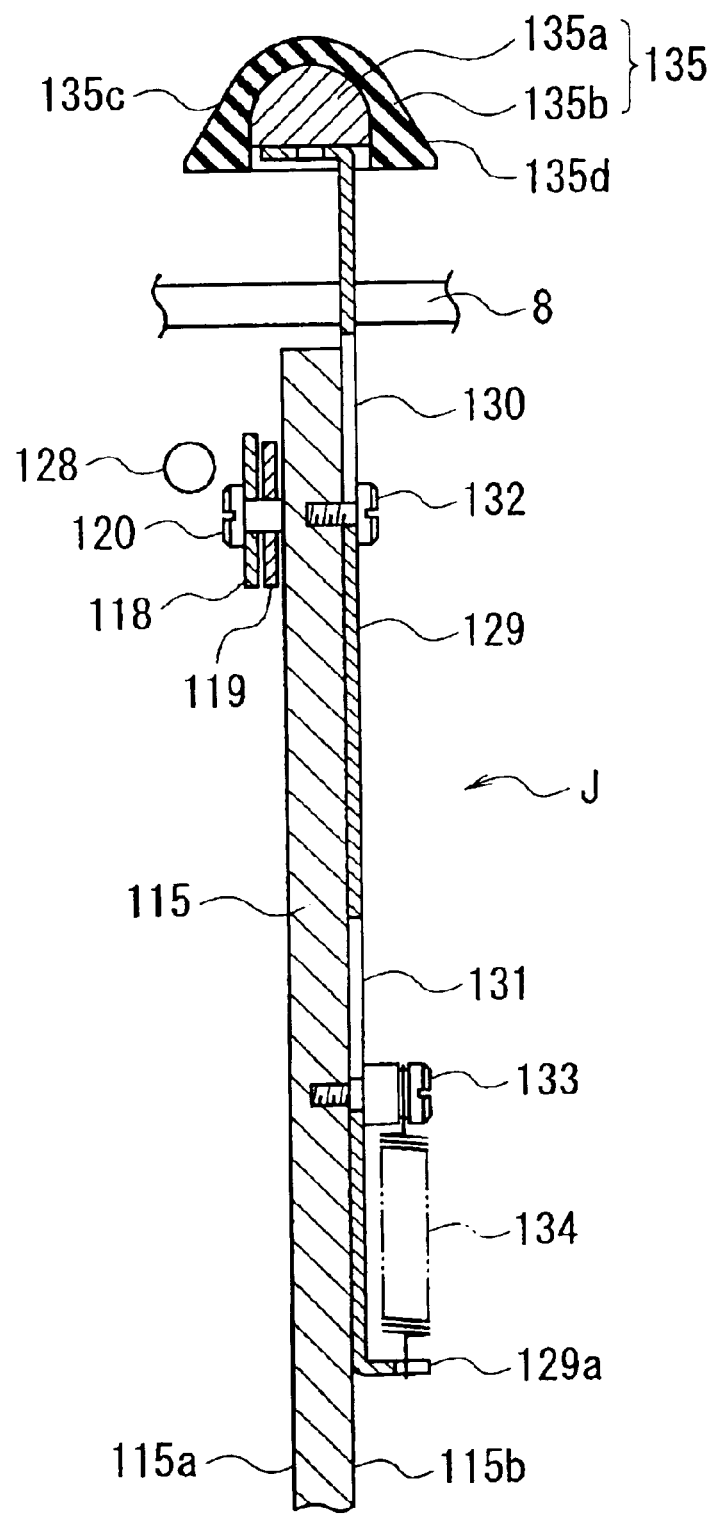
FIG. 25 is a cross-sectional view of the nose pad supporting mechanism shown in FIG. 16.

The lens frame positioning mechanism has a pair of frame holding members dens holding member and lens frame holding member) 28 and 29 (refer to FIGS. 14 to 16) extending in right and left directions and disposed on the front upper wall area 7a and the rear upper wall 7b as shown in FIG. 19 and a pair of linkage plates (moving member) 118 and 119 (refer to FIGS. 21 to 24) disposed inside the lower case 3 as shown in FIGS. 20 and 25. The linkage plates 118 and 119 are disposed in front and rear directions along the upper area of one side 115a of the partition wall 115.

The linkage plate 118 has an attaching section 118a provided to one end upward in a protruding manner as shown in FIGS. 20 and 24, slits 118b and 118c formed with a distance in right and left directions as shown in FIGS. 20, 22 and 24, an engaging section 118d provided to the other end downward in a protruding manner and an engaging notch 118e formed downward on the engaging section 118d. Then, the attaching section 118a protrudes above the upper wall area 7a via the slit 116 and is attached to the frame holding member 28.

Further, the linkage plate 119 has an attaching section 119a provided upward at a middle area in a longitudinal direction in a protruding manner, screw holes 119b and 119c formed at one end and the middle area, an engaging section 119d provided to the other end upward in a protruding manner and an engaging notch 119e formed upward on the engaging section 119d. Then, the attaching section 119a protrudes above the upper wall area 7b via the slit 117 and attached to the frame holding member 29.

Moreover, far ends of guide screws 120 and 121, after inserted in the slits 118b and 118c of linkage plate 118 severally, are screwed into the screw holes 119b and 119c of linkage plate 119 severally, and thus the linkage plates 118 and 119 are connected (engaged) displaceable in a sliding manner relatively in a longitudinal direction.

Still further, the lens frame positioning mechanism has an opening 122 formed on the front wall 4a of the connecting case 4 correspondingly to the upper area of the lower case 3 and the partition wall 115 as shown in FIGS. 20, 21 and 27, a support section 123 provided to the side edge of the opening 122 backward (inside lower case 3) in a protruding manner, a support screw 124 attached to the support section 123 and a rotation plate (connecting member) 125 attached to the support section 123 via the support screw 124. Engaging pins 126 and 127 are attached to the rotation plate 125 with a distance of 180°, and engaging notches 118e and 119e of the linkage plates 118 and 119 are engaged with the engaging pins 126 and 127. Moreover, a coil spring 128 (refer to FIG. 20) is installed so as to hook between the base areas of the attaching sections 118a and 119a of the linkage plates 118 and 119, and the coil spring 128 spring-energizes the linkage plates 118 and 119 in directions where the frame holding members (lens frame holding member) 28 and 29 approach each other.

<Nose Pad Supporting Mechanism>

Figure 26:
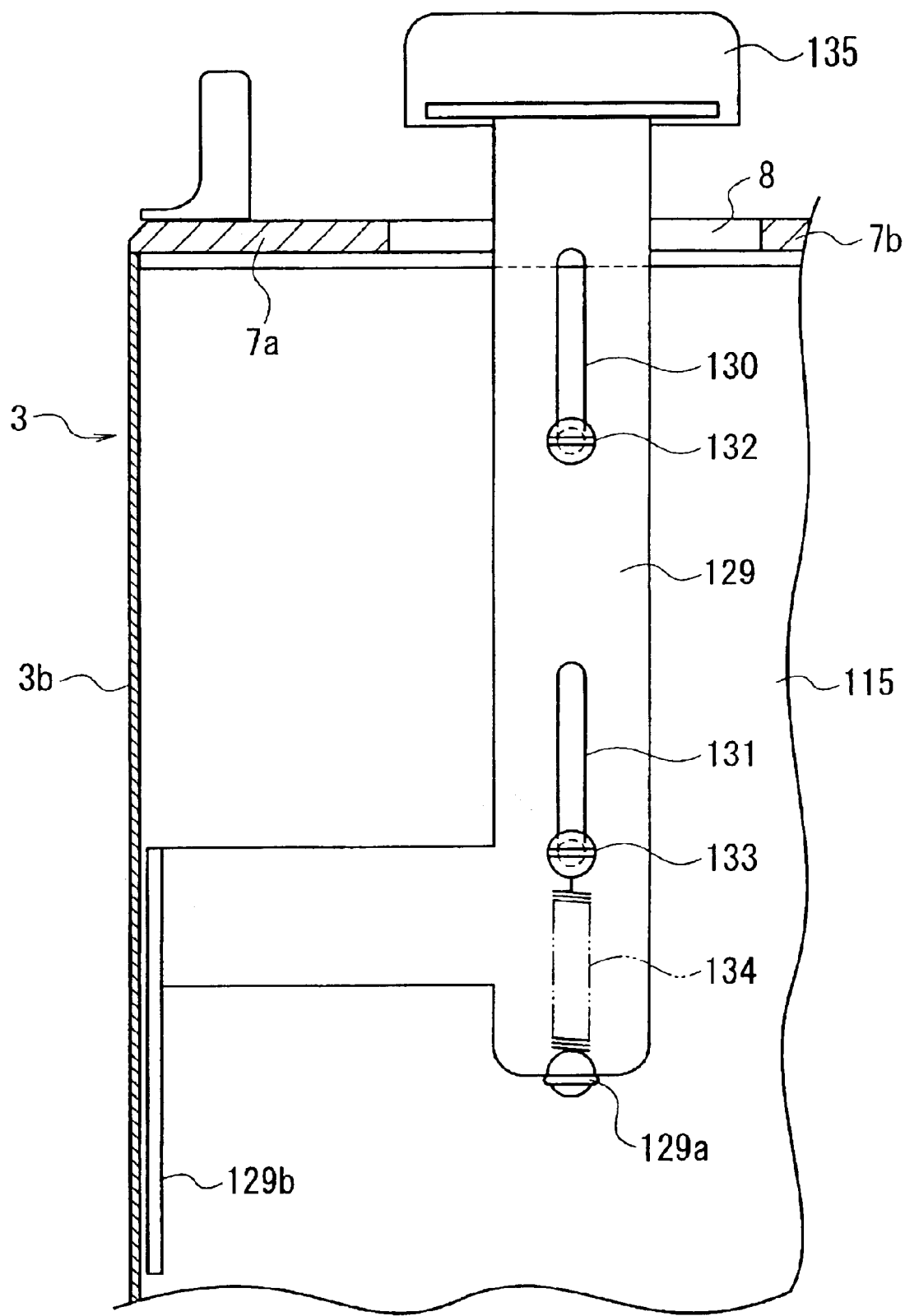
FIG. 26 is a cross-sectional view of FIG. 25 when viewed from an arrow J direction.

Further, as shown in FIGS. 25 and 26, the nose pad supporting mechanism has a sliding plate (nose pad support section) 129 provided upward and downward along the other side 115b of partition wall 115, a pair of guide slits 130 and 131 formed on the sliding plate 129 upward and downward and guide screws 132 and 133 inserted in the guide slits 130 and 131 and screwed into the partition wall 115. The guide screws 132 and 133 are designed to guide the sliding plate 129 up and down.

Furthermore, the nose pad supporting mechanism has a spring receiver 129a positioned below the guide screw 133 and provided to the sliding plate 129 in a protruding manner, a coil spring (energizing means) 134 installed so as to hook between the guide screw 133 and the spring receiver 129a to spring-energizes the sliding plate 129 downward, a guide plate 129b integrally provided to a bottom area of the sliding plate 129 and that moves up and down in a sliding manner along the inner surface of front wall 3b of lower case 3 and a nose pad supporting member (elevating support means for eyeglasses) attached to the upper end of sliding plate 129. As shown in FIG. 25, the nose pad supporting member 135 has a core material 135a fixed at the upper end of sliding plate 129 and a nose pad support 135b made up of rubber, synthetic resin or the like covering the upper surface and side of core material 135a.

Moreover, as shown in FIGS. 19 and 26, one having a tapered shape extending front and rear directions and whose right and left sides 135c and 135d spread as they go down or one having a hog-backed shape can be used as the nose pad supporting member 135.

The nose pad supporting member 135 contacts and supports the nose pads NP and NP of the right and left lens frames LF and RF of the eyeglasses 5. Then, if the nose pad supporting member 135 supports the nose pads NP and NP of the eyeglasses 5, the bridge B of the eyeglasses 5 is made to position at the center in the right and left directions of the unit body 1, and the eyeglass lenses LL and LR of the eyeglasses 5 are thus made to face accurately optical paths of a pair of the right measurement optical systems SL and SR positioned at right and left of the unit body 1 (refer to FIG. 28).

<Measurement Optical System>

(Left Measurement Optical System SL)

The measurement optical system SL has the light-emitting optical system (illumination optical system) 47L built in the upper case 2 and the light-receiving optical system 48L built in the lower case 3.

The light-emitting optical system 47L consists of the LEDs 49 and 50 (refer to FIGS. 15 and 17), the collimating lens 52, the dichroic mirror 53 and a total reflection mirror M. The LED 49 emits infrared ray and the LED 50 emits red ray (wavelength: 630 nm). The dichroic mirror 53 reflects the infrared ray and transmits the red ray. The collimating lens 52 functions to convert the divergent luminous flux generated from the LEDs 49 and 50 into the parallel luminous flux as the measurement luminous flux.

Figure 15:
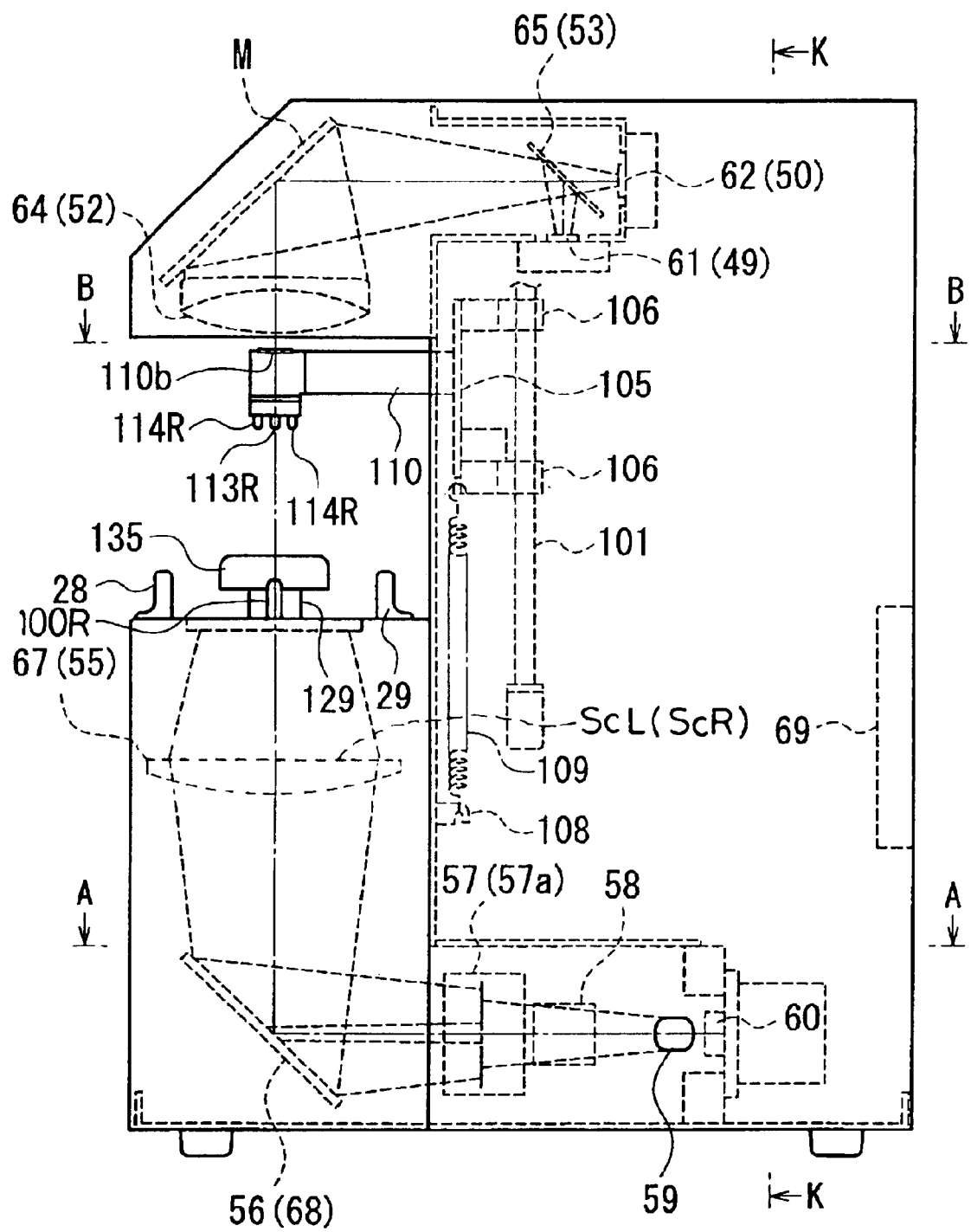
FIG. 15 is a side view of the lens meter in FIG. 14.
Figure 18:
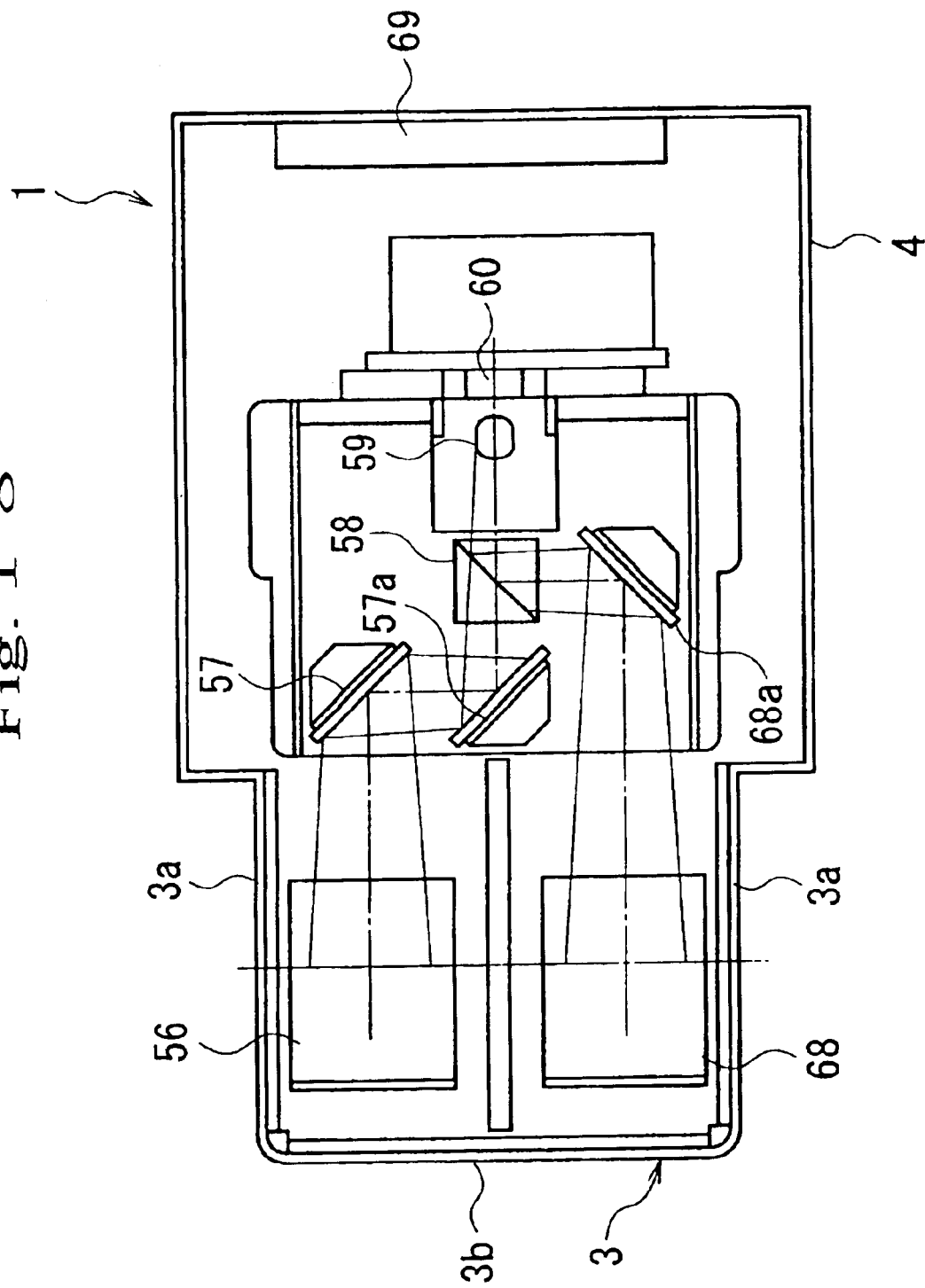
FIG. 18 is a cross-sectional view taken along a line A—A in FIG. 15.

Further, the light-receiving optical system 48L has the Hartman's pattern plate 54, the screen surface ScL, the field lens 55, reflection mirrors 56, 57 and 57a, the optical path synthesizing prism 58, the imaging lens 59 and the CCD 60 (refer to FIGS. 15 and 18). A large number of the light transmission areas (not shown) are provided in a matrix state on the pattern plate 54.

Note that an axis (centerline) of the lens receiving shaft 100L is provided in parallel with a measurement optical axis of the measurement optical system SL.

(Right Measurement Optical System SR)

The measurement optical system SR has the light-emitting optical system (illumination optical system) 47R built in the upper case 2 and the light-receiving optical system 48R built in the lower case 3.

The light-emitting optical system 47R consists of the LEDs 61 and 62 (refer to FIGS. 15 and 17); the collimating lens 64, the dichroic mirror 65 and the total reflection mirror M. The LED 61 emits infrared ray and the LED 62 emits red ray (wavelength: 630 nm). The dichroic mirror 65 reflects the infrared ray and transmits the red ray. The collimating lens 64 functions to convert the divergent luminous flux generated from the LEDs 61 and 62 into the parallel luminous flux as the measurement luminous flux.

Further, the light-receiving optical system 48R has the Hartman's pattern plate 66, the screen surface ScR, the field lens 67, the reflection mirrors 68 and 68a, the optical path synthesizing prism 58, the imaging lens 59 and the CCD 60 (see FIGS. 15 and 18). A large number of the light transmission areas (not shown) are provided in a matrix state on the pattern plate 66.

Figure 47:
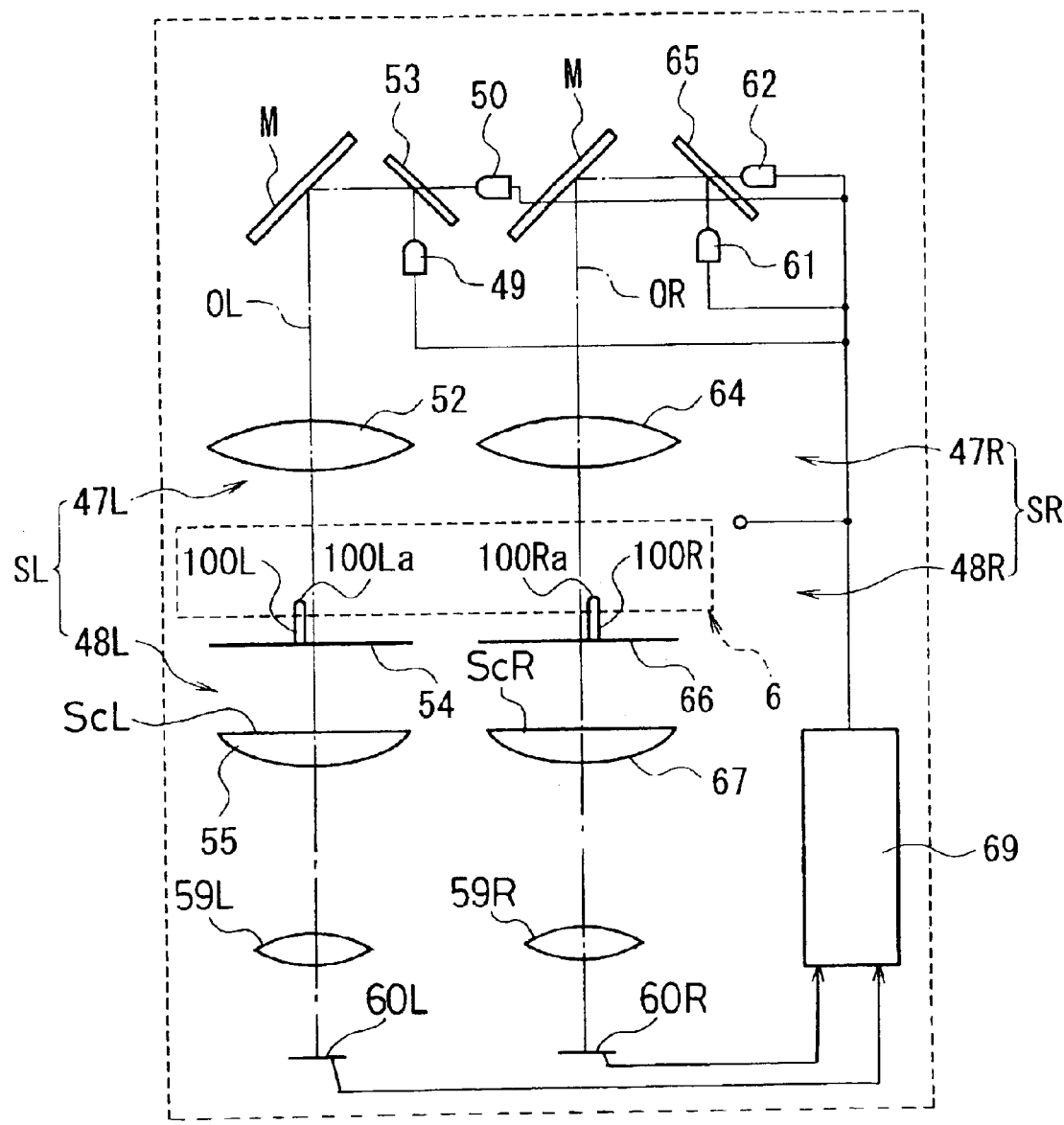
FIG. 47 is an exemplary view showing a variation example of a light-receiving optical system.

Note that an axis of the lens receiving shaft 100R is provided in parallel with a measurement optical axis of the measurement optical system SL. Although the light-receiving element of the left measurement optical system SL and right measurement optical system SR is the common CCD 60 in this embodiment, the CCD 60 may be individually provided to the left measurement optical system SL and the right measurement optical system SR severally. For example, as shown in FIG. 47, the light-receiving optical system 48L is composed of the Hartman's pattern plate 54, the field lens 55, the imaging lens 59L, the light-receiving element 60L and the like, the light-receiving optical system 48R is composed of the Hartman's pattern plate 66, the field lens 67, the imaging lens 59R, the light-receiving element 60R and the like, and output of the light-receiving element 60L an 60R may be input to the arithmetic control circuit 69. In this case, the refraction characteristics of right and the left eyeglass lenses LL and LR can be measured completely simultaneously.

<Control Circuit>

Then, output from the CCD 60 is input to the arithmetic control circuit 69. The arithmetic control circuit 69 is designed to perform operation for refraction characteristics of many points of the right and left eyeglass lenses LL and LR of the eyeglasses 5 based on the detection signal from the CCD 60 and to obtain mapping data of the refraction characteristics. Moreover, the arithmetic control circuit 69 is capable of calculating a distance between optical axes of the eyeglass lenses LL and LR and refraction characteristics such as the spherical power S, the cylindrical power C and the cylindrical axial angle A, a refractivity of a hyperopia area and a myopia area or refraction characteristics such as the additional power of a progressive lens, using the calculated mapping data of refraction characteristics. Further, the arithmetic control circuit 69 is also capable of transmitting the distance between optical axes and the refraction characteristics calculated as described above to another ophthalmological unit (not shown) via transmission means (network, cable or radio).

[Operation]

Next, the operation of the lens meter having such configuration will be described.

(1). Holding Eyeglasses

In the foregoing configuration, the arms 110 and 110 are hooked on the upper case 2 or the connecting case 4 with the hooking means. (not shown) at a position close to the upper case 2, and thus the lens pressing shafts 113L, 114L and 113R, 114R can be held in withdrawal positions that is greatly separate above from the right and left Hartman's pattern plates 54 and 66. When downward movement restriction to the arms 110 and 110 by the hooking means is released, the sliding plate 105 can move downward along the guide rods 101 and 102 via the bearings 106 and 106 and the guide 107. In addition, since the sliding plate 105 is spring-energized downward by the coil spring 109, the arms 110 and 110 and the lens pressing axes 113L, 114L and 113R, 114R can be gently moved downward when the operation parts (operation knob) 110b and 110b are moved downward after releasing the downward movement restriction to the arms 110 and 110 by the hooking means while grabbing the operation parts (operation knob) 110b and 110b.

Further, in the opposed surfaces of the frame holding members 28 and 29, a distance to the center of the pattern plates 54 and 66 (measurement optical axes OL, OR of the right and left measurement optical systems SL, SR) is equally provided. Additionally, when the frame holding member 28 is pulled to the front (right side in FIG. 20) resisting spring force of the coil spring 128, the linkage plate 118 is moved to the right side in FIG. 20. Accordingly, the rotation plate 125 is rotated anticlockwise centering the support screw 124, the linkage plate 119 is moved to the left side in FIG. 20, and thus the distance between frame holding members 28 and 29 widens. At this point, the distance between frame holding members 28 and 29 is moved in directions where the distance widens by the same quantity.

On the contrary, releasing the pull strength allows the linkage plates 118 and 119 and the rotation plate 125 to reversely move from the foregoing due to spring force of the coil spring 128, and the distance between the frame holding members 28 and 29 is narrowed. At this point, the distance between the frame holding members 28 and 29 is moved in directions where the distance narrows by the same quantity.

In opposing surfaces of the frame holding members 28 and 29, a distance to the center of the pattern plates 54 and 66 (measurement optical axes OL, OR of the right and left measurement optical systems SL, SR) is equally provided.

Therefore, even if the distance between the framed holding members 28 and 29 is narrowed or widened, the distance from the frame holding member 28 to the center of pattern plates 54 and 66 (measurement optical axes OL, OR of the right and left measurement optical systems SL, SR) and the distance from the frame holding member 29 to the center of the pattern plates 54 and 66 (measurement optical axes OL, OR of the right and left measurement optical systems SL, SR) are always equal.

Incidentally, the right and left eyeglass lenses LL an LR need to contact with the lens receiving shafts 100L an 100R and the right and left eyeglass lenses LL and LR need to be pressed from above with the lens pressing shafts 113L, 114L and 113R, 114R in order to measure refraction characteristics or the like of right and the left eyeglass lenses LL and LR of the eyeglasses 5.

For this purpose, the frame holding member 28 is pulled to the front while holding the lens pressing shafts 113L, 114L and 113R, 114R are held in the foregoing withdrawal positions first, and thus the distance between the frame holding members 28 and 29 is widened as described above and the eyeglass frame MF of the eyeglasses 5 can be disposed between the frame holding members 28 and 29. In this state, the eyeglass frame MF of the eyeglasses 5 is disposed between the frame holding members 28 and 29 and the nose pads NP and NP of the eyeglasses 5 are made to contact and supported by the right and left sides 135c and 135d of the nose pad supporting member 135, and thus the bridge B of the eyeglasses 5 is made to position at the center in the right and left directions of the unit body 1 and the eyeglass lenses LL and LR of the eyeglasses 5 are made to face optical paths of a pair of the right measurement optical systems SL and SR positioned at right and left of the unit body 1 (same as FIG. 13). At this point, the temples LT an RT are disposed at right and left sides of the lower case 3.

Figure 30:
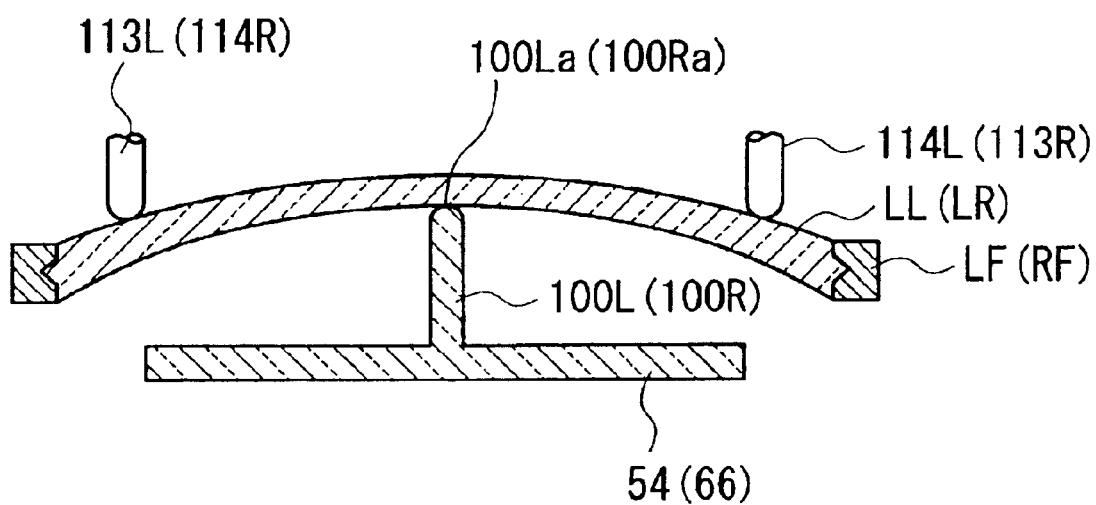
FIG. 30 is an enlarged cross-sectional view of a principal area showing a supporting state of an eyeglass lens of the eyeglasses in FIG. 29.
Figure 3:
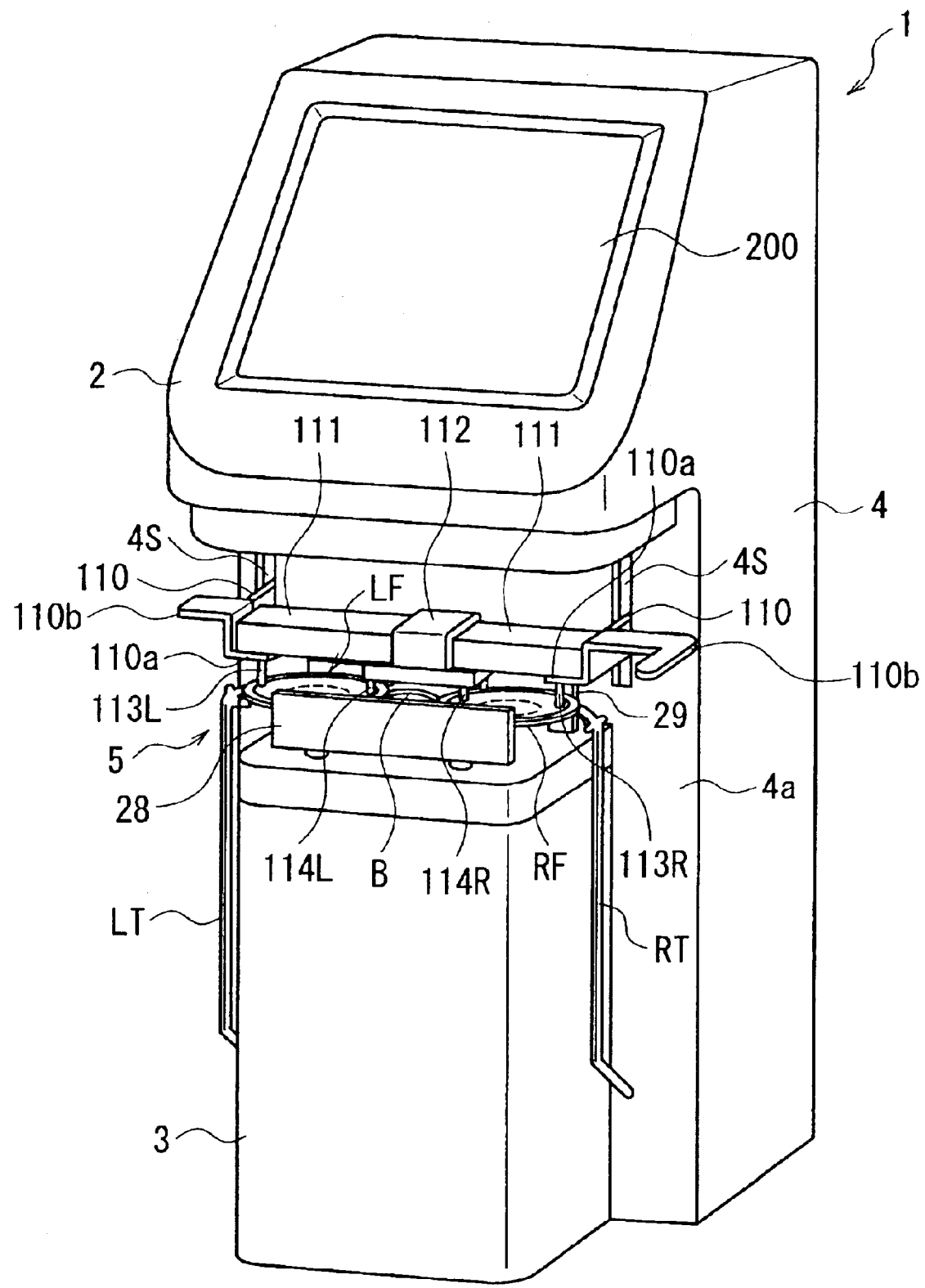
Figure 3:
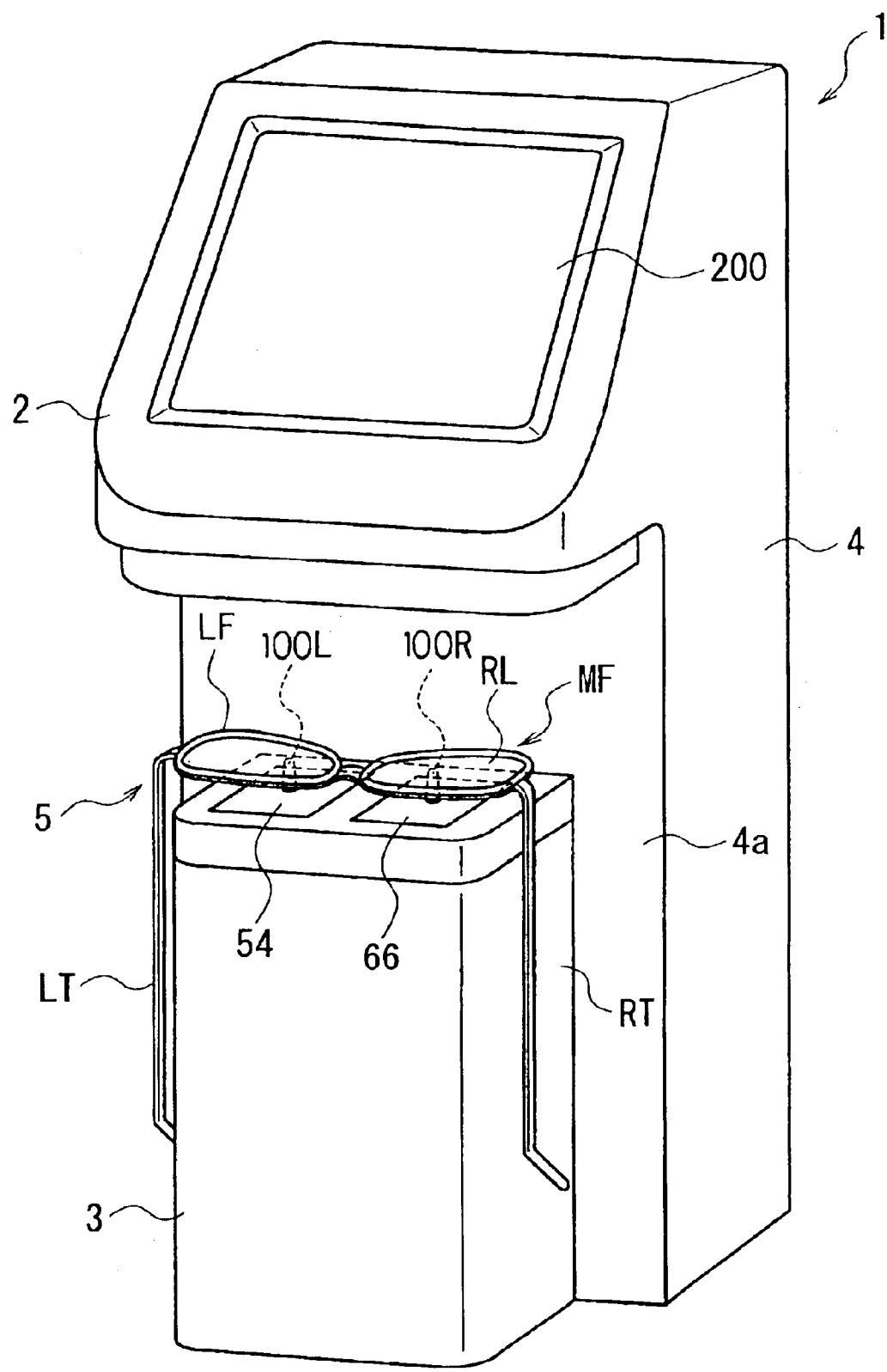

Next, the bridge B of the eyeglasses 5 is pressed to push down the nose pad supporting member 135 resisting spring force of the coil spring 134, and thus the rear refraction surfaces (bottom surface) of the right and left eyeglass lenses LL and LR of the eyeglasses 5 are made to contact and supported by the pattern plates 54 and 166 as the Hartman's plate as in FIG. 30. On the other hand, pull strength is gradually released from the frame holding member 28 to narrow the distance between the frame holding members 28 and 29, and the frame holding members 28 and 29 are made to sandwich the eyeglass frame MF of the eyeglasses 5. At this point, the distance between the frame holding members 28 and 29 is narrowed in the state where the distance from the frame holding member 28 to the center of the pattern plates 54 and 66 and the distance from the frame holding member 29 to the center of the pattern plates 54 and 66 are constantly equal. For this reason, even if the eyeglass frame MF is arranged off to the front side or rear side, the eyeglass frame MF is pressed and displaced by the frame holding member 28 or 29 opposite to a side where the eyeglass frame MF is off, and the nose pads NP and NP are moved in a longitudinal direction of the nose pad supporting member 135. And finally, the eyeglass frame MF is sandwiched between the frame holding members 28 and 29 in the state where the centerlines of the right and left eyeglass lenses LL and LR of the eyeglasses 5 in front and rear directions match the approximate center of the pattern plates 54 and 66 (measurement optical axes OL, OR of right and left measurement optical systems SL, SR).

Thereafter, the arms 110 and 110 and the lens pressing shafts 113L, 114L and 113R, 114R are gently moved downward when the operation parts (operation knob) 110b and 110b are moved downward after releasing the downward movement restriction to the arms 110 and 110 by the hooking means while grabbing the operation parts (operation knob) 110b and 110b, and thus the lens pressing shafts 113L, 114L and 113R, 114R are allowed to press against the upper surfaces (front refraction surface) of the right and left eyeglass lenses LL and LR with spring force of the coil spring 109. In this state, the arms 110 and 110 and the lens pressing shafts 113L, 114L and 113R, 114R are positioned at a lower lens pressing position as in FIG. 29.

Note that the lens pressing shafts 114L and 114R are provided by two pieces severally, in which the lens pressing shafts 114L and 114L are arranged symmetrically centering the plane Sc and the lens pressing shafts 114R and 114R are also arranged symmetrically centering the plane Sc. Therefore, the upper surface of the eyeglass lens LL is pressed by the three points of the lens pressing shafts 113L, 114L and 114L against the lens receiving shaft 100L, and the upper surface of the eyeglass lens LR is pressed by the three points of the lens pressing shafts 113R, 114R and 114R against the lens receiving shaft 100R. Thus, the front and rear directions of the eyeglass lenses LL and LR are held in a direction where they become horizontal by spring force of the coil spring 109.

(2) Measurement of Refraction Characteristics

On the other hand, the arithmetic control circuit 69 sequentially turns on the LEDs 49 and 50 of the measurement optical system SL to perform measurement of the eyeglass lens LL. At this point, the measurement luminous flux from the LED 49 is made to be a parallel luminous flux by the collimating lens 52 and emitted to the eyeglass lens LL after reflected on the dichroic mirror 53 and the total reflection mirror M. Accordingly, the measurement luminous flux that has passed through the eyeglass lens LL passes the pattern plate 54 and projected on the screen surface ScL. The pattern of luminous flux whose image has, been formed on the screen surface ScL is projected on the CCD 60 via the field lens 55, the reflection mirrors 56, 57 and 57a, the optical path synthesizing prism 58 and the imaging lens 59, and a pattern image of the pattern plate 54 is formed on the CCD 60.

Further, the measurement luminous flux from the LED 50 is made to be a parallel luminous flux by the collimating lens 52 and emitted to the eyeglass lens LL, after passing through the dichroic mirror 53 and reflected on the total reflection mirror M. Accordingly, the measurement luminous flux that has passed through the eyeglass lens LL passes the pattern plate 54 and projected on the screen surface ScL. The pattern of luminous flux whose image has been projected on the screen surface ScL is projected on the CCD 60 via the field lens 55, the reflection mirrors 56, 57 and 57a, the optical path synthesizing prism 58 and the imaging lens 59, and a pattern image of the pattern plate 54 is formed on the CCD 60.

Then, the arithmetic circuit 69 measures refraction characteristics of each portion of the eyeglass lens LL using the state of pattern image formed on the CCD 60, and mapping data of refraction characteristics is thus obtained.

Thereafter, the arithmetic control circuit 69 sequentially turns on the LEDs 61 and 62 of the measurement optical system SR to perform measurement of the eyeglass lens LR. At this point, the measurement luminous flux from the LED 61 is made to be a parallel luminous flux by the collimating lens 64 after reflected on the dichroic mirror 65 and the total reflection mirror M, and emitted to the eyeglass lens LR. Accordingly, the measurement luminous flux that has passed through the eyeglass lens LR passes the pattern plate 66 projected on the screen surface ScR. The pattern of luminous flux whose image has been projected on the screen surface ScR is projected on the CCD 60 via the field lens 67, the reflection mirrors 68 and 68a, the optical path synthesizing prism 58 and the imaging lens 59, and a pattern image of the pattern plate 66 is formed on the CCD 60. Reference numeral 58a denotes an adhesion surface (reflection surface) of the optical path synthesizing prism 58.

Further, the measurement luminous flux from the LED 62 is made to be a parallel luminous flux by the collimating lens 64 after passing through the dichroic mirror 65 and reflected on the total reflection mirror M, and emitted to the eyeglass lens LR. Accordingly, the measurement luminous flux that has passed through the eyeglass lens LR passes the pattern plate 66 and projected on the screen surface ScR. The pattern of luminous flux whose image has been projected on the screen surface ScR is projected on the CCD 60 via the field lens 67, the reflection mirror 68, the optical path synthesizing prism 58 and the imaging lens 59, and a pattern image of the pattern plate 66 is formed on the CCD 60.

Then, the arithmetic circuit 69 measures refraction characteristics of each portion of the eyeglass lens LR using the state of pattern image formed on the CCD 60, and mapping data of refraction characteristics is thus obtained. Further, the arithmetic control circuit 69 is also capable of transmitting the distance between optical axes and the refraction characteristics calculated as described above to another ophthalmological unit (not shown) via transmission means (network, cable or radio).

In this embodiment, since a support area of the lens receiver for the eyeglass lens is made minimum by using the lens receiving shafts 100L and 100R of a bar shape as the lens receiver, refraction characteristic distribution of the eyeglass lens can be measured while an area of lens receiver that blocks the measurement luminous flux when measuring refraction characteristics is made minimum. Note that the lens receiver is formed in a bar shape (pin shape) in the foregoing embodiment, but the invention is not limited to this configuration. For example, the lens receiver may be formed in a conical shape so that the conical lens receivers can support the eyeglass lenses with a point.

Further, since a radius of curvature at the bottom surface (rear refraction surface) of the eyeglasses is different depending on a refractivity of the eyeglass lens and a lens material of the eyeglass lens, refraction characteristics of the eyeglass lens can be accurately calculated by setting a support height for the eyeglass lens.

However, the configuration is made such that the right and left eyeglass lenses LL and LR of the eyeglasses are simultaneously supported, the optical axes of the right and left eyeglass lenses LL and LR and the lens receiver cannot be necessarily matched, and thus a state is considered where supporting state of the eyeglass lenses are not constant when the eyeglass lenses are supported with cylindrical lens receivers, lens receivers that consist of a large number of lens supporting shafts, or the like. But, as described in this embodiment, the right and left eyeglass lenses can be supported stably when the eyeglass lens is supported by one lens receiver with a point, comparing to the case where the eyeglass lenses are supported with the cylindrical lens receivers, the lens receivers that consist of a large number of lens supporting shafts, or the like.

Moreover, although the lens pressing shafts 113L and 113R of the right and the left eyeglass lenses LL and LR are severally provided by one piece in the second embodiment of the present invention, the lens pressing shafts 113L and 113R can be severally provided by two pieces similar to the lens pressing shafts 114L and 114R.

[Third Embodiment of the Invention]

Although the foregoing second embodiment of the invention has a configuration in which the nose pad supporting member and the lens pressing member are provided, these are not necessary. For example, a configuration may be adopted where the lens receiving shafts 100L and 100R of a bar shape are severally provided on the pattern plates 54 and 66 as shown in FIG. 32. Since the configuration and operation of other parts are same as the second embodiment of the invention, their description will be omitted.

With this configuration, refraction characteristics of the right and left eyeglass lenses LL and LR can be measured only by contacting the rear refraction surfaces of the eyeglass lenses LL and LR of the eyeglasses 5 on the upper ends of the lens receiving shafts 100L and 100R. In this case, refraction characteristics of the eyeglass lenses LL and LR can be easily measured simultaneously only by only grabbing the temples RT and LT of the eyeglasses 5 or holding the eyeglass frame MF of the right and left eyeglass lenses LL and LR with hands. The eyeglass frame MF has the lens frames LF and RF, and the eyeglass lenses LL and RL are fitted into the right and left lens frames LF and RF.

[Fourth Embodiment of the Invention]

Figure 33:
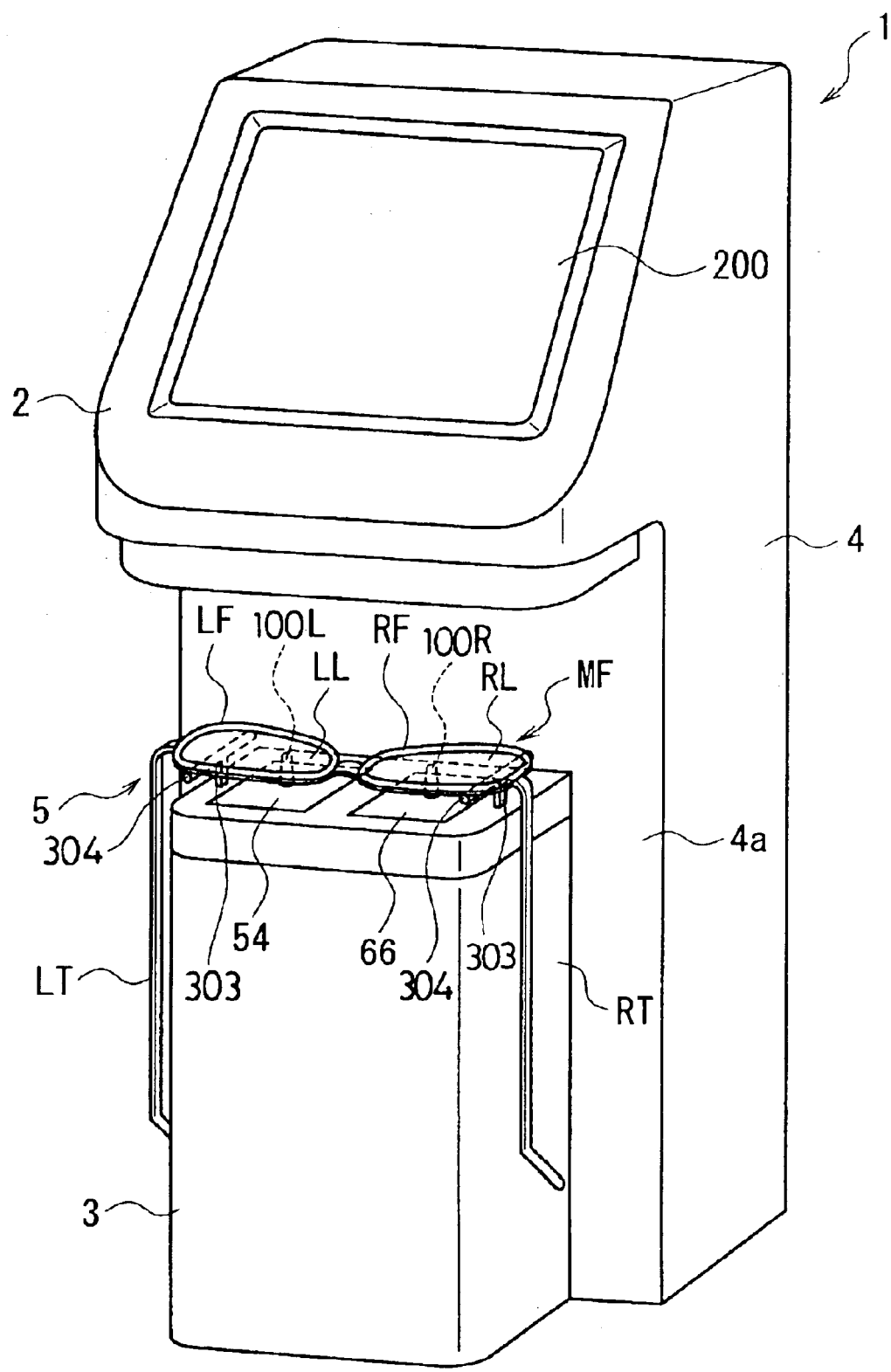
FIG. 33 is a perspective view showing still another example of a lens meter according to a fourth embodiment of the present invention.
Figure 34:
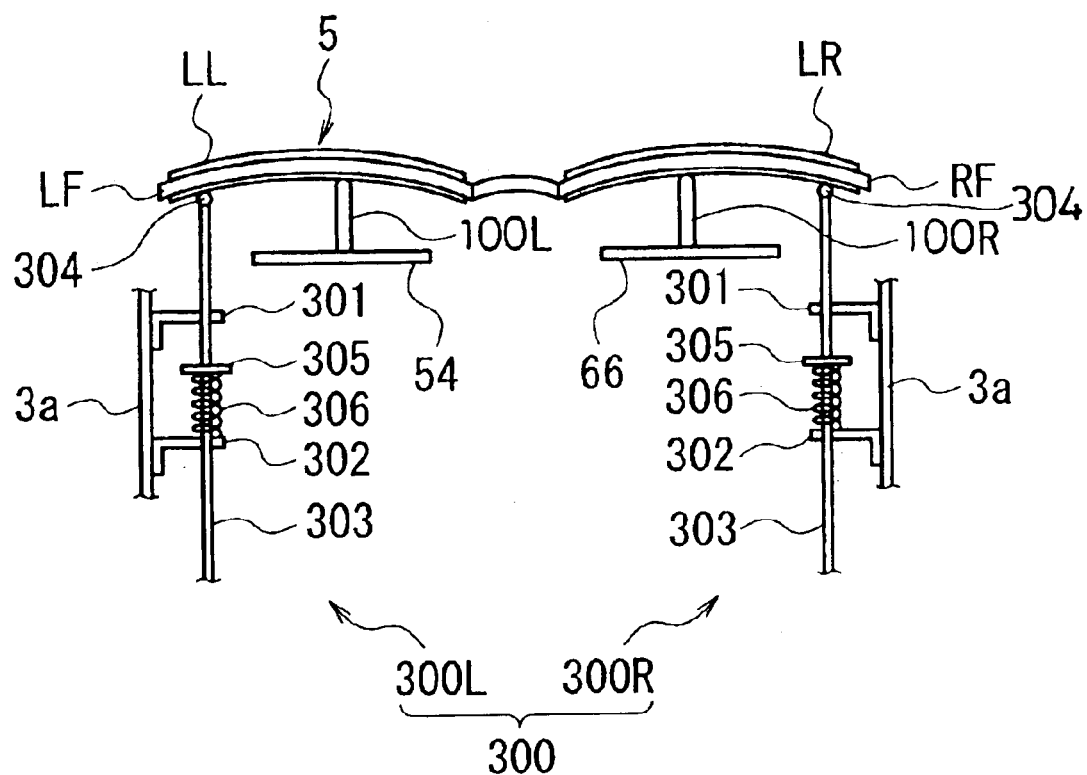
FIG. 34 is a cross-sectional view of a principal area in FIG. 33.

The fourth embodiment of the invention is one having a configuration where a frame supporting unit 300 as shown in FIGS. 33 and 34 is provided to the lower case 3 in the configuration of the third embodiment of the invention. The frame supporting unit 300 is used for supporting the right and left lens frames LF and RF of the eyeglasses 5 and contacting the eyeglass lenses LL and LR on the upper ends of the lens receiving shafts 100L and 100R as it moves down by the deadweight of the eyeglasses 5. The frame supporting unit 300 has a left frame supporting unit 300L and a right frame supporting unit 300R, which are attached to right and left sides of the lower case 3 of the unit body 1.

The left frame supporting unit 300L has brackets 301 and 302 integrally provided to the inner surface 3a of the lower case 3 with a distance in vertical directions a support shaft 303 extending in vertical directions penetrating the side of the upper wall 7 and the brackets 301 and 302, an a for supporting frame (frame supporting member) 304 integrally provided to the upper end of the support shaft 303 and extending in front and rear directions, a flange 305 positioned between the brackets 301 and 302 and provided in the middle area of the support shaft 303 and a coil spring (energizing means) 306 in which the support shaft 303 is inserted and installed so as to hook between the bracket 302 and the flange 305. Since the right frame supporting unit 300R has the same configuration as the left frame supporting unit 300L, the same reference numerals are added and its description will be omitted.

The coil spring 306 spring-energizes the support shaft 303 upward to position the arm 304 above the upper ends of lens receiving shafts 100L and 100R. Further, spring force (energizing force) of the coil spring 306 is set extremely weak, and the spring yields and is compressed by the deadweight of the eyeglasses 5.

With this configuration, when the lens frames LF and RF of the eyeglasses 5 are mounted on the arms 304 and 304 of the left frame supporting unit 300L and the right frame supporting unit 300R, the coil springs 306 and 306 are compressed by the deadweight of the eyeglasses 5 and the right and left support shafts 303 and 303 and the arms 304 and 304 are displaced downward, and then the rear refraction surfaces of the eyeglass lenses LL and LR of the lens frames LF and RF are supported on the upper ends of the lens receiving shafts 100L and 100R by points. At this point, falling of the lens frames LF and RF downward in front and rear directions are prevented by the arms 304 and 304.

The refraction characteristics of the right and left eyeglass lenses LL and LR is measured in this state similarly to the foregoing.

With this configuration, the refraction characteristics of the eyeglass lenses LL and LR can be measured simultaneously only by mounting the right and left lens frames LF and RF of the eyeglasses 5 on the arms 304 and 304 without supporting the eyeglasses 5 with hands.

(Other 1)

Although this embodiment of the present invention shows an example where no display unit is provided, a color liquid crystal display unit 200, for example, is provided on the front surface of the upper case 2 of the unit body 1, and the liquid crystal display unit (display means) 200 can display mapping of the refraction characteristics of the eyeglass lenses LL and LR using the mapping data. In addition, the liquid crystal display unit 200 can display the distance between optical axes of the eyeglass lenses LL and LR, the foregoing refraction characteristics and the like as well.

Furthermore, the nose pad supporting member 135 can be held freely movably up and down by the front wall 4a of the connecting case 4. Note that measurement can be performed without the nose pad supporting member 135.

(Other 2)

Moreover, although the nose pad supporting member 45 is held by the frame holding member 29 so as to be displaceable up and down in the foregoing first embodiment of the invention, the invention is not necessarily limited to this. For example, the nose pad supporting member 45 is positioned between the right and left lens receiving mechanisms 80L and 80R to be fixed to the upper wall 7 and the nose pad supporting member 45 is allowed to support the eyeglasses, and thus the heights to the bottom surfaces (rear refraction surface) of the eyeglass lenses LL and LR of the eyeglasses may be measured by the lens receiving shafts 86 and 86 of the lens receiving mechanisms 80L and 80R.

In this case, a feed screw mechanism driven and rotated by the drive motor is used as the elevating means 83 and 83 of the lens receiving mechanisms 80L and 80R, and the feed screw mechanism drives and elevates the lens receiving shaft 86. Then, a pulse motor is used as the drive motor to count the number of drive pulse of the drive motor, elevating quantity of the upper end of the lens receiving shaft 86 is calculated from the counted number, the height of the upper end of the lens receiving shaft, and the heights to the bottom surfaces. (rear refraction surface) of the eyeglass lenses LL and LR of the eyeglasses thus can be calculated.

Accordingly, the heights to the bottom surfaces (rear refraction surface) of the eyeglass lenses LL and LR of eyeglasses is accurately calculated, and the refraction characteristics of the eyeglass lenses LL and LR can be accurately measured.

In the first embodiment, a configuration is made such that the arm 85 is allowed to hold an upper end of scale body (not shown) of a linear scale or a magnetic scale extending downward and a reading head of the linear scale or the magnetic scale, which optically or magnetically reads a movement quantity of the scale body, is attached to a side of the rotation stage 82 or the elevating means 83, and thus the measurement means such as the linear scale and the magnetic scale may measure the height of the far end (upper end) of the lens receiving shaft 86.

[Fifth Embodiment of the Invention]

Figure 35:
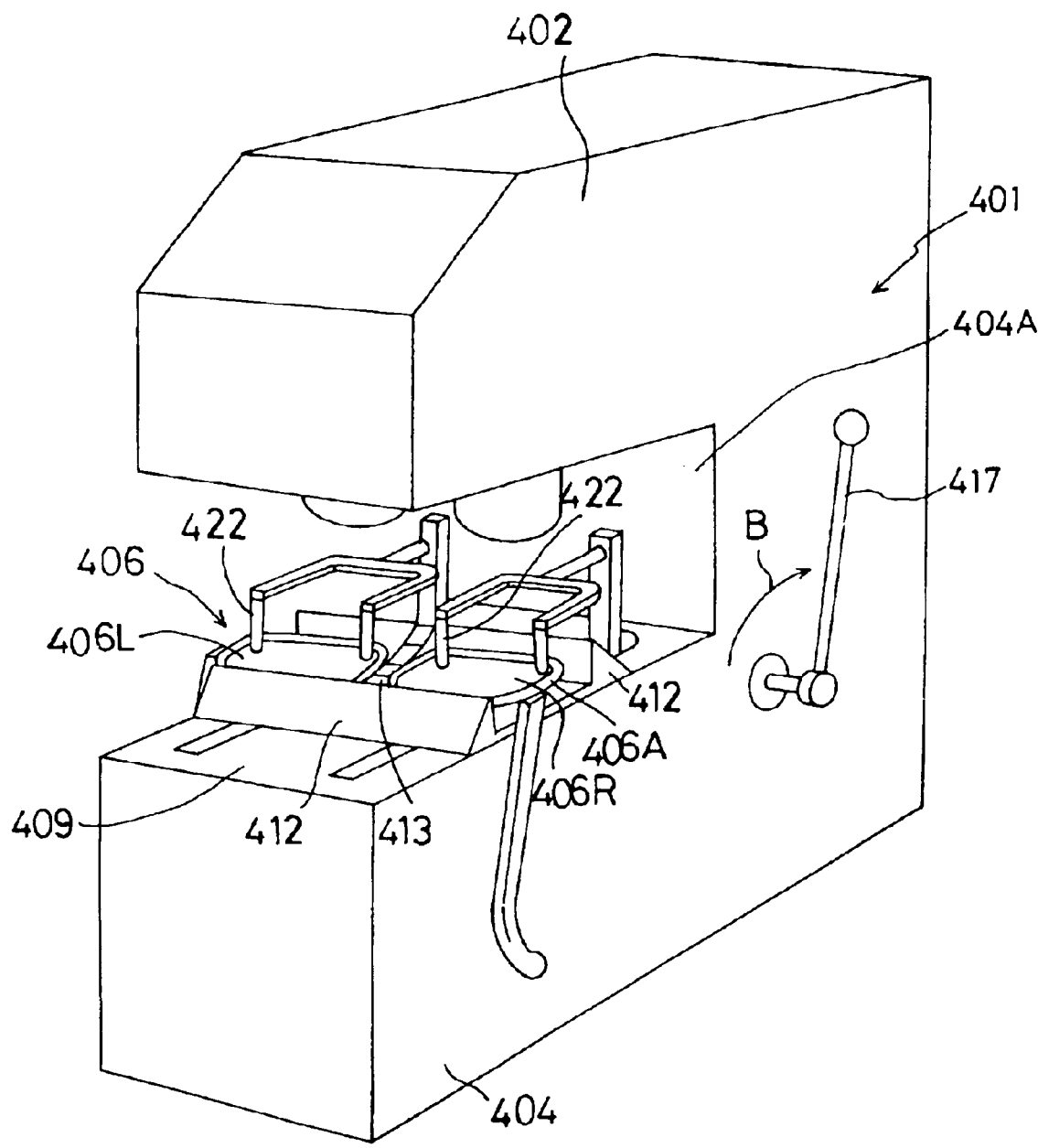
FIG. 35 is an external view of a lens meter according to a fifth embodiment of the present invention.
Figure 36:
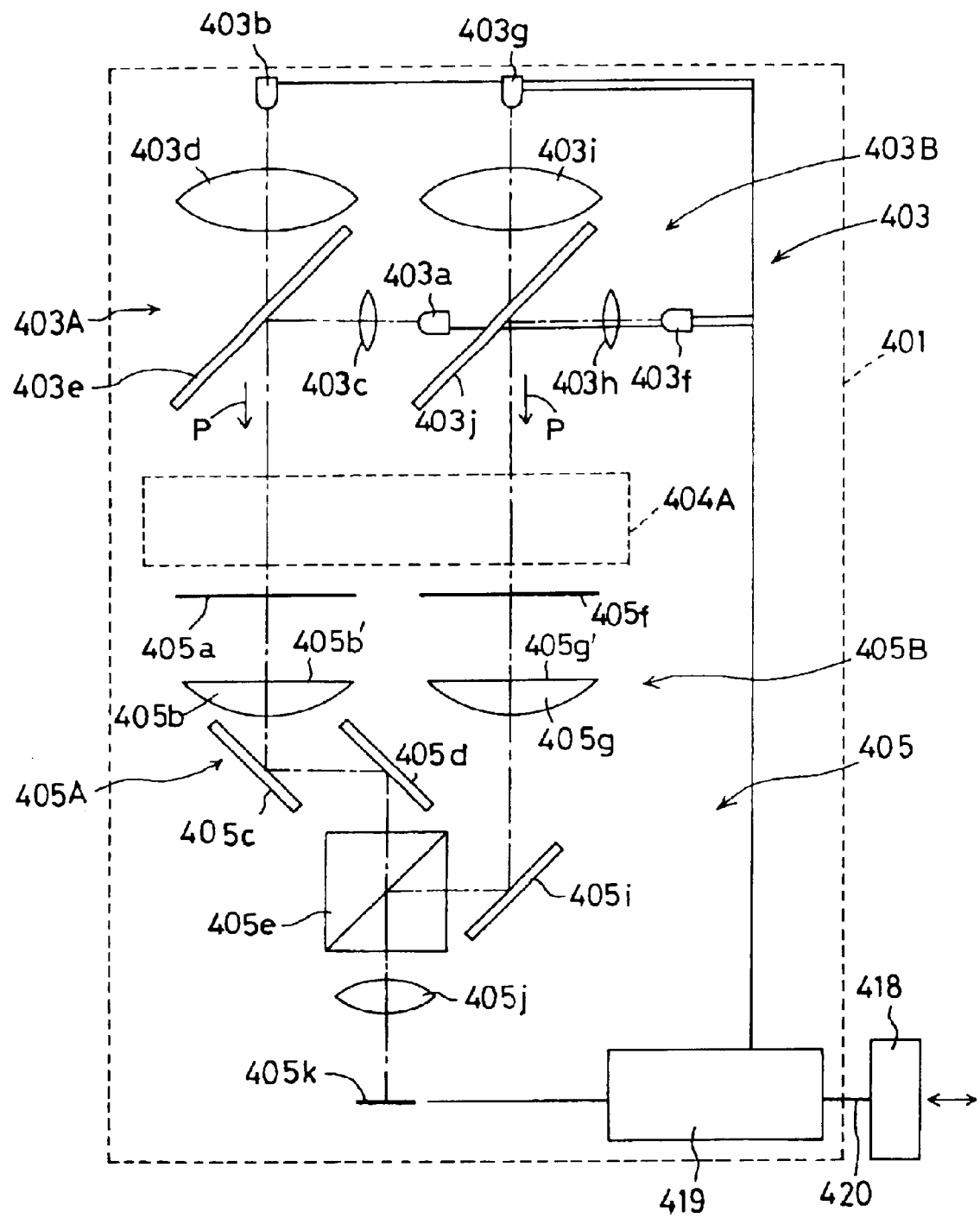
FIG. 36 is a view showing an optical system built in a unit body shown in FIG. 35.

FIG. 35 is an external view of the lens meter according to the present invention. In FIG. 35, reference numeral 401 denotes a unit body. In the unit body 401, a pair of light-emitting optical systems 403 as shown in FIG. 36 are built in its upper case 402, and a pair of light-receiving optical systems 405 are built in its lower case 404. An area between the upper case 402 and the lower case 404 is a setting space 404A of eyeglasses 406.

Figure 37:
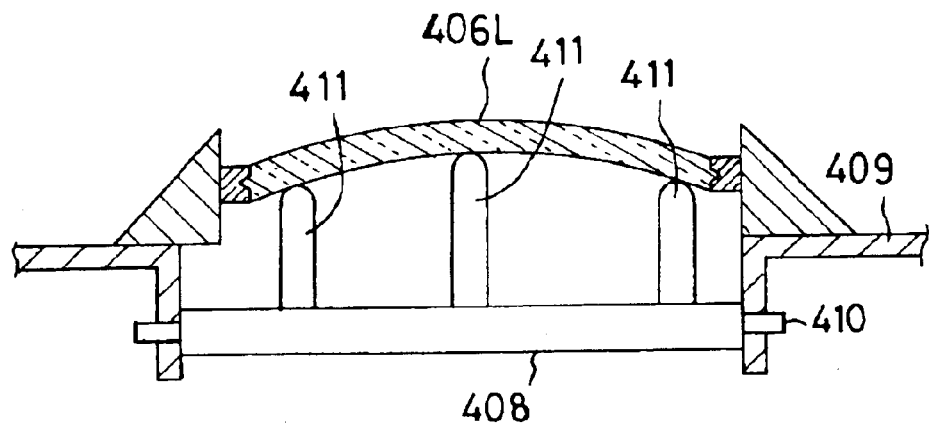
FIG. 37 is a side view of a lens receiving member.
Figure 38:
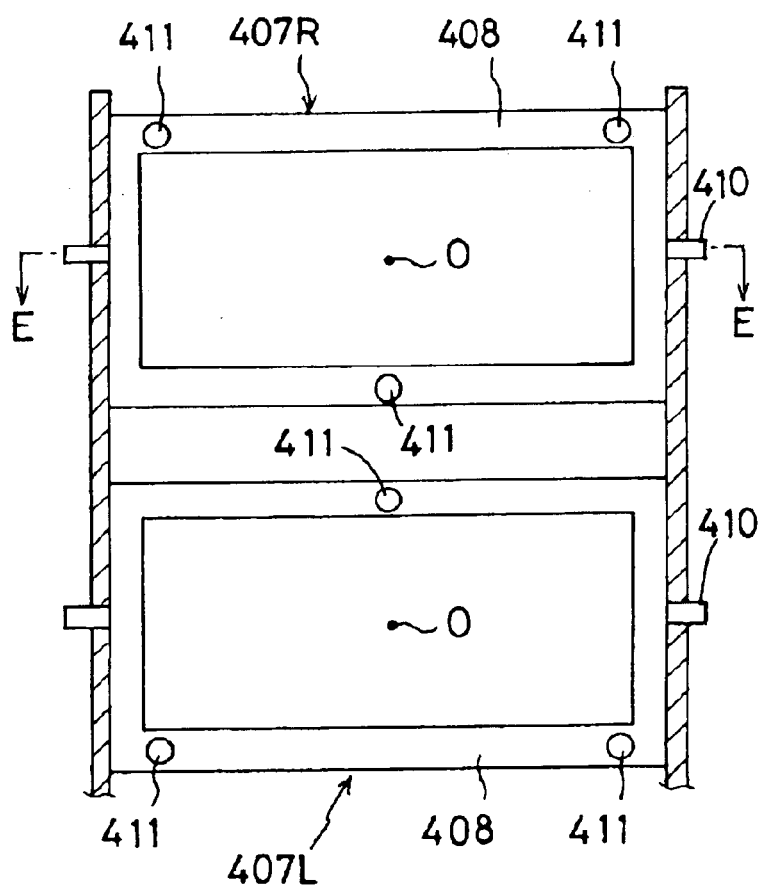
FIG. 38 is a cross-sectional view taken along a line E—E in FIG. 37.

Lens receiving members 407L and 407R supporting right and left eyeglass lenses 406L and 406R are provided to the lower case 404 as shown in FIG. 37. The lens receiving members 407L and 407R have a frame body 408. The frame body 408 is attached to an upper wall 409 of the lower case 404 freely rotatably with a fulcrum on a shaft 410 as shown in FIG. 38.

A supporting member 411 is provided on upper areas of the frame body 408, on which the eyeglass lenses 406L and 406R can be mounted. A center O of the frame body 408 corresponds to a substantially optical center of the light emitting system 3.

Figure 39:
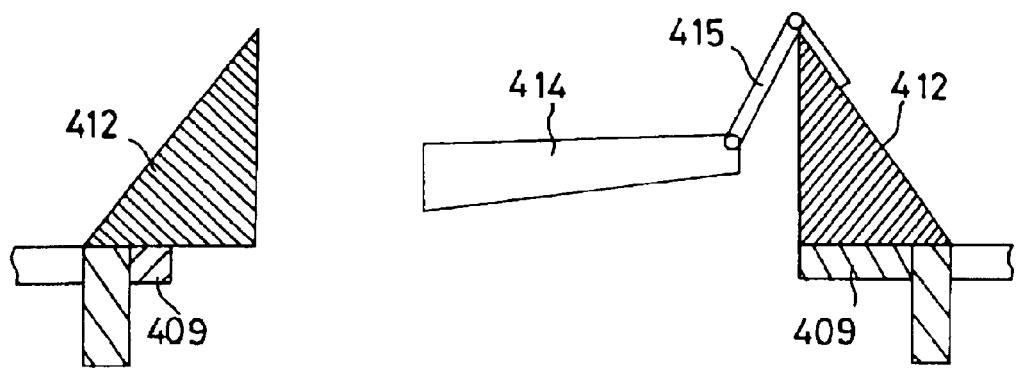
FIG. 39 is a schematic view of a sandwiching mechanism.

A pair of sandwiching members 412 and 412, which slide in front and rear directions to sandwich the eyeglass frame 406A of the eyeglasses 406 from front and rear directions, are provided to the lower case 402 as shown in FIGS. 35 and 39. A pair of the sandwiching members 412 and 412 are movable in directions where they separate or approach by an electric mechanism (not shown). A drive quantity of a pair of the sandwiching members 412 and 412 is set to the same quantity relative to the center O.

A nose pad member 414 where a nose pad 413 of the eyeglass frame 406A contacts is attached to one of a pair of the sandwiching members 412 and 412 freely rotatably via a linkage member 415. The eyeglasses 406 are positioned in right and left directions when the nose pad 413 is made to contact the nose pad member 414.

Figure 40:
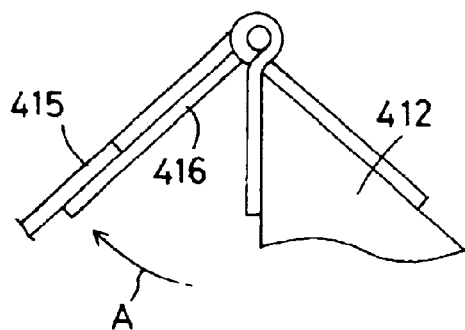
FIG. 40 is a partial enlarged view of a linkage member shown in FIG. 39.

The linkage member 415 is appropriately energized in an A arrow direction by a torsion coil spring 416 as shown in FIG. 40 in an enlarged state.

A handle 417 is provided freely rotatably to the sidewall of the unit body 401, and the handle 417 is connected to a cam mechanism 418 shown in FIG. 36. The cam mechanism 418 has a connecting bar 419, and a cam member 420 is provided in the middle of the connecting bar 419.

A lower end of an elevating bar 421 contacts with a cam surface 420*a* of the cam member 420. A pressing bar 422 of a fork shape is provided to an upper end of the elevating bar 421. The elevating bar 421 is energized downward by a coil spring 423.

The pressing bar (pressing member) 422 has a function to press the right and left eyeglass lenses 406L and 406R of the eyeglasses 406 from above, in which the connecting bar 419 is movable in a C arrow direction and the pressing bar 422 is made to go down by energizing force of the coil spring 423 when the handle 417 is pulled up in a B direction and the eyeglass lenses 406L and 406R are pressed against the supporting member 411 of the lens receiving members 407L and 407R.

Since the lens receiving members 407L and 407R are freely rotatable with a fulcrum on the shaft 410, their holding heights can be made constant regardless of a curvature ratio of the eyeglass lenses 406L and 406R. Accordingly, measurement error caused by changes of holding heights of the eyeglass lenses 406L and 406R can be avoided.

A pair of the light-emitting systems 403 are composed of a light-emitting system 403A and a light-emitting system 403B. The light-emitting system 403A is composed of LEDs 403*a* and 403*b*, collimating lenses 403*c* and 403*d* and a dichroic mirror 403*e*. The light-emitting system 403B is composed of the LEDs 403*f* and 403*g*, collimating lenses 403*h* and 403*i* and a dichroic mirror 403*j*.

The LEDs 403*a* and 403*f* emit infrared ray and the LEDs 403*b* and 403*g* emit red ray (wavelength: 630 nm). The dichroic mirrors 403*e* and 403*j* reflect the infrared ray and transmit the red ray.

The collimating lenses 403*c*, 403*h*, 403*d* and 403*i* function to convert divergent luminous fluxes generated from the LEDs 403*a*, 403*b*, 403*f* and 403*g* into parallel luminous fluxes as the measurement luminous flux. The collimating lenses 403*c* and 403*h* function to illuminate a narrow area (described later) of the pattern plate, and the collimating lenses 403*d* and 403*i* function to illuminate a wide area (described later) of the pattern plate.

A pair of light-receiving optical systems 405 are composed of a light-receiving system 405A and a light-receiving system 405B. The light-receiving system 405A is composed of a pattern plate 405*a*, a field lens 405*b*, reflection mirrors 405*c* and 405*d* and an optical path synthesizing prism 405*e*.

The light-receiving system 405B is composed of a pattern plate 405*f*, a field lens 405*g* and a reflection mirror 405*i*. The measurement luminous fluxes from the light-emitting systems 403A and 403B pass transmission windows (described later) of the pattern plates 405*a* and 405*f* and guided to the field lenses 405*b* and 405*g*. Screen surfaces 405*b*' and 405*g*' are provided to the field lenses 405*b* and 405*g*, and pattern images of the pattern plates 405*a* and 405*f* are formed on the screen surfaces 405*b*' and 405*g*' once.

The luminous fluxes having passed through the pattern plates 405*a* and 405*f* and the field lenses 405*b* and 405*g* are synthesized by the optical path synthesizing prism 405*e*, and received by a CCD photo-detecting device 405*k*, which is shared by the both light-receiving systems 405A and 405B, via an imaging lens 405*j*.

Figure 41:
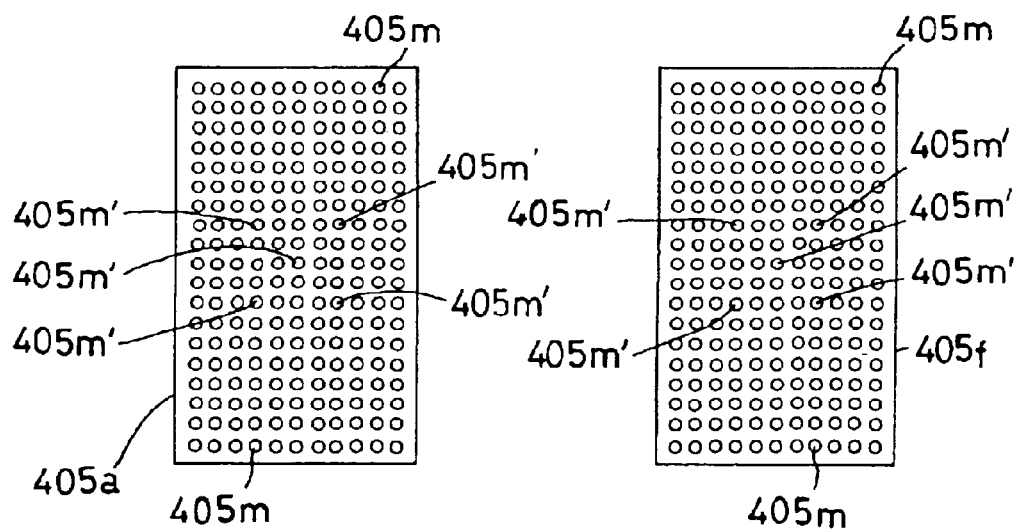
FIG. 41 is a plan view of a pair of pattern plates.
Figure 42:
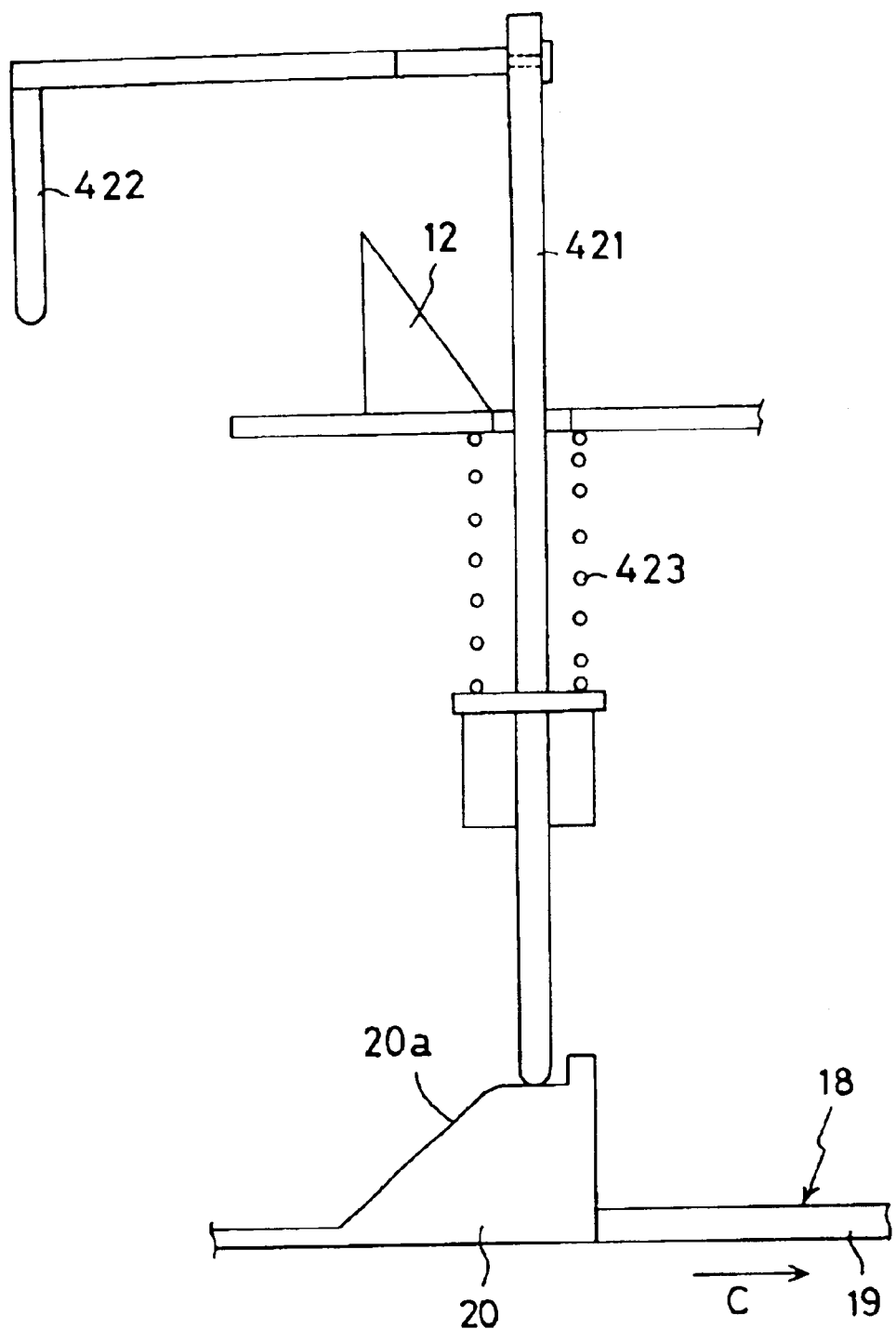
FIG. 42 is a schematic view of a lens pressing mechanism shown in FIG. 35.

A large number of transmission windows 405*m* are formed on the pattern plates 405*a* and 405*f* as shown in FIG. 41. Among a large number of the transmission windows 405*m*, five transmission windows 405*m*' in the central area transmit the infrared ray and the red ray, and remaining transmission windows 405*m* block the infrared ray and transmit only the red ray.

Pattern images corresponding to the pattern plates 405*a* and 405*f* are received by the CCD photo-detecting device 405*k* when the eyeglasses 406 are not set, and measurement luminous fluxes P are displaced by the eyeglass lenses (406L and 406R) and an arithmetical unit 418 performs operation for optical characteristics such as a spherical power of the eyeglass lenses 406L and 406R based on the displacement quantity when the eyeglasses 6 are set.

Figure 43:
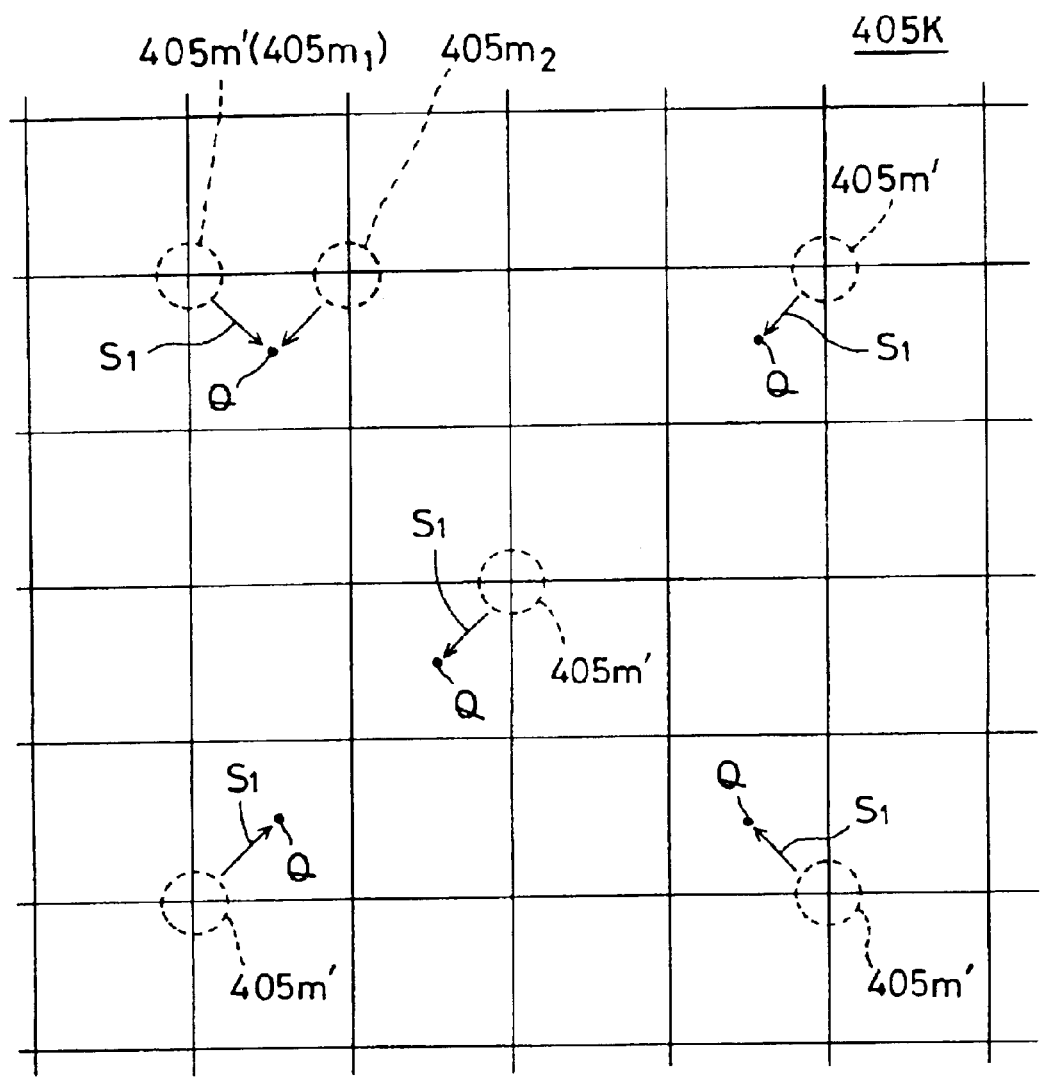
FIG. 43 is a view showing an example of an optical image received by a photo-detecting device shown in FIG. 36.

Incidentally, if the eyeglass lenses 406L and 406R include an astigmatic element or a prismatic element, it is impossible to distinguish whether, the measurement luminous flux P has passed through either one of adjacent two transmission windows $405m_1$ and $405m_2$. Specifically, as shown in FIG. 43, it is impossible to distinguish whether an optical image Q for example, is the optical image of a transmission window $405m'$ ($405m$) or the optical image. Q of the transmission window $405m_2$ on a receiving surface of the CCD light-receiving element $405k$.

Therefore, displacement directions S1 of the measurement luminous fluxes P are calculated in advance by the measurement luminous fluxes P that have passed through the five transmission windows $405m'$, and then the optical characteristics of the eyeglass lenses 406L and 406R are calculated by the measurement luminous fluxes P that have passed through the entire transmission windows $405m$.

With this configuration, shapes of the pattern plates $405a$ and $405f$ can be simplified.

In this lens meter, the nose pad 413 of the eyeglasses 406 is mounted on the nose pad member 414. Next, the handle 417 is pulled up, and the eyeglass lenses 406L and 406R are sandwiched from above and underneath with the lens receiving members 407L and 407R and the pressing bar 422.

Subsequently, the sandwiching members 412 and 412 are movable to direction where they sandwich the eyeglass frame 406A when a button (not shown) is operated, and thus the centers of the eyeglass lenses 406L and 406R are positioned at substantial centers O of the lens receiving members 407L and 407R.

Next, the LED $403a$ of the light-emitting system 403A is automatically turned on by a control circuit 419, and the displacement directions S1 of measurement luminous fluxes regarding the eyeglass lens 406L are calculated by the five optical images Q. Then, the LED $403f$ of the light-emitting system 403B is automatically turned on, and the displacement directions 51 of the measurement luminous fluxes P regarding the eyeglass lens 406R are calculated by the five optical images Q.

Thereafter, the LED $403b$ of the light-emitting system 403A is automatically turned on, a corresponding relation among optical images based on measurement luminous fluxes that have passed through each transmission window $405m$ is calculated by the previously obtained displacement directions S1 of measurement luminous fluxes, and the optical characteristics and optical characteristic distribution regarding the eyeglass lens 406L by a positional relation among the optical images. The same applies to measurement of the optical characteristics of the eyeglass lens 406R.

Although the description has been made for the embodiments of the present invention in the foregoing, a configuration may be adopted in which the LED $403a$ and the LED $403f$ of the light-emitting optical system 403 are used in common and the LED $403b$ and the LED $403g$ are used in common.

Alternatively, operation of optical characteristics may be performed by the control circuit 419, or may be performed by a personal computer 421 connected via a USB connector 420. Data of the optical characteristics may be transmitted to an eyeglass lens main store via the Internet.

Moreover, although a configuration is adopted in the embodiments of the invention, in which a pair of pressing and sandwiching mechanisms simultaneously hold the eyeglasses, a configuration can be made such that the eyeglasses can be held with one of a pair of the pressing mechanisms and sandwiching mechanisms.

[Sixth Embodiment of the Invention]

A configuration is adopted in the foregoing second embodiment of the invention, in which the field lenses 55 and 67 are disposed below the Hartman's pattern plates 54 and 66 and the lens receiving shafts 100L and 100R of a bar shape (pin shape) are severally provided on the pattern plates 54 and 66 in a protruding manner, but the invention is not limited to this configuration.

Figure 44:
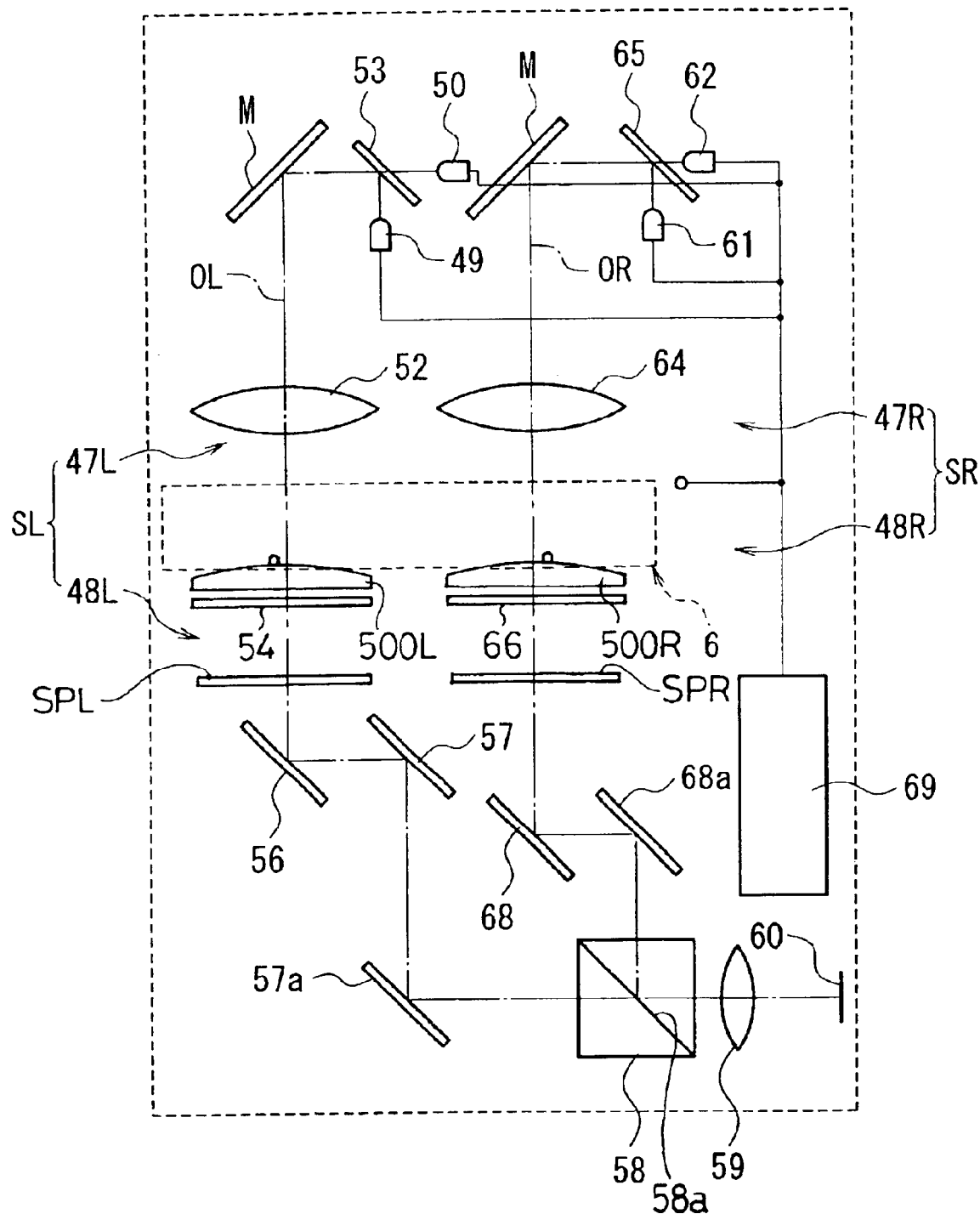
FIG. 44 is an exemplary view showing an optical system of a lens meter according to a sixth embodiment of the present invention.
Figure 45:
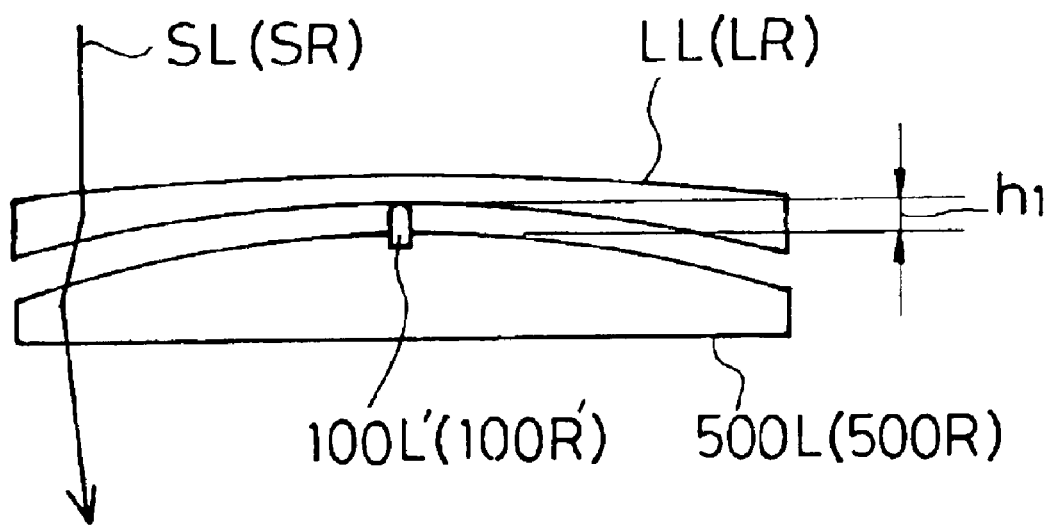
FIG. 45 is an operational exemplary view of a field lens in FIG. 44.

For example, the lens receiving shafts 100L and 100R and the field lenses 55 and 67 of the pattern plates 54 and 66 in the second embodiment of the invention are omitted, and a configuration may be, adopted in which the field lenses 500L and 500R having a shape protruding upward as shown in FIG. 44 are disposed above the pattern plates 54 and 66, lens receiving shafts 100L' and 100R' as shown in FIGS. 44 and 45 are provided upward in a protruding manner at substantially central areas of the field lenses 500L and 500R as convex lenses, and screens SPL and SPR are disposed below the pattern plates 54 and 66.

In this case, a protrusion quantity h1 of the lens receiving shafts 100L' and 100'R can be made shorter than a protrusion quantity h2 of the lens receiving shafts 100L and 100R in the second embodiment of the invention. As a result, a vignetting area of measurement luminous fluxes caused by the lens receiving shafts 100L' an 100R' is reduced and accurate measurement can be performed. Further, since shortening of the lens receiving shafts 100L' and 100R' of a bar shape or a pin shape increases the strength of the lens receiving shafts 100L' and 100R', the lens receiving shafts 100L' and 100R' can support the eyeglass lenses without yielding even if diameters of the lens receiving shafts 100L' and 100R' are made sufficiently small. As a result, since cross-sectional areas of the lens receiving shafts 100L' and 100R' become even smaller, the vignetting area of measurement luminous fluxes caused by the lens receiving shafts 100L' and 100R' is reduced furthermore, and accurate measurement can be performed.

Figure 46:
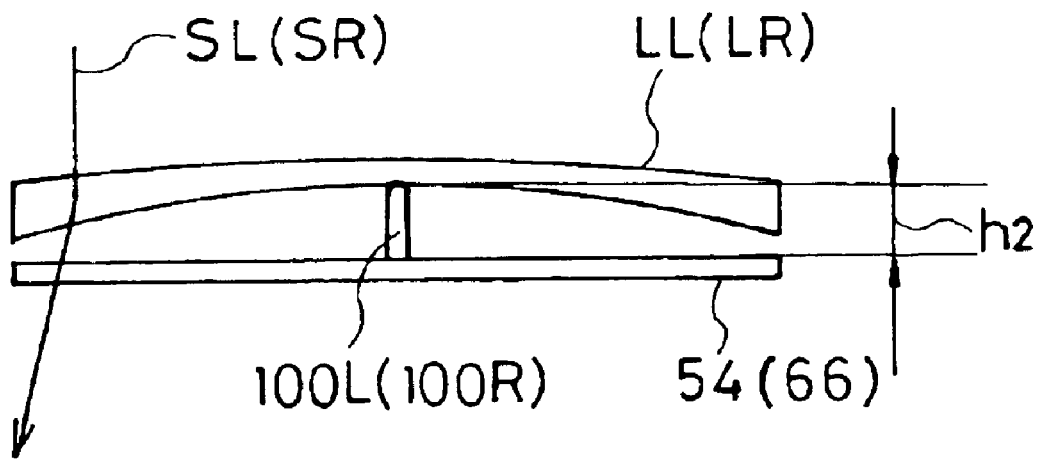
FIG. 46 is an exemplary view of a measurement luminous flux passing through the eyeglass lens when the lens receiver in the second embodiment of the present invention is used.

Further, since the rear refraction surfaces (bottom surface) of the eyeglass lenses LL and LR are usually concave surfaces, the measurement luminous fluxes immediately after passing through peripheral areas of the eyeglass lenses LL and LR are refracted outward as shown in FIGS. 45 and 46 when the parallel luminous fluxes are projected to the eyeglass lenses LL and LR to measure the refraction characteristics. Therefore, in the eyeglass lens supporting state as in the second embodiment of the invention, the measurement luminous fluxes SL (SR) immediately after passing through peripheral areas of the eyeglass lenses LL and LR spreads outward as shown in FIG. 46, and the screen surfaces ScL and ScR of the field lenses 55 and 67 need to be widened.

However, in the configuration where the lens receiving shafts 100L' and 100R' are provided on the field lenses 500L and 500R as in this embodiment, the right and left eyeglass lenses LL and LR are supported on the lens receiving shafts 100L' and 100R' and the refraction characteristics of the eyeglass lenses LL and LR measured. Accordingly, the measurement luminous fluxes SL (SR) severally passing through peripheral areas of the eyeglass lenses LL and LR and spreading outward are refracted inward (toward measurement optical axis) immediately after passing through the eyeglass lenses LL and LR severally by the field lenses 500L and 500R as shown in FIG. 45.

As a result, the measurement luminous fluxes SL (SR) having passed through the field lenses 500L and 500R is projected on the screens SPL and SPR via the pattern plates 54 and 66 as they converge without spreading. Accordingly, areas of the screens SPL and SPR can be made small and a photo-detecting area of the light-receiving element 60 can be also made small. Further, since the measurement luminous fluxes do not spread, the eyeglass lens fitted into a smaller frame can be measured.

Figure 48:
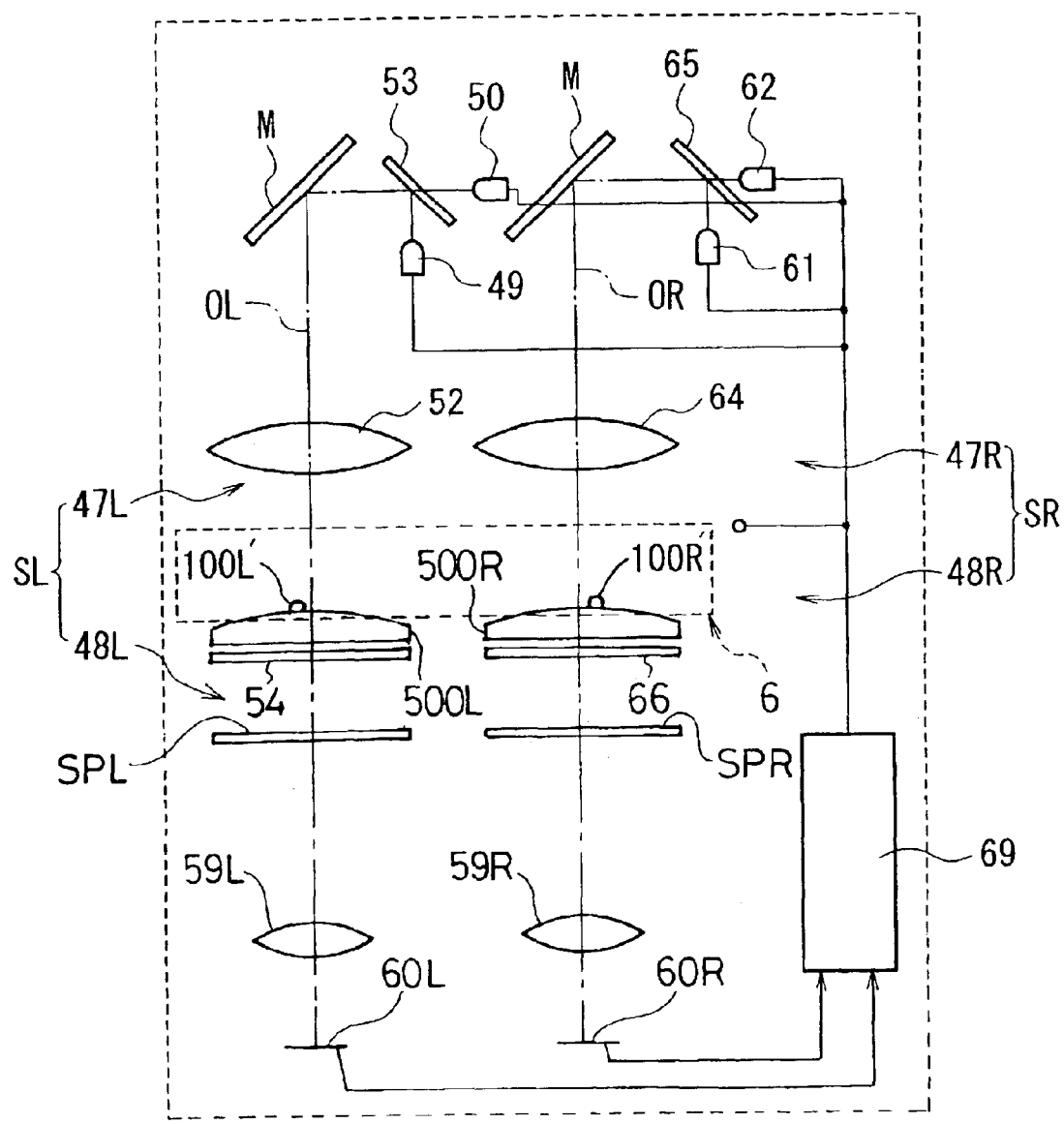
FIG. 48 is an exemplary view showing another variation example of the light-receiving optical system.

Although the light-receiving element 60 is shared by the right and left measurement optical systems SL and SR, light-receiving elements 60L and 60R similar to those of FIG. 47 may be provided for the right and left measurement optical systems SL and SR individually as shown in FIG. 48.

(Other 1)

As described above, since the configuration is adopted, which has the unit body 1 provided with the eyeglass support means for supporting the eyeglasses 5 the measurement optical system SL having the left light-emitting optical system 47L which is provided in the unit body 1 and emits measurement light to the left eyeglass lens LL of the eyeglasses 5 and the left light-receiving optical system 48L which receives the measurement light having passed through the left eyeglass lens with the CCD (light-receiving element) 60, the measurement optical system SR having the right light-emitting optical system 47R which is provided in the unit body 1 and emits measurement light to the right eyeglass lens LR of the eyeglasses 5 and the right light-receiving optical system 48R which receives the measurement light having passed through the right eyeglass lens with the CCD (light-receiving element) 60, and the arithmetic control circuit 69 that performs operation for the optical characteristics of a pair of the eyeglass lenses LL and LR based on output of the CCD (light-receiving element) 60, the optical characteristics of a pair of eyeglass lenses can be measured without performing moving operation of the eyeglass lenses after setting the eyeglass lenses fitted into eyeglass frame on the lens meter. Therefore, even a person who has never measured eyeglass lenses can perform measurement of the optical characteristics of his/her own eyeglasses.

With the configuration where a pair of the light-receiving optical systems 48L and 48R share one CCD (light-receiving element) 60, the CCD 60 is omitted and a manufacturing cost can be reduced.

Moreover, since the unit body 1 can have the left lens receiver (lens receiving shaft 86) disposed between the left light-emitting optical system 47L and the left light-receiving optical system 48L and provided with the end portion (lens receiving area 86a) capable of supporting the left eyeglass lens LL from underneath with a point and the right lens receiver (lens receiving shaft 86) disposed between the right light-emitting optical system 47R and the right light-receiving optical system 48L, and provided with the end portion (lens receiving area 86a) capable of supporting the right eyeglass lens LR from underneath with a point, as the eyeglasses support means, the distance between the bottom surface of the eyeglass lens and the light-receiving means of the light-receiving optical system on the measurement optical axis of each light-receiving optical system is made accurately constant with a simple configuration and accurate refraction characteristics of the eyeglass lens can be measured even if a pair of optical systems for measuring the right and left eyeglass lenses of eyeglasses are provided. Moreover, although the lens receiver is arranged in a measurement optical path, a supporting area of the lens receiver is made minimum and an area of the lens receiver that blocks the refraction measurement can be made minimum because each lens receiver supports each eyeglass lens with a point. This configuration can be realized since a pair of the right and left lens receivers support the right and left eyeglass lenses by two points. Further, with this configuration, the heights of a pair of right and left lens receivers are made equal and the refraction characteristics of the right and left eyeglass lenses can be measured under the same condition.

Furthermore, with the configuration where the lens receiver is formed in a bar shape, the eyeglass lens is held approximately horizontally with a simple configuration and accurate measurement can be performed. In addition, although the lens receiver is arranged in the measurement optical path, a supporting area of the lens receiver is made minimum and an area of the lens receiver that blocks the refraction measurement can be made minimum because each lens receiver is formed in a bar shape and supports each eyeglass lens with a point. This configuration can be realized since a pair of the right and left lens receivers of a bar shape support the right and left eyeglass lenses by two points. Further, with this configuration, the heights of a pair of the right and left lens receivers of a bar shape are made equal and the refraction characteristics of the, right and left eyeglass lenses can be measured under the same condition.

Further, since the unit body 1 has a pair of the lens pressing shafts (pressing member) 26 and 26 (or pressing bars 422 and 422) that press the right and left eyeglass lenses LL and LR severally from above and press the right and left eyeglass lenses against the right and left lens receivers as another lens support means, the right and left eyeglass lenses LL and LR are stably supported and accurate refraction measurement can be performed.

Furthermore, since the unit body 1 has the elevating support means for eyeglasses, which is attached to the unit body 1 in a freely movable manner up and down and makes the right and left eyeglass lenses LL and LR of the eyeglasses 5 go down until the lenses contact with the right and left lens receivers, as another lens support means, the right and left eyeglass lenses LL and LR are stably supported and the lens receivers are allowed to contact and support the lenses, and thus accurate refraction measurement can be performed.

Further, in the case where the elevating support means for eyeglasses is the nose pad supporting member 45 (or 135) disposed at a center between the right and left measurement optical systems in a freely movable manner up and down, which is capable of supporting the nose pad of the eyeglasses from underneath and positioning the eyeglasses in horizontal directions, the right and left eyeglass lenses LL and LR can be simply and quickly accurately positioned to the right and left measurement optical systems. As a result, measurement operation can be easily performed.

In the case where the elevating support means for the eyeglasses is the arms (frame supporting member) 304 and 304 capable of supporting the right and left lens frames of the eyeglasses, a configuration in which the arms do not block the measurement light can be made by arranging the arms (frame supporting member) 304 and 304 at ends closer to the temples.

When a configuration is made where the unit body 1 has the frame holding members (eyeglass sandwiching members) 28 and 29 (or the sandwiching members 412 and 412) that sandwich the eyeglasses from front and rear directions as another lens support means, the eyeglasses are stably held from front and rear directions and the refraction characteristics of the eyeglass lenses LL and LR can be accurately measured.

Further, when a configuration is made where the unit body has the nose pad supporting member disposed at a center between the right and left measurement optical systems, which is capable of supporting the nose pad of eyeglasses from underneath and positioning the eyeglasses in horizontal directions and the sandwiching members for eyeglasses that sandwich the eyeglasses from front and rear directions, as another lens supporting member, positioning of the eyeglasses (eyeglass lenses LL and LR) to the measurement optical system can be accurately performed, and the eyeglass lenses LL and LR are stable held and accurate measurement can be performed.

Furthermore, when a configuration is made where the unit body 1 has the nose pad supporting member 45 (or 135) disposed at a center between the right and left measurement optical systems, which is capable of supporting the nose pad of the eyeglasses 5 from underneath and positioning the eyeglasses 5 in horizontal directions a pair of the lens pressing shafts (pressing members) 26 and 26 (or pressing bars 422 and 422) that severally press the right and left eyeglass lenses LL and LR from above to press the right and left eyeglass lenses against the right and left lens receivers and the frame holding members (sandwiching members for eyeglasses) 28 and 29 (or sandwiching members 412 and 412) that sandwich the eyeglasses 5 from front and rear directions, as another lens support means, the eyeglasses 5 are stably held from front and rear, right and left, and up and down directions, and accurate refraction measurement can be performed.

Moreover, in the configuration where the unit body 1 has the frame holding members (sandwiching members for eyeglasses) 28 and 29. (or sandwiching members 412 and 412) that sandwich the eyeglasses from front and rear directions as another lens support means, when the configuration is made in which the lens receivers (lens receiving shaft 86) are provided between the measurement optical path of the measurement optical system and the withdrawal position outside the measurement optical path in a freely movable manner by the lens receiver moving mechanism 80 (80L and 80R), the right and left lens receivers (lens receiving shafts 86, 86) are allowed to support the eyeglass lenses LL and LR of the eyeglasses 5 and the heights can be specified. Then, in this state, the right and left lens receivers (lens receiving shafts 86, 86) are moved outside the measurement optical path of the measurement optical system by the lens receiver moving mechanism 80 (80L and 80R) after the frame holding members (sandwiching members for eyeglasses) 28 and 29 (or sandwiching members 412 and 412) sandwich the eyeglasses 5 from front and rear directions, and thus no blockage to the measurement luminous fluxes is left in the measurement optical path of the measurement optical system.

Further, when setting is made such that the frame holding member 28 and the frame holding member 29 (or sandwiching member 412 and sandwiching member 412) are linked or connected with each other so as to move forward or backward by an equal quantity with each other to the measurement optical axis of the measurement optical system, positioning of the eyeglass lens to the measurement optical system in front and rear directions can be performed.

Furthermore, when setting is made such that the frame holding member 28 and the frame holding member 29 (or sandwiching member 412 and sandwiching member 412) are linked or connected with each other so as to move forward or backward by an equal quantity with each other to the measurement optical axis of the measurement optical system and positioning of the eyeglass lenses LL and LR to the measurement optical system in horizontal directions can be performed by the nose pad supporting member 45 (or 135), positioning of the eyeglass lens to the measurement optical system in front and rear directions and horizontal directions can be performed. As described, since positioning of the eyeglass lens LL and LR to the measurement optical system in front and rear directions and horizontal directions can be simply and accurately, the refraction characteristics of the eyeglass lenses LL and LR can be measured simply and accurately.

(Other 2)

In the second embodiment of the invention, the configuration is adopted where the lens receiving shafts 100L and 100R of a bar shape (pin shape) are provided on the Hartman's pattern plates 54 and 66 in a protruding manner, but the invention is not necessarily limited to this configuration. For example, a configuration can be made where the lens receiving shafts 100L and 100R are severally provided on a transparent glass plate or a plastic plate in a protruding manner and the pattern plates 54 and 66 are disposed below the transparent plate or the plastic plate.

What is claimed is:

1. A lens meter comprising: a left measurement optical system including a left light-emitting optical system that emits measurement light to a left eyeglass lens and a left light-receiving optical system; a right measurement optical system including a right light-emitting optical system that emits measurement light to a right eyeglass lens and a right light-receiving optical system; right and left pattern plates provided in said right measurement optical system and said left measurement optical system, respectively, separating a measurement luminous flux into a large number of measurement luminous fluxes; right and left lens receivers provided between said right and left light-emitting optical systems and said right and left light-receiving optical systems, respectively; light-receiving elements that receive the measurement luminous flux to be guided by said light-receiving optical systems; and an arithmetic control circuit that computes optical characteristics of said pair of eyeglass lenses based on an output of said light-receiving elements.

2. The lens meter as claimed in claim 1, wherein said light-receiving elements are a common light-receiving element for receiving the measurement luminous flux to be guided by said right and left light-receiving optical systems.

3. The lens meter as claimed in claim 1, wherein said pair of light-receiving optical systems individually include a light-receiving element.

4. The lens meter as claimed in claim 1, wherein said left lens receiver is disposed between said left light-emitting optical system and said left light-receiving optical system and has an end portion capable of supporting said left eyeglass lens from underneath with a point, and wherein said right lens receiver is disposed between said right light-emitting optical system and said right light-receiving optical system and has an end portion capable of supporting said right eyeglass lens from underneath with a point.

5. The lens meter as claimed in claim 4, wherein each of said right and left lens receivers comprises one lens receiving shaft formed in a bar shape, said shaft having an upper end formed in a hemispheric shape.

6. The lens meter as claimed in claim 5, wherein said light-receiving optical system comprises a convex lens having a shape protruding upward, and said convex lens is provided with said lens receiving shafts.

7. The lens meter as claimed in claim 5, further comprising a unit body, said unit body comprising a pair of pressing members that severally press said right and left eyeglass lenses from above to press the right and left eyeglass lenses severally against the right and left lens receivers as another said lens support means.

8. The lens motor as claimed in claim 5, further comprising a unit body, said unit body comprising elevating support means for eyeglasses attached to said unit body in a freely movable manner up and down for making said right and left eyeglass lenses of eyeglasses move down until the lenses contact the right and left lens receivers as another said lens support means.

9. The lens meter as claimed in claim 8, wherein said elevating support means for eyeglasses comprises a nose pad supporting member disposed at a center between said right and left measurement optical systems in a freely movable manner up and down, which is capable of supporting the nose pad of said eyeglasses from underneath and positioning said eyeglasses in horizontal directions.

10. The lens meter as claimed in claim 8, wherein said elevating support means for eyeglasses comprises a frame supporting member capable of supporting right and left lens frames of said eyeglasses and attached to right and left sides of said unit body in a freely movable manner up and down.

11. The lens meter as claimed in claim 1, further comprising a unit body, said unit body comprising a pair of sandwiching members for eyeglasses, which sandwich said eyeglasses from front and rear directions, as another lens support means.

12. The lens meter as claimed in claim 1, further comprising a unit body, wherein said unit body comprises: a nose pad supporting member disposed at a center between said right and left measurement optical systems, which is capable of supporting the nose pad of said eyeglasses from underneath and positioning said eyeglasses in horizontal directions; and a pair of sandwiching members for eyeglasses, which sandwich said eyeglasses from front and rear directions, as another lens support means.

13. The lens meter as claimed in claim 1, further comprising a unit body wherein said unit body comprises: a nose pad supporting member disposed at a center between said right and left measurement optical systems, which is capable of supporting the nose pad of said eyeglasses from underneath and positioning said eyeglasses in horizontal directions; a pair of pressing members that severally press said right and left eyeglass lenses from above to press the right and left eyeglass lenses against the right and left lens receivers severally; and a pair of sandwiching members for eyeglasses, which sandwich said eyeglasses from front and rear directions, as another lens support means.

14. The lens meter as claimed in claim 13, wherein said lens receivers are provided between a measurement optical path of said measurement optical system and a withdrawal position outside the measurement optical path in a freely movable manner by a lens receiver moving mechanism 2 and wherein said lens receivers are moved in the withdrawal position after the eyeglasses are sandwiched by said pair of sandwiching members.

15. The lens meter as claimed in claim 11, wherein said pair of sandwiching members for eyeglasses sandwich said eyeglasses from front and rear directions and are linked or connected with each other so as to move forward or backward by an equal quantity with each other to a measurement optical axis of the measurement optical system.

16. The lens meter as claimed in claim 12, wherein said pair of sandwiching members for eyeglasses sandwich said eyeglasses from front and rear directions and are linked or connected with each other so as to move forward or backward by an equal quantity with each other to a measurement optical axis of the measurement optical system.

17. The lens meter as claimed in claim 13, wherein said pair of sandwiching members for eyeglasses sandwich said eyeglasses from front and rear directions and are linked or connected with each other so as to move forward or backward by an equal quantity with each other to a measurement optical axis of the measurement optical system.

18. The lens meter as claimed in claim 14, wherein said pair of sandwiching members for eyeglasses sandwich said eyeglasses from front and rear directions and are linked or connected with each other so as to move forward or backward by an equal quantity with each other to a measurement optical axis of the measurement optical system.

* * * * *